US008016935B2

(12) United States Patent
Morency et al.

(10) Patent No.: US 8,016,935 B2
(45) Date of Patent: Sep. 13, 2011

(54) ANTI-CORROSION PIGMENTS COMING FROM DUST OF AN ELECTRIC ARC FURNACE AND CONTAINING SACRIFICIAL CALCIUM

(75) Inventors: Maurice Morency, Saint-Lambert (CA); Guoji Shan, Ville Saint-Laurent (CA); Denise Fontaine, Montreal (CA)

(73) Assignee: Ferrinov Inc., Montreal, QC (*) Notice: Subject to any disclaimer, the term of this patent is extended or adjusted under 35 U.S.C. 154(b) by 857 days.

(21) Appl. No.: 11/917,712

(22) PCT Filed: Jun. 19, 2006

(86) PCT No.: PCT/CA2006/001019
§ 371 (c)(1),
(2), (4) Date: Dec. 14, 2007

(87) PCT Pub. No.: WO2006/133575
PCT Pub. Date: Dec. 21, 2006

(65) Prior Publication Data
US 2008/0196619 A1    Aug. 21, 2008

Related U.S. Application Data

(60) Provisional application No. 60/691,227, filed on Jun. 17, 2005.

(51) Int. Cl.
C09C 1/22 (2006.01)
C04B 9/02 (2006.01)
C04B 14/00 (2006.01)

(52) U.S. Cl. .................. 106/456; 106/14.05; 106/419

(58) Field of Classification Search .................. 75/10.3, 75/115, 426, 743; 423/98, 150.1, 567.1; 106/14.05, 456
See application file for complete search history.

(56) References Cited

U.S. PATENT DOCUMENTS

| | | | |
|---|---|---|---|
| 1,557,990 A | 10/1925 | Doty | |
| 2,404,254 A | 7/1946 | Short | |
| 2,502,130 A | 3/1950 | Downs et al. | |
| 2,904,395 A | 9/1959 | Donald et al. | |
| 3,832,455 A | 8/1974 | Smith et al. | |
| 3,904,421 A | 9/1975 | Shimizu et al. | |
| 3,959,437 A | 5/1976 | Rastas et al. | |
| 4,046,557 A | 9/1977 | Beggs | |
| 4,053,325 A | 10/1977 | Vanderheiden | |
| 4,071,357 A | 1/1978 | Peters | |
| 4,087,004 A | 5/1978 | Nott | |
| 4,125,460 A | 11/1978 | Nott et al. | |
| 4,140,538 A | 2/1979 | Hund et al. | |
| 4,156,613 A | 5/1979 | Hund et al. | |
| 4,190,422 A | 2/1980 | Hitzrot, Jr. | |
| 4,211,565 A | 7/1980 | Hund et al. | |
| 4,225,352 A | 9/1980 | Makino et al. | |
| 4,286,726 A | 9/1981 | Madsen | |
| 4,289,745 A | 9/1981 | Patil | |
| 4,292,294 A | 9/1981 | Patil et al. | |
| 4,319,988 A | 3/1982 | Aldrich | |
| 4,332,777 A | 6/1982 | Pazdej | |
| 4,362,702 A | 12/1982 | Rastas et al. | |
| 4,378,252 A | 3/1983 | Kiemle et al. | |
| 4,386,057 A | 5/1983 | Dobbins et al. | |
| 4,396,423 A | 8/1983 | Stephens, Jr. et al. | |
| 4,409,020 A | 10/1983 | Holman et al. | |
| 4,419,228 A | 12/1983 | Cook et al. | |
| 4,432,803 A | 2/1984 | Hitzrot, Jr. | |
| 4,432,868 A | 2/1984 | Aldrich | |
| 4,435,368 A | 3/1984 | Demarthe et al. | |
| 4,443,264 A | 4/1984 | Hund et al. | |
| 4,482,864 A | 11/1984 | Koenig et al. | |
| 4,491,619 A | 1/1985 | Biermann et al. | |
| 4,606,765 A | 8/1986 | Ferlay | |
| 4,610,721 A | 9/1986 | Duyvesteyn et al. | |

(Continued)

FOREIGN PATENT DOCUMENTS

| | | |
|---|---|---|
| CA | 1184363 | 3/1985 |
| CA | 1186885 | 5/1985 |
| CA | 1241200 | 8/1988 |
| CA | 1331274 | 8/1994 |
| CA | 2228562 | 2/1997 |
| CA | 2400854 | 8/2001 |
| CA | 2453005 | 6/2005 |
| CA | 2549070 | 6/2005 |
| CZ | 291706 | 5/2003 |
| EP | 0724918 A1 | 8/1996 |
| EP | 0724918 A4 | 8/1996 |
| EP | 0853648 | 7/1998 |
| FR | 1362949 | 6/1964 |
| GB | 748410 | 5/1956 |
| GB | 887491 | 1/1962 |
| GB | 1218762 | 1/1971 |
| JP | 63205163 | 8/1988 |

OTHER PUBLICATIONS

Jebrak Michel, Maurice Morency and Denise Fontaine, "Caracterisation et technologie de traitement des poussieres d'acierage a Sorel-Tracy", Quebec Department of the Environment—St. Lawrence Centre, Environment Canada, Mar. 1993, chapters 8 and 9 (English translation provided by Applicant). Itoh, F., et al. Anomalous Increase in Coercivity in Iron Oxide Powder Coated with Sodium Polyphosphate. IEEE Transactions on Magnetics, MAG-13, No. 5, p. 1385 (1977).
International Search Report, PCT/CA2006/001019, mailed on Oct. 23, 2006.

*Primary Examiner* — Anthony J Green
*Assistant Examiner* — Pegah Parvini
(74) *Attorney, Agent, or Firm* — Choate Hall & Stewart LLP

(57) ABSTRACT

An anticorrosion ferrite-based pigment, derived from a hydrometallurgical purification process of EAF dust. EAF dust is generated in an electric arc furnace for carbon steel production by processing scrap metal, direct reduced iron and/or pre-reduced hematite, and using CaO-rich slag; from a condensation reaction of metals vapors of Fe, or Zn and of Mn, Mg, Si and/or Al, and suspended CaO particles and oxygen. The pigment contains a non-toxic amount of lead, and includes condensed metal oxides, comprising ferrites $MOFe_2O_3$, M being Zn, Fe, Mn and Mg, and combinations thereof. The condensed oxides have ferrite structures preserved from the EAF dust, and form aggregates thereof. The pigment includes CaO entrapped by the ferrite structures and being partially available to react with humid air and/or water to protect the substrate against corrosion. The pigments are coated or uncoated. They are used for antifouling or paint formulations.

41 Claims, 48 Drawing Sheets

U.S. PATENT DOCUMENTS

| | | |
|---|---|---|
| 4,610,722 A | 9/1986 | Duyvesteyn et al. |
| 4,615,918 A * | 10/1986 | Reichert et al. ............ 427/385.5 |
| 4,652,433 A | 3/1987 | Ashworth |
| 4,669,397 A | 6/1987 | Galgana et al. |
| 4,680,130 A | 7/1987 | Hibst |
| 4,681,637 A | 7/1987 | Rademachers et al. |
| 4,726,895 A | 2/1988 | Martinez |
| 4,758,415 A | 7/1988 | Patil |
| 4,781,298 A | 11/1988 | Hemstack et al. |
| 4,784,758 A | 11/1988 | Willis |
| 4,803,061 A | 2/1989 | Najjar et al. |
| 4,810,368 A | 3/1989 | Seider et al. |
| 4,826,537 A | 5/1989 | Ostertag |
| 4,828,711 A | 5/1989 | Cohen |
| 4,840,668 A | 6/1989 | Gawol et al. |
| 4,867,795 A | 9/1989 | Ostertag et al. |
| 4,940,550 A | 7/1990 | Watson |
| 4,985,078 A | 1/1991 | Rademachers et al. |
| 5,030,285 A | 7/1991 | Vallvey et al. |
| 5,047,145 A | 9/1991 | Hwang |
| 5,055,136 A | 10/1991 | Wiese et al. |
| 5,082,493 A | 1/1992 | Barrett et al. |
| 5,127,586 A | 7/1992 | Oder |
| 5,143,599 A | 9/1992 | Derdall et al. |
| 5,147,554 A | 9/1992 | Heck |
| 5,154,769 A | 10/1992 | Kuske et al. |
| 5,164,007 A | 11/1992 | Buxbaum |
| 5,173,629 A | 12/1992 | Peters |
| 5,176,260 A | 1/1993 | Oder |
| 5,192,518 A | 3/1993 | Ukawa et al. |
| 5,221,323 A | 6/1993 | Li |
| 5,227,047 A | 7/1993 | Hwang |
| 5,234,669 A | 8/1993 | Bartlett |
| 5,316,746 A | 5/1994 | Narita et al. |
| 5,332,493 A | 7/1994 | Ginn et al. |
| 5,336,421 A | 8/1994 | Kurita |
| 5,340,472 A | 8/1994 | Heck |
| 5,342,443 A | 8/1994 | Forbus et al. |
| 5,348,160 A | 9/1994 | Kindig |
| 5,376,605 A | 12/1994 | Iannicelli et al. |
| 5,393,412 A | 2/1995 | Hettinger |
| 5,462,173 A | 10/1995 | Darling |
| 5,486,229 A | 1/1996 | An |
| 5,534,234 A | 7/1996 | Reddin et al. |
| 5,549,811 A | 8/1996 | Rizel et al. |
| 5,556,571 A | 9/1996 | Hashiuchi et al. |
| 5,570,469 A | 10/1996 | Soderstrom et al. |
| 5,685,993 A | 11/1997 | Liu |
| 5,709,730 A | 1/1998 | Cashman |
| 5,738,717 A | 4/1998 | Oulsnam et al. |
| 5,792,250 A | 8/1998 | Braun et al. |
| 5,849,063 A | 12/1998 | Myerson |
| 5,906,671 A | 5/1999 | Weinwurm |
| 5,912,402 A | 6/1999 | Drinkard et al. |
| 5,942,198 A | 8/1999 | Myerson et al. |
| 5,954,969 A | 9/1999 | Hedin |
| 6,022,406 A | 2/2000 | Roux et al. |
| 6,129,777 A | 10/2000 | Fuji et al. |
| 6,139,960 A | 10/2000 | Styron et al. |
| 6,186,335 B1 | 2/2001 | Arrington-Webb et al. |
| 6,197,200 B1 | 3/2001 | College et al. |
| 6,221,124 B1 | 4/2001 | Blom |
| 6,242,098 B1 | 6/2001 | Styron et al. |
| 6,302,952 B1 | 10/2001 | Mobbs et al. |
| 6,338,748 B1 | 1/2002 | Lee et al. |
| 6,361,749 B1 | 3/2002 | Terstappen et al. |
| 6,361,753 B1 | 3/2002 | Cashman |
| 6,428,599 B1 | 8/2002 | Cashman |
| 6,500,229 B1 | 12/2002 | Roux et al. |
| 6,530,987 B1 | 3/2003 | Auer et al. |
| 6,638,430 B2 | 10/2003 | Bratten |
| 6,726,957 B2 * | 4/2004 | Niemiec ....................... 427/327 |
| 6,758,894 B1 | 7/2004 | Houmes |
| 6,770,249 B1 | 8/2004 | Hoboy et al. |
| 6,863,873 B1 | 3/2005 | Hoboy et al. |
| 2003/0010156 A1 | 1/2003 | Tedjar et al. |
| 2003/0023128 A1 | 1/2003 | Smith |
| 2004/0168614 A1 | 9/2004 | Pipko et al. |

* cited by examiner

X Pb
△ Ca
▲ Cr
▽ Zn

Variation
of Zeta Potential, pH and Conductivity VS Concentration of Sodium
Metaphosphate for a Partly Washed Dust Slurry
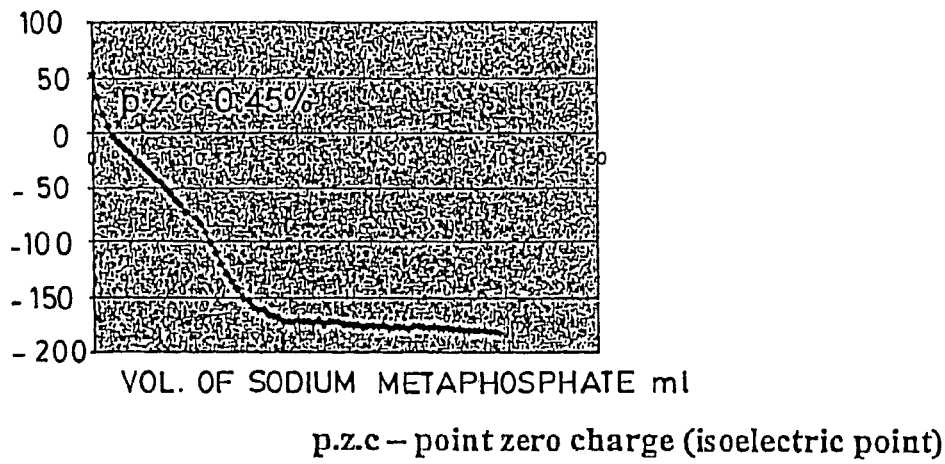
p.z.c – point zero charge (isoelectric point)
FIG. 8
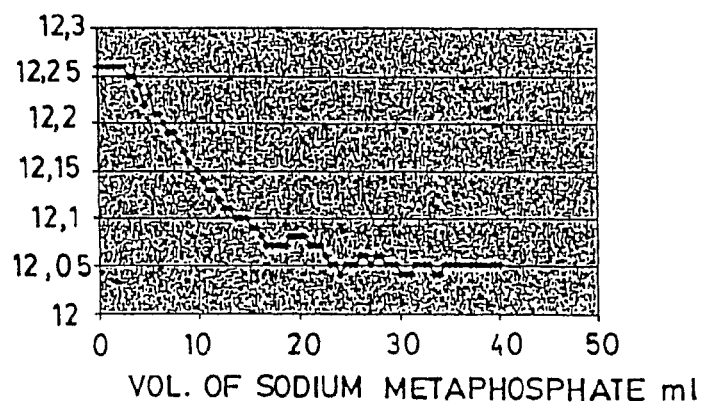
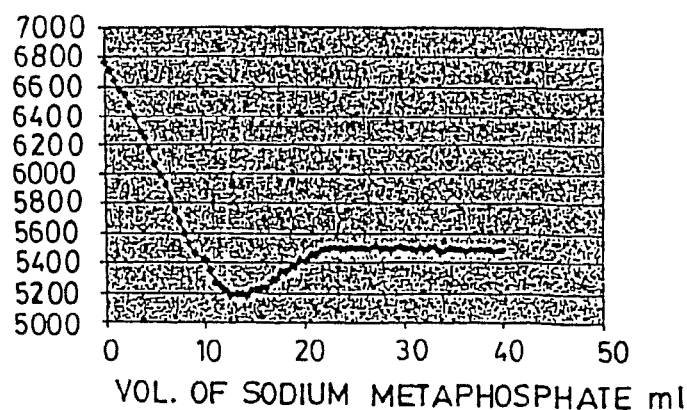

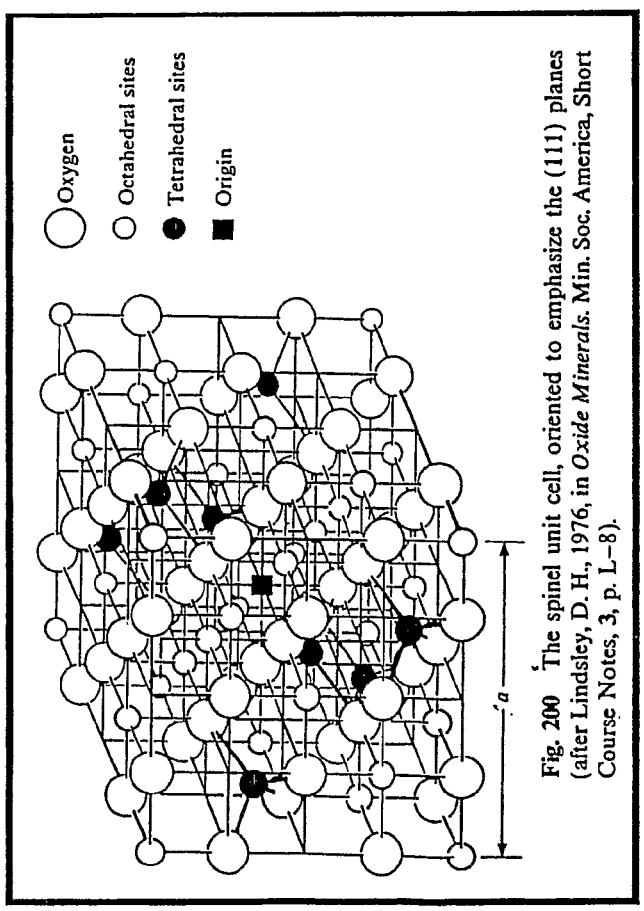
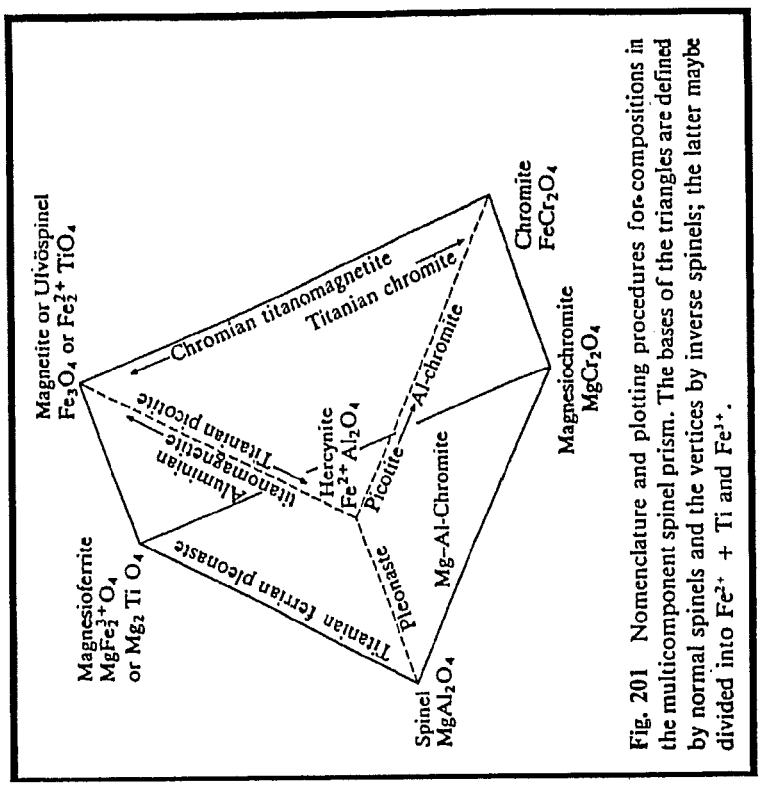
FIG. 20A
FIG. 20B

Fig. 205 The structure of brucite, showing two sheets of hydroxyls with Mg atoms between them forming one layer of the structure (after Bragg, W. L. & Claringbull, G. F., 1965, *Crystal Structures of Minerals*, G. Bell & Sons, London).

N.B. Portlandite $Ca(OH)_2$ is an isotype of brucite $Mg(OH)_2$

I —

II —

ANTI-CORROSION PIGMENTS COMING FROM DUST OF AN ELECTRIC ARC FURNACE AND CONTAINING SACRIFICIAL CALCIUM

This Application claims the benefit under 35 U.S.C. §371 of International Application No.: PCT/CA2006/001019, filed Jun. 29, 2006 (published PCT application No. WO 2006/133575A1, on Dec. 21, 2006), which claims priority under 35 U.S.C. §1199(e) of U.S. Provisional Application 60/691,227, filed Jun. 17, 2005; the entire contents of each of the above-referenced applications are incorporated herein by reference.

FIELD OF THE INVENTION

The present invention relates generally to the field of steel mill dust treatment. More particularly, the invention relates to pigments produced from a hydrometallurgical separation process of dust produced by electric arc furnaces in steel mills. These pigments are ferrite and/or magnetite type pigments useful as anti-corrosive agents in paints, primers and other coatings.

PRIOR ART

Electric arc furnace (EAF) dust, also known under the name of K061, is classified as a dangerous material because it contains concentrations of soluble heavy metals such as cadmium, zinc, chromium and, particularly, lead. More specifically, EAF dust usually contains more than the accepted values in the leachate for lead and on occasion cadmium and chromium and hence, does not meet the norms specified by the TCLP (Toxicity Characteristic Leading Procedure) and as a result the solid is a dangerous substance.

EAF dust also contains spinel compounds, notably magnetite ($Fe_3O_4$) and diverse ferrites ($MOFe_2O_3$). These spinel compounds along with contaminants appear in the form of agglomerates and aggregates. To the naked eye, the dust is brown and an observer, even with the aid of a magnifying glass, will not notice the presence of black (spheres) balls of magnetite, even if certain black balls can attain 150 μm in diameter. The brown ferrite contained in the dust is ultrafine, and as a pigment, coats by adsorption the larger particles of magnetite.

As the name suggests, EAF dust is produced in electric arc furnaces. In this process, the furnace is charged with material such as scrap metal or pre-reduced metals, the electrodes are lowered and activated, and a molten pool rapidly forms within the vessel. Slag—comprising CaO and MgO in some cases—floats to the top. Often, secondary amounts of scrap are charged within the vessel once the initial molten pool has formed.

The raw materials used as the iron source may be selected from a variety of reduced, scrap or ore sources, or a combination of the same.

It is often preferable to charge the furnace with direct reduced iron (DRI)—also known as sponge iron, pre-reduced iron, and highly metallized iron—in order to, for instance, increase productivity, improve overall thermal efficiency, reduce certain pollutants and lower emission loading. DRI may be produced by a number of processes such as solid-state reduction processes employing hot reducing gases or solid carbonaceous reductants like coal. In the MIDREX process, as described for example in U.S. Pat. No. 4,046,557 (BEGGS), one uses hot reducing gas consisting principally of CO and $H_2$, which is generated by the continuous catalytic reforming of a hydrocarbon. The reducing gas flows counter-currently to particulate metal oxides (i.e. iron oxide) within a vessel, to produce a metallized product (i.e. DRI). Alternatively, and where energy cost require, DRI may be produced using coal as the reducing agent. Such a process in described for example in U.S. Pat. No. 6,129,777 (FUGI et al.).

The DRI is highly metallized, contains less impurity metal components such as tramp elements, the sources of which may include the elements Cu, Sn, Zn, Pb, Sb, Bi, As, Cr, Ni, Mo, and V. DRI is often used as a concentrating material in electric arc furnaces when scrap metal containing high amounts of tramp elements is to be fed into the furnace.

Another pre-reduced source of iron is hematite pre-reduced pellets. Hematite is the mineral form of iron (III) oxide $Fe_2O_3$, and may be pre-reduced by a number of techniques before it is charged into the EAF vessel, usually in the form of pellets.

In most EAFs, in addition to the DRI or pre-reduced hematite, a slag-forming material is fed into the EAF vessel at certain point in the melting process. The slag formed from these materials may perform a number of functions, such as providing a continuous partially molten oxide phase of the surface of the steel being treated, capturing and retaining non metallic material present in the steel (e.g. aluminum oxide), being non-oxidizing or reducing with respect to the steel, controlling the sulfur content of the steel, promoting stable arcing, protecting the steel from contact with the atmosphere and providing thermal insulation. These slag-forming materials may include calcium oxide CaO in one or a variety of forms—such as burnt lime, dolomite and lime stone, among others—which is thereby are able to form a CaO-rich slag. Lime particularly increases the basicity as part of the slag-forming material.

Depending on the iron source (scrap, DRI, pre-reduced hematite, iron ore, etc.), the slag-forming material and the operating conditions of the EAF, a variety of different steel products may be produced. It also follows that a wide range of EAF dust products may be produced from different EAF steelworks. Thus, the different dusts have different compositions, properties, toxicities, and potential uses.

In this regard, of interest is the EAF dust produced from carbon steel production using scrap metal, DRI and/or pre-reduced hematite as raw materials, and employing a CaO-rich slag. Of particular interest is the EAF dust produced from DRI or pre-reduced hematite, with or without scrap metals as well, whose properties and potential utility have not been adequately sought out or optimized, especially in relation to producing anticorrosive ferrite pigments.

In the EAF process, the temperatures within the EAF vessel and between the arcs vary in space and time and also depend on what raw materials are to be melted down. The molten pool contains molten iron, zinc, as well as tramp elements, etc. The EAF vessel is the site of a complex multi-component, multi-phase system. It is desirable to achieve and maintain an elevated temperature, but it is important to bear in mind that each compound in the system has a different fusion temperature (FT) and evaporation temperature (ET), some of which are for instance at atmospheric pressure: Pb FT=327 C, ET=1740 C; Zn FT=420 C, ET=908 C; Mg FT=650 C, ET=1107 C; Mn FT=1245 C, ET=2097 C; Fe FT=1535 C, ET=3000-3500 C; $Fe_2O_3$ FT=1540 C; CaO FT=2570 C.

In such a multi-phase and multi-component reaction, there is unavoidably a proportion of certain metals and compounds that are vaporized and are suspended above the molten pool and slag in the upper portion of the vessel. These metal vapors either condense and fall back into the molten pool or the slag skin, or flow out of the main vessel through an exhaust pipe.

These metal vapors exiting through the exhaust pipe condense or sublimate within the hollow space or against the internal wall of the exhaust pipe to form the EAF dust, which is gathered and stored for disposal or attempted recycling.

There are a variety of treatment processes for processing this EAF dust. Most EAF dust treatment processes in the prior art aim at recovering or removing the heavy metals in an "aggressive" manner, attacking the crystallographic structure of the ferrite spinels. The known processes also are not specifically directed to EAF dust produced from EAFs that process DRI, pre-reduced hematite and/or scrap metals, and use a CaO-rich slag.

What is known in the prior art, is European patent no. 0 853 648 (ROUX et al.), the equivalent to U.S. Pat. No. 6,022,405, which describes a hydrometallurgical process of EA dust treatment with the aim to produce pigments. This process comprises a step of magnetic separation of the dust into two fractions, one fraction containing less magnetic elements, and the other fraction containing non-magnetic elements, as well as treatment steps of these two fractions to obtain zinc ferrite pigments. ROUX et al. also describe the notable and essential step of calcining the material at a temperature of 450° C. to 650° C. The process disclosed has an effect of attacking the crystallographic structure of spinels other than the zinc ferrite spinel, and in this sense, is also an aggressive process. This process thus significantly modifies the structure as well as the chemical and physical interrelations found in the EAF dust.

Also known in the art are ferrite pigments that include particular calcium phases that provide anticorrosive properties to the pigment, most of which use a method of calcination. In general, calcination is the process of heating a substance to a high temperature, but below its melting or fusion temperature, to bring about thermal decomposition or a phase transition in its physical or chemical composition.

U.S. Pat. No. 3,904,421 (SHIMIZU et al.) describes anticorrosion pigments for paints that contain at least 5% of a calcium oxide-iron oxide phase $2CaO.Fe_2O_3$. This phase, which would seem to have a ferrite-like structure, is produced by calcining iron oxide and a calcium compound at high temperatures. This phase enables hydration reactions and the release of calcium hydroxide to maintain a basic pH and protect against corrosion of a metal substrate. This is one mechanism that may help in corrosion prevention, but it is limited in that calcination reactions are required to produce the pigment.

U.S. Pat. No. 4,225,352 (MAKINO et al.) also describes this calcination-derived $2CaO.Fe_2O_3$ phase as having anticorrosion properties, but it is used at the high concentration of 25% or more and in aqueous paint formulations. In this case, the phase is used because of its low solubility in aqueous solutions to prevent gellation of the paint during storage.

U.S. Pat. No. 4,211,565 (HUND et al.) describes a so-called "active" pigment produced by calcining a metal oxide such as CaO and an iron oxide $Fe_2O_3$ at a temperature range from 400° C. to 600° C. It was found that this temperature range decreased the intensity of corrosion of a substrate coated with a paint containing the resulting pigments. Thus, the products of the calcinations are not defined but for the calcination temperature and reactants by which they were produced, and by their corrosion resistance according to the Thomson corrosion test.

It may be appreciated that certain pigments containing calcium-iron ferrites or zinc ferrites are known in the art, and are almost exclusively produced by a calcination method. Much work has been devoted to honing the calcination conditions—such as temperature range, reactant compositions—in order to produce ferrite pigments for certain purposes, and a plethora of patents are directed to such calcination methods.

These pigments and processes are limited by calcination, which is an aggressive, high-temperature procedure that results in physical and/or chemical modifications. However, methods of recycling EAF dust to draw out potential advantageous pigment products have not been so fully developed, and thus there is currently an enormous potential to improve and discover new pigments derived from EAF dust.

There is presently a need for pigments derived from EAF dust. Particularly, there is a need for a treatment process of selected EAF dust that permits an efficient and unagressive recuperation of the different ferrites and magnetites present in the dust, as well as permitting the decontamination of the dust, to produce safe and economical pigments that present anticorrosive properties, distinguishing structures and some advantages over the prior art.

SUMMARY OF THE INVENTION

The present invention responds to the above mentioned need, by providing pigments derived from EAF dust.

Accordingly, the present invention provides and anticorrosion ferrite-based pigment for use in a paint to coat a substrate, the pigment being derived from a hydrometallurgical purification process of EAF dust. The EAF dust is generated in an electric arc furnace or the like for processing carbon steel from source materials including scrap metal, and using a CaO-based slag. The EAF dust is produced from a condensation reaction of metal vapors of Fe, or Zn and of metals chosen from the group consisting of Mn, Mg, Si and Al, and suspended CaO-based particles and oxygen. The pigment contains a non-toxic amount of lead, and comprises condensed metal oxides. The condensed metal oxides include comprising a plurality of different ferrites of the general formula:

$$MOFe_2O_3.$$

M includes Zn, Fe, Mn, Mg and complexes thereof for the different ferrites. The ferrites have ferrite or ferrite-like structures substantially preserved from the EAF dust, and aggregates of said ferrite or ferrite-like structures are formed. The pigment also includes CaO entrapped by the ferrite or ferrite-like structures and being at least partially available to react with humid air and/or water to protect the substrate against corrosion.

In a preferred embodiment of the present invention, a first portion of the CaO is physically entrapped within the ferrite or ferrite-like structure and a second portion of the CaO is physically entrapped within the aggregates. The second portion of CaO is available as a source of sacrificial calcium to react with humid air and/or water to produce $Ca(OH)_2$ and locally increase the pH, preferably to 12 or above.

Preferably, the sacrificial calcium further triggers the formation of at least one protective hydroxide phase. The protective hydroxide phase preferably includes $Zn(OH)_2$, amorphous calcium hydroxide phases, portlandite, and/or a calcium-zinc hydroxide such as one having a crystallographic phase of $CaZn_2(OH)_6$ hydrate.

In another preferred embodiment of the present invention, the pigment contains from about 4 to 12% by weight of calcium.

In still another preferred embodiment of the present invention, the pigment further comprises a coating of the aggregates, said coating being calcium-zinc based and deposited on the pigment to increase the quantity of sacrificial calcium therein.

The present invention further provides a use of the above pigment as an additive in paint, primer or coating formulations to produce an anticorrosive formulation.

The present invention further provides a use of the above pigment as an additive in an antifouling formulation for preferably antifouling against selected organisms.

BRIEF DESCRIPTION OF THE DRAWINGS

The characteristics of the present invention will be best understood by reading the detailed description, while referring to the annexed drawing in which:

FIG. 8 is a series of graphs representing the variation of the zeta potential, ph and conductivity versus the concentration of sodium metaphosphate for a partly washed dust slurry.

FIGS. 20A, 20B and 20C are respectively representations of the spinel unit cell, a three dimensional plotting of multi-component spine prisms, and a representation of the crystal structure of portlandite (isotope of brucite).

DESCRIPTION OF PREFERRED PIGMENTS AND PROCESSES OF THE INVENTION

Figure 1:
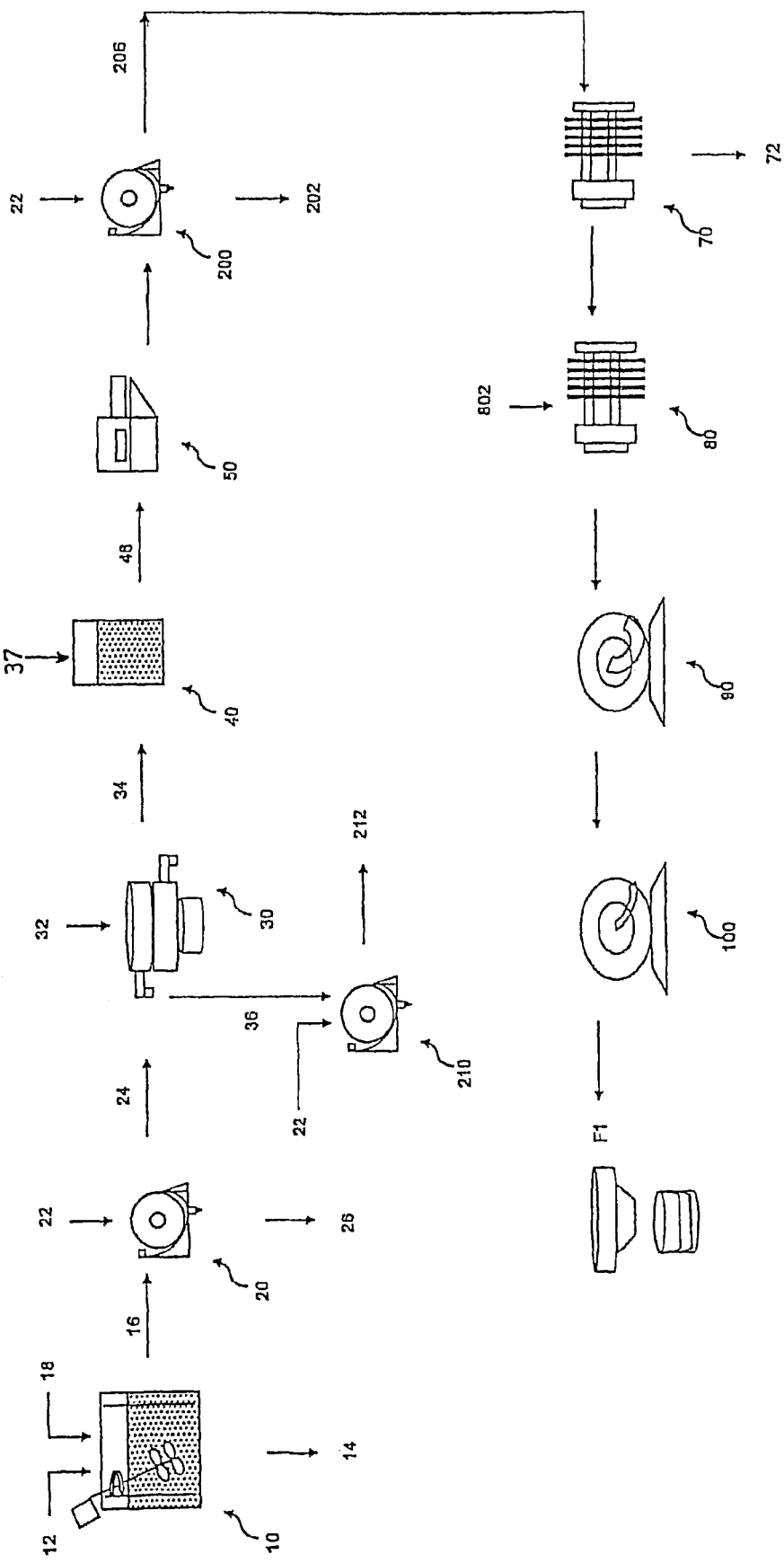
FIG. 1 is a flow chart of the process according to a first variant suitable for producing ferrite pigments of the first grade.
Figure 2:
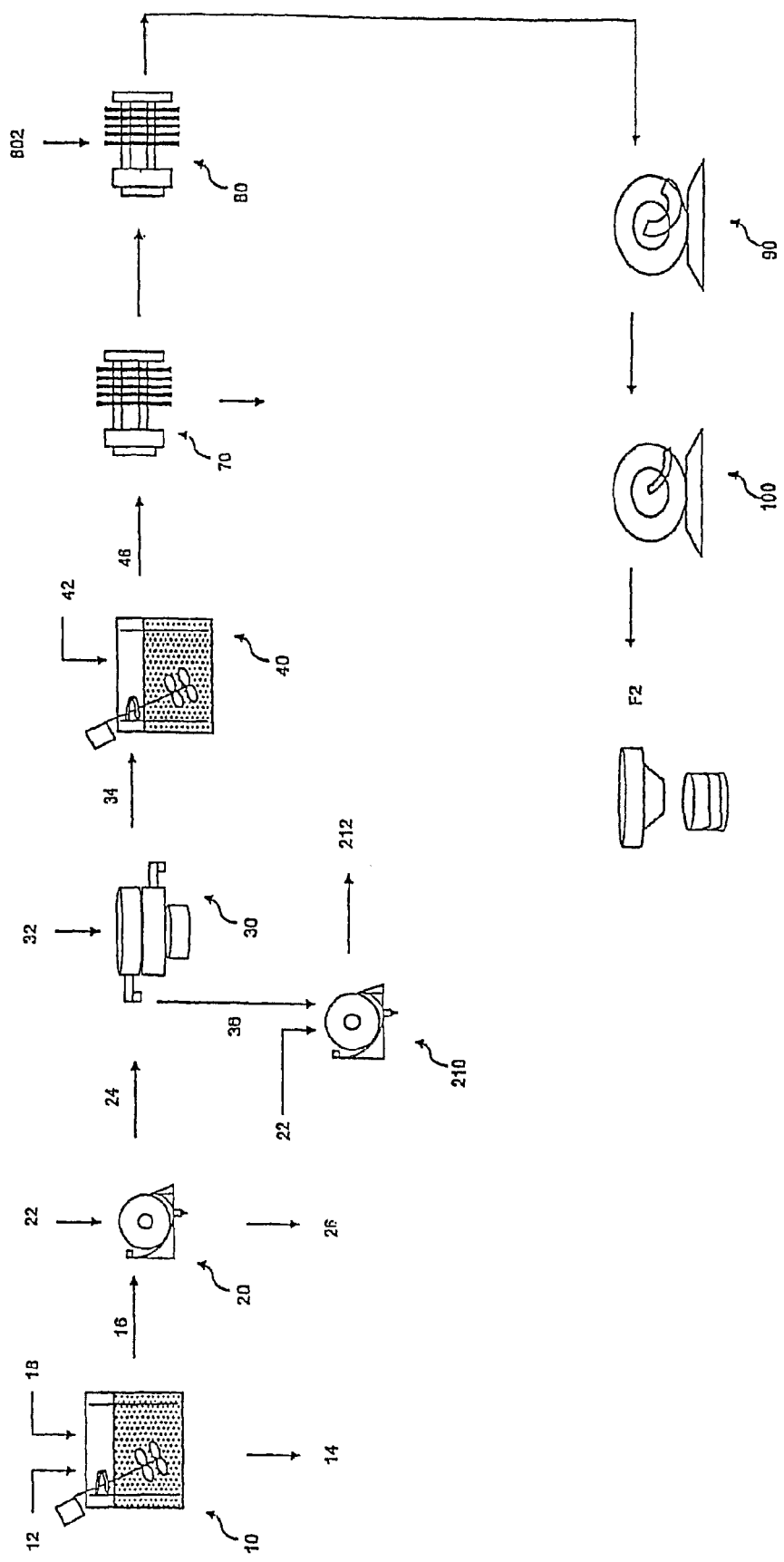
FIG. 2 is a flow chart of the process according to a second variant suitable for producing ferrite pigments of the second grade.
Figure 3:
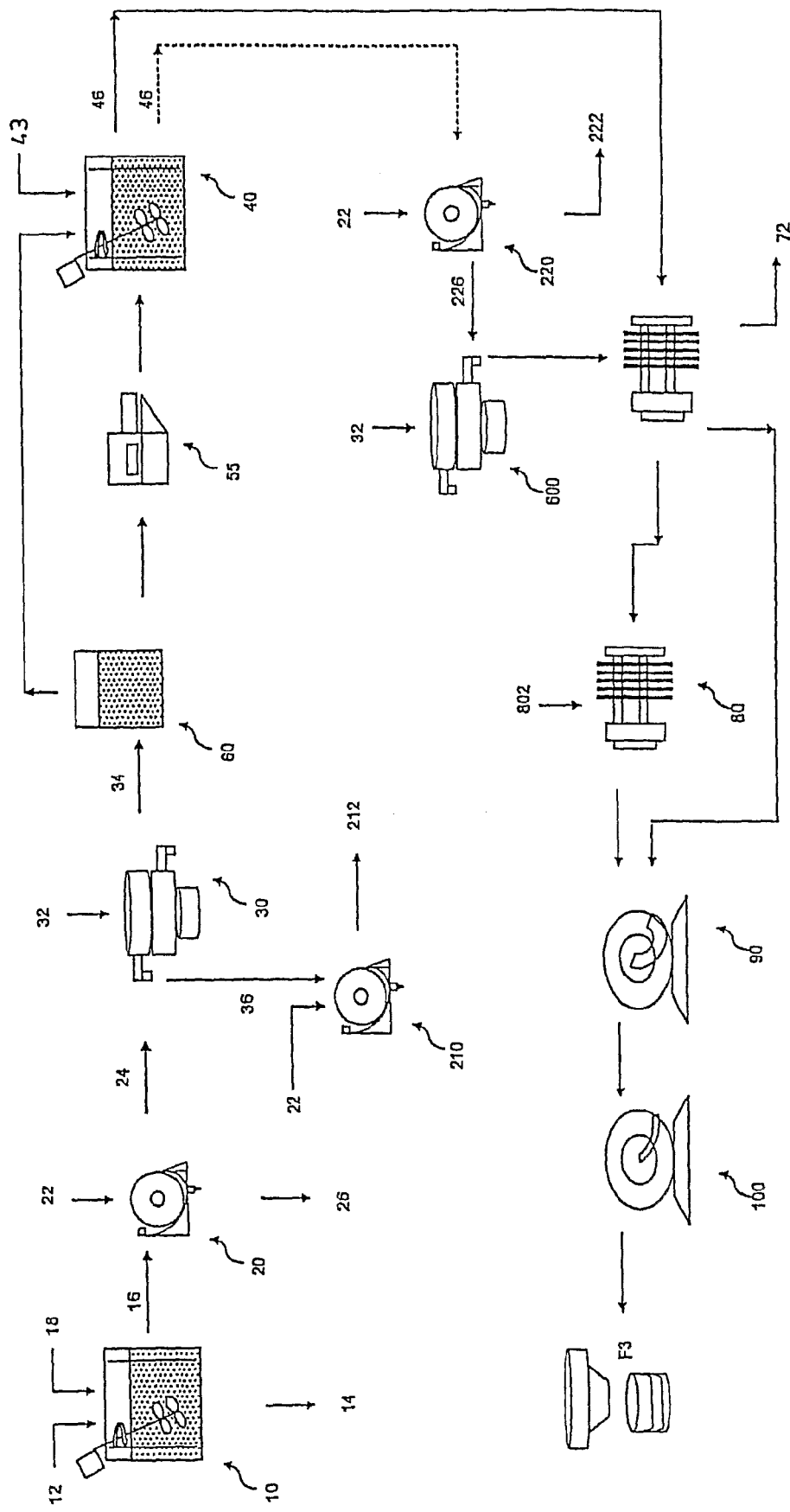
FIG. 3 is a flow chart of the process according to a third variant suitable for producing ferrite pigments of the third grade.
Figure 4:
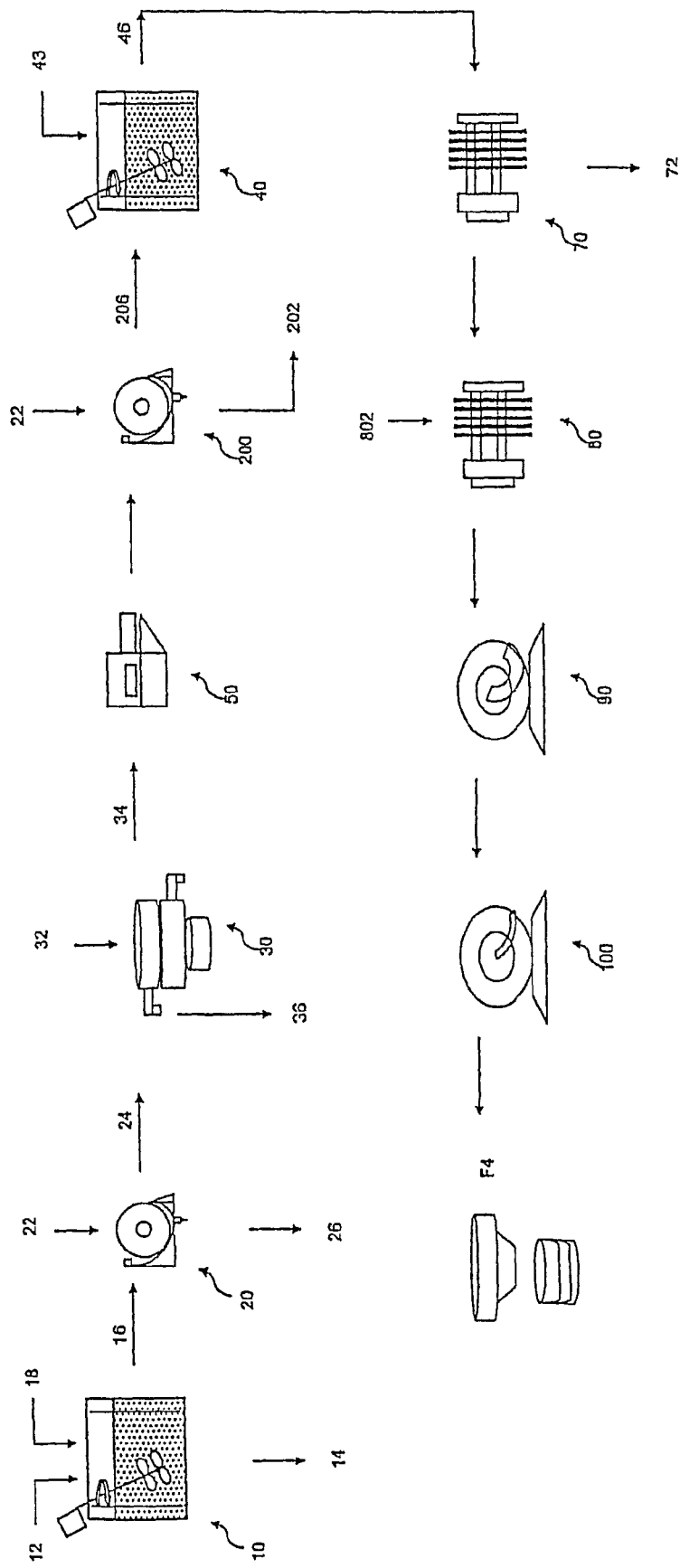
FIG. 4 is a flow chart of the process according to a fourth variant suitable for producing ferrite pigments of the fourth grade.

The present invention concerns an anticorrosive ferrite pigment derived from a hydrometallurgical purification process of EAF dust. The pigment is produced from a selected source using a particular kind of process. The pigment hence is bestowed with unique structures and advantageous properties to combat corrosion. Here-below, the production processes, the structures, the properties, the grades and the uses of these novel pigments will be described.

1) Production of the EAF Dust

The pigments according to the present invention are derived from a hydrometallurgical purification process of selected EAF dust.

Table 1 shows typical chemical compositions of EAF dust coming from three distinct steel mills. These compositions show, for instance, elevated concentrations of certain heavy metals.

TABLE 1

CHEMICAL ANALYSES OF EAF DUST COMING FROM TWO DISTING STEEL MILLS IN THE PROVINCE OF QUEBEC, CANADA

| Elements | Code | Units | SAMPLES | | |
|---|---|---|---|---|---|
| | | | MILL 1 | MILL 2 | MILL 3 |
| AL | ICP90 | ppm | 7100 | 4500 | 2800 |
| Ba | ICP90 | ppm | 157 | 120 | — |
| Ca | ICP90 | ppm | 107800 | 146000 | 43000 |
| Cd | ICP90 | ppm | 153 | 200 | 170 |
| Co | ICP90 | ppm | 14 | 61 | — |
| Cr | ICP90 | ppm | 1200 | 1400 | 1750 |
| Cu | ICP90 | ppm | 1720 | 1700 | 1520 |
| Fe | ICP95 | ppm | >30 | 258000 | 321700 |
| K | ICP90 | ppm | 17700 | 7400 | — |
| Mg | ICP90 | ppm | 49200 | 22200 | 32400 |
| Mn | ICP90 | ppm | 15300 | 27200 | 28600 |
| Mo | ICP90 | ppm | 18 | 41 | — |
| Na | ICP95 | ppm | 33300 | 9700 | — |
| Ni | ICP90 | ppm | 125 | 130 | — |
| P | ICP90 | ppm | 500 | 670 | — |
| Pb | ICP90 | ppm | 10950 | 9500 | 6380 |
| Si | ICP95 | ppm | 15500 | 15800 | — |
| Ti | ICP90 | ppm | 700 | 600 | — |
| V | ICP90 | ppm | 98 | n.d. | — |
| Zn | ICP90 | ppm | 93900 | 162000 | 312300 |

It should be noted that depending on the source of the dust, different variants of the hydrometallurgical process are preferable. On one hand, EAF dust coming from an electric arc furnace that uses DRI or pre-reduced hematite as an important raw iron source, will contain low amounts of heavy metals, in particular lead, and will require even less harsh treatment to derive and purify the ferrite-based pigments. On the other hand, EAF dust coming from an electric arc furnace that uses a high quantity of scrap metals, possibly including galvanized metals, will contain relatively elevated amounts of heavy metals and zinc compounds, and will be subjected to another favoured process to isolate the desired pigments. More regarding the different process variants and the pigments derived therefrom will be expounded upon herebelow.

The selected iron source is fed into the electric arc furnace and during the steel-producing process occurring therein EAF dust is produced. This EAF dust is produced from a condensation reaction of metal vapors of Fe and of metals chosen from the group consisting of Zn, Mn, Mg, Si and Al, and suspended CaO particles and oxygen. The EAF dust also contains a plurality of other compounds, some of which must be removed due to toxicity and others that act as inert filler material.

The system in the EAF vessel is complex. In particular, some metals are gaseous while other compounds are in a solid state yet suspended with the metal vapors. An important one of these solid suspended compounds is calcium oxide CaO, which has a rather high melting temperature of about 2570° C. CaO may be provided in the form of lime. Part of the lime is in the form of a suspended lime dust, which mixes in the interspace above the molten pool with the metal vapors. The metal vapors principally include Fe, Zn, Mg, Mn, Al and Si, as well as some undesirable elements such as Pb and other heavy metals.

The metals vapors and the CaO dust flow out of the vessel through an exhaust pipe, while being cooled and condensed. This condensation produces EAF dust, which itself includes a variety of compounds having a variety of structural features.

It should be noted that the specific properties, including anti-corrosion properties, of ferrite pigments produced from EAF dust by hydrometallurgical processes are dependant on the composition of the raw EAF dust itself and the process steps to separate, leach and isolate the desired pigments. It should also be noted that someone skilled in the art could use a similar dust or powder source resulting from a similar metal vapor condensation reaction to derive by similar hydrometallurgical processes a ferrite pigment of condensed metal oxides with anti-corrosion properties dependant on calcium content and availability.

Depending on the origin of the EAF flue dust, various concentrations of heavy metals, calcium oxides and spinels are present in the raw dust. This depends on hematite, scrap metal and other reactant qualities and origins, as well as the steel mill operating conditions and production demands.

1.1) From DRI or Pre-Reduced Hematite Iron Sources

One selected EAF dust is generated in an electric arc furnace or the like for processing direct reduced iron (DRI) or pre-reduced hematite. Preferably the DRI is produced in a MIDREX-style process, which is described in the above "BACKGROUND" section, or in an analogous process. Pre-reduced hematite or another similar starting material may also be used.

EAF dust that comes from steel mills that use primarily scrap metal and pre-reduced hematite tend to contain less lead and other toxic compounds, and therefore require fewer and less aggressive treatment steps to remove them. Table 2 shows the partial composition of EAF dust produced by a steel mill using primarily scrap metals and pre-reduced hematite.

TABLE 2

FLUE DUST CHEMICAL ANALYSIS, COMPOSITION WITH SCRAP METALS AND PRE-REDUCED HEMATITE

| Elements | | |
|---|---|---|
| | | % |
| Major | Fe | 28.08 |
| | Zn | 7.97 |
| | Ca | 15.27 |
| | Mg | 3.33 |
| | Mn | 1.31 |
| | | PPM |
| Trace | Pb | 8175 |
| | Cr | 1320 |
| | Cd | 255 |
| | Cu | 1440 |

1.2) From Scrap Metal Iron Sources

As mentioned above, ferrite-based pigments may also be fabricated from EAF dust coming from carbon steel producing furnaces that use scrap metal as their primary iron source. The scrap metals may be galvanized or not. Since these EAF dusts have a relatively high concentration of heavy metals, additional processing steps are preferred to sufficiently leach out the heavy metals and render the pigment in conformity with common toxicity limits.

As will be described in detail below, this EAF dust undergoes acidic leaching, preferably with nitric acid. After the lead is selectively precipitated out of the leachate, the latter is re-deposited as a coating on the ferrite-based pigment to produce a coated pigment that presents excellent and surprising anti-corrosion properties.

2) Production of the Pigments

Once the selected EAF dust is procured, it is processed hydrometallurgically to yield the pigments of the present invention.

In general terms, the hydrometallurgical process is for the treatment of EAF dust containing agglomerates of small ferrite particles and larger magnetite particles, the ferrite particles coating by adsorption the larger magnetite particles, the dust further containing calcium oxide, zinc oxide and a toxic amount of leachable lead together with minor elements selected from the group consisting of Mg, Cr, Cu, Cd, V, and chlorides.

Viewed broadly, the process includes a first treatment and a second treatment. The first treatment includes washing, decanting, separation and addition an anionic surfactant, magnetic separation and screening to thereby convert the raw EAF dust into separated ferrite and magnetite fractions having certain size distribution. The second treatment involves various leaching steps to further purify the fractions to yield the desired pigments. Additional grinding steps may also be preferred to obtain the desired properties.

Referring to FIG. 1, which shows a first variant of the process, the first treatment, which is performed in a tank (10), comprises the steps of:

a) washing the EAF dust (12) in water to dissolve soluble salts, metals and simple oxides contained in the duct, the washing step being performed with an alkaline pH which is preferably greater than 12;

b) decanting the solution of step a) to obtain a supernatant liquid (14) containing the dissolve salts, metals and simple oxides and a slurry (16) containing ferrites and magnetites, a non-toxic amount of leachable lead and a reduced amount of calcium;

c) separating the slurry (16) and the supernatant liquid (14); and d) adding to the slurry obtained in step c) an anionic surfactant (18), preferably a phosphate and most preferably sodium metaphosphate, to disperse the ferrite particles adsorbed on the magnetite particles. It is worth mentioning that another anionic surfactant known in the art and that would have the same effect of dispersing the adsorbed ferrite particles is within the scope of the present invention.

Preferably, the sequence of steps a) to c) is performed more than one time before adding the anionic surfactant. Note that steps a) to c) are not shown in the figures.

Steps a) to d) are performed in the tank (10) shown in each of FIGS. 1 to 6. After the first treatment, the slurry (16) from step d) is sent to further stages of the process to produce pigments selected from the group consisting of ferrite pigments, magnetite pigments and ferrite/magnetite pigments.

The treatment of the slurry (16) will vary depending on the grade of ferrite or magnetite to be produced. The production of each of these grades according to the process of the invention will be described in further detail further below.

It should also be understood that although the preferred pigments of the present invention are those that are ferrite-based, the hydrometallurgical process also yields other pigments, in particular those that are magnetite-based. The magnetite-based pigments will also be described here-below, as they may present advantageous and surprising properties and be of commercial interest.

The use of an anionic surfactant was found to increase the efficiency and quality of further separation steps such as screening, and ferrite/magnetite separation by a magnetic separator. Steps a) to c) also enable the decontamination of the dust by leaching salts, metals and simple oxides such as lead oxide. This selective solubilization is due to the alkaline pH solution, which is preferably greater than 12, resulting from the first washing, and optional second washing, with water. This alkalinity promotes the solubilization of PbO and, with the addition of surfactant, enables the product to pass the test set out by the TCLP, which regulates standards of dangerous materials.

Advantageously, the process of the invention also enables the separation of the ferrites from the magnetites without breaking the crystallographic structure of the spinels, so as to produce magnetite and/or ferrite pigments of different grades, whose different compositions have commercial values.

The process also permits the decontamination of EAF dust by hydrometallurgical means while maintaining the most stable families of spinels intact.

The solution obtained in step a) described above has a positive zeta potential, and the anionic surfactant is preferably added in a concentration sufficient to reduce the zeta potential to or close to the isoelectric point, and more preferably to the isoelectric point.

The anionic surfactant is preferably a phosphate or an equivalent thereof. More preferably, sodium metaphosphate is used as the surfactant. More will be said regarding the role of the anionic surfactant here below.

Step e) of treating the slurry preferably comprises the step of magnetically separating the slurry into a first fraction composed essentially of brownish ferrites and a second fraction composed essentially of black magnetite, the first fraction being less magnetic than the second fraction. The magnetic separation is preferably performed with a magnetic field in the range of 400 to 700 gauss, more preferably around 550 gauss.

Subsequent processing steps include various screening, leaching, washing and grinding steps, which depend on the pigment to be produced.

Generally, the leaching steps fall under the second treatment, which will be discussed here below.

Four grades of ferrite pigments, two grades of magnetite pigments and one grade of ferrite/magnetite pigments were produced in the pilot run. The ferrite pigments were produced according to the first, second, third and fourth variants of the process shown in FIGS. 1 to 4; the magnetite pigments were produced according to the fifth and sixth variant shown in FIG. 5; and the ferrite/magnetite pigments were produced according to the seventh variant of the process shown in FIG. 6. More on these grades will be discussed below.

2.1) Treatment of the First Fraction to Produce Ferrite-Based Pigments

The step of treating the first fraction preferably comprises the steps of:

removing from the first fraction, particles having a grain size of 20 µm or more, to obtain a refined first fraction;

leaching the refined first fraction with a solvent, to obtain a leached slurry;

separating the leached slurry into a solid fraction containing ferrite pigments and a liquid fraction containing constituents of the first fraction soluble in the solvent; and drying the solid fraction to obtain dry pigments of ferrites.

In accordance with a first variant, the solvent is water and the ferrite pigments obtained are ferrite pigments of a first grade.

In accordance with a second variant, the solvent is sulfuric acid, the leaching is performed at a pH of 0 to 3 and the ferrite pigments obtained are ferrite pigments of a second grade.

In accordance with a third variant, the solvent is nitric acid, the leaching is performed at a pH of up to 3, and the ferrite pigments obtained are ferrite pigments of a third grade.

In accordance with a fourth variant, the process further comprises the step of wet grinding the solid fraction to obtain a fourth grade of pigments having a finer mean grain size and a lower concentration of lead as compared to the ferrite of the third grade.

Part of the novelty of the process for all grades of pigment resides in an initial treatment of the EAF dust with water with the addition of an anionic surfactant. This surfactant increases the efficiency and quality of the ferrite/magnetite separation by the magnetic separator. This initial treatment also enables the decontamination of the dust by leaching salts, metals and simple oxides such as lead oxide. This selective solubilization is due to the alkaline pH>12 solution resulting from the first washing (first mixing) and rinsing (second mixing) with water (Table 3). This alkalinity promotes the solubilization of PbO and enables for the product to pass the test set out by the TCLP, which regulates standards of dangerous materials (Table 4).

TABLE 3

WATER ANALYSES (First Treatment)

| | Chemical Analyses | | | | |
| --- | --- | --- | --- | --- | --- |
| | Zn ppm | Pb ppm | Cr ppm | Cd ppm | Ca ppm |
| S99# 28 1T H2O | 1.36 | 170 | 0.75 | 0 | 770 |
| S99# 28 1T H2O/LV | 1.56 | 41 | 0.95 | 0 | 340 |
| B99# 79 1T H2O | 3.21 | 71.7 | 15.74 | 0 | 206 |
| B99# 79 1T H2O/LV | 2.00 | 65.4 | 1.93 | 0 | 492 |

TABLE 4

TCLP RESULTS

| | | | Analysis of leachate | | | |
| --- | --- | --- | --- | --- | --- | --- |
| FM # | Grade | pH | Pb ppm | Cr ppm | Cd ppm | Zn ppm |
| 1076 | Ferrite pigments of the first grade | 8.5 | 0 | 0.32 | 0 | 0 |
| 1084 | Ferrite pigments of the first grade | 8.7 | 0 | 0 | 0 | 0.17 |
| 1104 | Ferrite pigments of the first grade | | 2 | 0.20 | 2 | 240 |

All pigment grades have been obtained by a substantially similar treatment, the processes differing in the specific leaching step which gives the pigments their desired chemical and surface characteristics. In many cases, specific coating also gives the pigments even greater specific properties for more particular markets.

Ferrite Pigment First Grade (F1)

The ferrite pigment of the first grade was produced with the aid of a solution containing an optimal concentration of surfactant, the concentration being a function of the isoelectric point of the dust to be treated, and with a leaching hereafter referred as to the second treatment with water only.

The first grade ferrite pigment contained a high quantity of lead that cannot be easily leached under normal pH conditions. After ten months and many agitations in water, this pigment showed no leaching of heavy metals (Table 5) and is comparable to pigments of the second and third grade described below. Heavy metals, with the exception of 8% zinc in the resistant form of zincite, were present and stabilized in the structure of certain ferrites and spinels.

TABLE 5

WATER LEACHATE ANALYSES OF 10 MONTHS

| | FM# | | | | |
| --- | --- | --- | --- | --- | --- |
| | 1061 | 1082 | 1084 | 1133 | 11076 |
| | | | Grade | | |
| Chemical Analysis | B-HS4 Third grade | B-HS Second grade | B-PE First grade | B-PE First grade | S-PE First grade |
| Pb ppm | 2.0 | UDL | UDL | 1.0 | UDL |
| Cd ppm | 0.1 | 0.3 | UDL | UDL | 0.10 |
| Cr ppm | 0.14 | UDL | UDL | 0.01 | 0.53 |
| Zn ppm | 3.53 | 0.06 | 0.1 | UDL | 0.04 |
| Ca ppm | 9.1 | 18.8 | 24.6 | 90.2 | 107.0 |
| Fe ppm | 15.01 | 0.14 | UDL | UDL | 0.19 |
| Sedimentation (cm) | 1.6 | 2.2 | 2.4 | 2.5 | 3.5 |
| pH | 7.60 | 7.79 | 12.03 | 12.41 | 12.45 |

The varied acid leaching steps of the process left solid ferrites of varied compositions and, as experience has taught, the ferrites rich in Ca were less stable to leaching than zinc ferrites or other ferrites representing complex oxides of Ca, Fe, Zn, Mn, Mg, Ni, Cr, etc. The resistant ferrites left after leaching, which principally made up the pigment, gave the pigment a high thermal stability and resistance to leaching, which are a function of the ionic stoichiometry and of the type and quality of the composite crystalline structures.

On the other hand, the ferrite pigments of the first grade demonstrated high resistance to corrosion as demonstrated in the salt spray (mist) tests, allowing coated metallic plates to resist corrosion for more than 1500 hours in a salt mist, which is equal or superior to all other pigments, including those of commercial quality used in the tests.

The first grade ferrite pigment owes its corrosion (salt mist) resistance to CaO, which is sacrificed as $Ca(OH)_2$ and/or to the resulting alkaline viscosity (soapy appearance) associated with $Ca(OH)_2$ and the pigment's elevated alkalinity.

Ferrite Pigment Second Grade (F2)

The ferrite pigment of the second grade was produced in the same way as the first grade, except that the second treatment was performed with sulfuric acid.

The preparation steps for the second grade pigments were identical to those used for the ferrite pigments of the first grade, the addition of the surfactant occurring, after the first washing but before the magnetic separation. For the second grade pigments, leaching using sulfuric acid at a pH between 0.5 and 3 allowed for the preservation of a certain quantity of hydrated calcium sulfate, the solubilization of virtually all the Zn in the form of zincite (ZnO) and the stabilization of lead as a solid sulfate. Using this treatment, the effluents rich in zinc sulfate, are a suitable form of compound to be directly recycled back into an electrolysis process, in order to recuperate the value of the zinc. The calcium sulfates generated by the leaching are not harmful in anticorrosion paints. Calcium sulfate is frequently used as a filler with pigments used in paints and is often desirable as a pigmentary additive. This pigment did not require wet grinding by attrition, nor did it require a second magnetic separation and a second screening after acid leaching. The pigment was filtered in order to obtain an allowable soluble salt concentration of 0.3 g/1 mg, and was then dried and micronized.

In consequence, the second grade of ferrite pigments allowed for the conservation of a fraction of calcium, the transformation of lead oxide into lead sulfate (which is very stable) and the solubilization of zinc oxide into zinc sulfate.

These characteristics of the second grade pigment make this pigment an excellent colorant as well as a corrosion resistant pigment.

Ferrite Pigment Third Grade (F3)

The ferrite pigment of the third grade was produced in the same way as the first grade, except that the second treatment was performed with nitric acid.

The leaching with nitric acid enabled the preferential removal of lead and other heavy metals due to the oxidizing property of the acid. The leaching was performed at a pH between 0 and 3, which permitted the elimination of certain families of ferrites, as a function of the pH, in order to minimize the total lead in the pigment and to give a pigment with a particular signature with regards to its composition, structure and surface characteristics. As an example, between a pH of 3 and 1.5, the ferrites displayed a zeta surface potential that is positive, but this potential became negative at a pH<1.5. This charge characteristic influenced the acceptable coatings and their associated mechanisms.

The different ferrites issuing from these leachings, showed high heat resistant capabilities, which are very valued pigmentary properties. This leaching also minimized the difference between the pigment colors and enabled a delta of variation of about 0.5 for pigments of different dust deliveries (Table 6). The properties were equal or superior to the pigments currently recognized on the industrial market. This grade of pigment showed enhanced resistance to corrosion depending on the coating used and also displayed a thermal stability as they preserve their color tint at temperatures exceeding 300 to 400° C.

TABLE 6

E VARIATION OF FERRITE HS4 PIGMENTS (THIRD GRADE) FROM MILL 1

| FM # | COLOR L | a | b | Delta E |
|---|---|---|---|---|
| 1317 | 27.13 | 2.27 | 7.38 | 0.2 |
| 1318 | 27.1 | 2.36 | 7.35 | 0.15 |
| 1319 | 26.81 | 2.34 | 7.15 | 0.21 |
| 1320 | 26.82 | 2.4 | 7.25 | 0.17 |

This thermal resistance is a requirement for plastics, powdered paint and ceramics.

Ferrite Pigment Fourth Grade (F4)

The ferrite pigment of the fourth grade was produced in the same way as the third grade, with the addition of a wet grinding step.

This pigment can be used in concrete as a cement additive that increases the fluidity and compression resistance of the concrete. This pigment had a finer granulometry than the third grade, ferrite pigment and the ferrite/magnetite pigment.

The ferrite pigments of the first, second, third and fourth grades have applications in anticorrosive paints. The third grade can be used in plastics and powder paints due to its thermal resistance. This pigment can also be used as a cement additive, thinning agent and additive in high performance concrete. The major difference between the second and third grade ferrite pigments lies in their surface properties.

2.2) Treatment of the Second Fraction to Produce Magnetite-Based Pigments

The step of treating the second fraction preferably comprises the step of screening at 6 μm to obtain a first finer fraction of ferrite with particles having a grain size of 6 μm or less, and a coarser fraction with particles having a grain size greater than 6 μm.

In that case, the process preferably further comprises the steps of: milling the coarser fraction, and removing from the milled coarser fraction the particles having a grain size greater than 40 μm and returning these particles for further milling, and a second finer fraction having particles with a grain size of less than 6 μm, resulting in the coarser fraction containing particles having a grain size between 40 and 6 μm.

In accordance with a fifth variant of the process, the coarser fraction is preferably wet grinded by attrition to attain a mean grain size of approximately 0.3 pm.

The grinded product is thereafter filtered and dried to obtain a magnetite pigment of a first grade.

In accordance with a sixth variant, the first and second finer fractions, which contain particles of less than 6 μm, are purified by suspending residual contaminants contained therein with an anionic surfactant, to obtain a purified magnetic fraction. The purified fraction is thereafter decanted, wet grinded by attrition, filtered and dried, to obtain a magnetite pigment of a second grade.

Magnetite Pigments First Grade (M1)

The magnetite pigment of the first grade was produced by grinding with a ball mill the magnetic fraction issuing from the magnetic separation. The ground fraction was passed through a screening between 38 and 6 μm, and wet grinding by attrition in order to result in a median granulometry of about 0.3 μm. The pigment was then filtered, coated with an organic coating, dried and micronized.

Magnetite Pigments Second Grade (M2)

The magnetite pigment of the second grade was obtained by screening the magnetic fraction, which had already undergone ball mill grinding, at 6 μm. This fraction was purified by putting the silica, carbonate and residual ferrite contaminants into suspension, with the aid of an anionic dispersive surface active.

More particularly, this pigmentary grade of magnetite was obtained by screening at 6 μm the magnetic fraction of the magnetic separation and the fractions less than 6 μm coming from the screening of the rough magnetite after its ball mill grinding. This fraction, which contained a concentration of magnetite, was purified by putting the silica carbonate and ferrite residue contaminants into suspension with the help of a surfactant. Two successive treatments of adding surfactant, followed by a decantation of the magnetite and separation of the suspension, were required to obtain an adequately black product which was subjected to wet grinding by attrition in order to attain a desired granulometry. The solid was finally filtered with an organic additive, dried and micronized. This step of purification is similar to the first treatment of the dust. The ferrites and contaminants were put into suspension, and the magnetite was decanted.

A rough non pigmentary magnetite was also produced. It was obtained after attrition grinding the magnetic fraction coarser than 30 μm. The attrition cleans the surface of the magnetite spheres by wearing out the white coating of calcium and silicate initially present. This step improves the black color of the spheres and eliminates the magnetites which are less resistant to abrasion. The 70 and 30 μm product can be used as a toner in photocopy processing. The commercial niche of this solid depends on its granulometry, morphology, resistance to friction and magnetic properties.

2.3) Production of Magnetite/Ferrite Pigments

In accordance with a seventh variant of the invention, which does not involve magnetic separation, the process preferably comprises the steps of:

removing from the slurry obtained in step d), particles having a grain size of 60 μm or less, to obtain a refined slurry;

leaching the refined slurry in nitric acid at a pH of about 3, to obtain a leached slurry with no or a controlled amount of ZnO, which retards the setting of concrete;

separating the leached slurry into a solid fraction containing a mixture of ferrite and magnetite pigments and a liquid fraction containing constituents soluble in nitric acid; and drying the solid fraction to obtain dry pigments containing a mixture of ferrite and magnetite.

The pigments obtained with this variant are suitable for use in concrete formulation for retarding the setting of concrete or for coloring the same.

All the seven variants described above also preferably comprise the steps of:

coating the pigments with an inorganic and/or organic coating; and micronizing the coated pigments.

Ferrite/Magnetite Pigments (FM)

Ferrite/magnetite pigment suitable as a colorant for concrete was produced with nitric acid at a pH of 3 but without magnetic separation. The slurry from the first treatment was subjected to the following steps: screening at 6 μm, leaching in nitric acid, filtration in order to reduce its soluble salt content, and drying in a flash dryer, yielding a coarse pigment made up of agglomerates having a median grain size of 5 μm.

The screening enabled the removal of coarser contaminants including silica, coal and other fragments. After this, the slurry containing a magnetic charge underwent leaching with nitric acid at a pH of 3 in order to remove the zincite, since zincite delays the setting of cement. The product was filtered in order to reduce its soluble salt content, after which drying in a flash dryer gave the pigment a granulometry with a median of about 5 μm.

For this grade of pigments, the initial pilot process was greatly simplified, which translates into a reduced production cost.

Because its granulometry is too large, the pigment cannot be used as an additive in cement, in order to make high performance concrete.

For all grades of pigments, whether ferrite pigments, magnetite pigments or ferrite/magnetite pigments, at the end of the treatment, an organic additive was provided for the finished product in order to standardize the surface charges, to facilitate the incorporation of the dry pigment into paint resins, and to give a desired fluidity for its handling. It is however worth mentioning that the coating step is optional to the process.

3) Detailed Description of the Preferred Variants of the Hydrometallurgical Process As noted here-above, a variety of pigments may be derived from the hydrometallurgical process described herein. Although ferrite-based pigments for use in anticorrosive paints are a preferred product of certain variants of the process, other variants may produce other pigments.

The preferred variants of the process described herebelow are thus directed toward ferrite-based or magnetite-based pigments, some of which were described hereabove.

More specifically, the process for treating EAF dust according to the invention is a hydrometallurgical process for the treatment of steel mill electric arc furnace (EAF) dust that contains agglomerates of small ferrite particles and larger magnetite particles, the ferrite particles coating by adsorption the larger magnetite particles, the dust further containing calcium and toxic amount of leachable lead together with minor elements selected from the group consisting of Mg, Cr, Cu, Cd, V, and chlorides.

Ferrites represent a complex family of compounds represented chemically by the major elements Ca, Fe, Zn, Mg, which are the major and important elements in this process together with minor elements selected from the group consisting of manganese, chromium, copper, cadmium, lead, vanadium and chlorides. Most of the elements are represented as oxides; either complex oxides like the ferrites or simple oxides represented by PbO, ZnO, CaO, etc. Some other salts and metals are also present. This process also applies to EAF dust with low zinc content generated from the use of pre-reduced iron ore pellets of hematite.

The process steps according to different preferred variants of the process are illustrated in FIGS. 1 to 6, for the different grades of pigments. They show a hydrometallurgical batch process with no atmospheric emissions. The dust slurry of the first washing step is composed essentially of ferrites (65-75%), magnetites (20-28%), zincite (ZnO) and litharge (PbO) (8%), CaO/Ca(OH)2 (5-12%) and variable concentrations of silica and coal.

One difference between the process of the invention and the prior art of EAF dust treatment processes, lies in the fact that the profitability of the present process must not necessarily be a function of the zinc concentration of the EAF dust. One of the steel mills that will be seen in an example uses an EAF feed of at least 50% pre-reduced hematite, with 50% scrap iron of different grades. Depending on the required production, the percentage of hematite and scrap iron can vary. For this steel mill, the dust's average zinc concentration is close to 9% compared to 16-22% for dust generated from feeds composed of scrap iron only. Table 1 shows two chemical analyses of EAF dust from the two steel mills in Quebec, that were used for testing the process.

The optimization and characterization of the test pilot run were effected by:

conducting physiochemical analyses: chemical analyses, granulometric distribution tests, and identification of chemical phases by X-ray diffraction and electronic microscopy, etc.;

optimizing the efficiency of the yield at different stations by measuring the volume and concentration (g/l) of the slurry, the weights of their solid fractions, and the processing time; the pH and electric conductivity of the liquids being also measured, etc.;

noting the pH and the electrical conductivity of the liquids;

evaluating the pigments by noting the color specifications of the solid, humidity, oil absorption capacity, quality of dispersion, and salt mist tests, etc.

3.1) First Treatment: Example

The process comprises a first treatment which essentially consists of washing and rinsing the EAF dust for reducing the amount of calcium and soluble lead, to thereafter facilitate further treatment of the dust to produce commercial grade pigments. This first treatment is described in general in relation to steps a) to e) here above, and will now be discussed in greater detail in relation to specific examples.

Washing and First Agitation

The EAF dust was washed with water under agitation provided by a hydrofoil impeller with a rotation speed of approximately 350 rpm in a tank. The height of the fluid level and the tank diameter had a ratio of 1:1. The tank agitation system also comprised four baffles, which acted as static agitators.

The concentration of the slurry was 16%. Tests were made with batches of 10, 20 and 30 kg of dust for 60 liters of liquid, corresponding to solid concentrations of 16, 32 and 48% respectively.

The washing provided:
an aqueous solution of alkaline pH>12;
a dissolution of soluble salts, heavy metals and simple oxides under alkaline conditions (see Table 2) (this chemical charge was the liquid that is eliminated by decanting and pumping the supernatant liquid);
the initiation of the break-up of ferrite particles that are weakly linked (FIG. 7);
the dissolution of CaO and some calcium ferrites into soluble calcium and $CaOH_2$, and the dissociation of lead oxide;
the transformation of the CaO fraction abundant in $CaOH_2$ and the dissolution of lead oxide;
It is worth mentioning that greater agitation with other types of cutting agitators may unfavorably result in elevated concentrations in Ca and Pb in the liquid, which could hinder subsequent treatment steps.

The duration of agitation was 60 minutes and it was followed by a decantation period of 60 minutes and a separation of the supernatant liquid. Given the high specific weights of the ferrites and magnetites, decantation of the slurry solid was used instead of filtration.

Rinsing and Second Agitation

The slurry from the washing was rinsed with water. Water is preferable:
to recuperate the metals and alcaline water of pH 12 from the interstitial water in the 20 liters of residual pulp of the first mixing; and
to continue the leaching of the calcium, lead and zinc in the dust.

The rinsing was carried out for a period of 60 minutes, followed by a 60 minute decantation and recuperation of the supernatant liquid.

Addition of Surfactant

The addition of a surfactant had various objectives in the process. Firstly, it reduced the positive charge of the fine particles of the pulp represented by a zeta of 32 mV in order to attain the isoelectric point (zeta of 0 mV) for the system (slurry). This reduction of the charge of the chemical phases of the system facilitated the fractionation of the composites. Further details on the effect of the surfactant on the charge of the chemical phases are given in the section entitled "Magnetic separation" hereinbelow. Secondly, when a phosphate such as sodium metaphosphate was used, the surfactant temporarily confined the CaO coming from the ferrites by coating the surface of the particles with phosphate. Also, the surfactant was able to convert the calcium already in solution into calcium phosphate, which was insoluble in the solution and was concentrated with solid. It was also believed that some of the lead in solution is also precipitated in the form of a lead phosphate or in the form of a calcium and lead phosphate phase.

These deductions are supported by titration of the slurry with sodium metaphosphate, which is the preferred surfactant (FIG. 8). The conditions of the tests whose results are shown in FIG. 8 were: 5% of solid in a slurry of 240 ml; titration with the sodium metaphosphate of 3.6% (w/w) (22 ml of the solution was used); zeta potential calculated by using a laser volume median; S.G. 4 g/cc. The graph showing Zeta vs. Surfactant Concentration, shows the reduction of the positive charge down to the isoelectric point. The graph showing Conductivity vs. Surfactant Concentration represents the concentration of ions in the supernatant liquid, which decreases with the addition of surfactant.

After the addition of surfactant, agitation was resumed in order to standardize the state of the mixture and the feed of the magnetic separator which was fed at a flow rate of 1 l/min.

The slurry was fed into the magnetic separator while agitating in such a way as to maintain the slurry homogenous in its magnetite and ferrite content throughout the tank.

After the agitation step and the two decantation steps, the alkaline solutions of the effluents (80 liters) were used in the effluent treatment. The alkaline liquid was mixed with the acid effluents of the second treatment which will be described further below, in order to neutralize their acidity and to promote precipitation of the metals in solution.

This first treatment (washing) of the raw EAF dust, which generated an alkaline solution, also promoted the solubilization of soluble salts in simple lead and zinc oxides to a concentration that satisfies the governing standards of the TCLP test, and the rules governing dangerous materials. In other words, the leachate of the dust did not exceed the TCLP (Table 3) standard and thus is neither considered as contaminated, nor held under the rules of dangerous materials.

The Role of Agitation in the First Treatment

Figure 7:
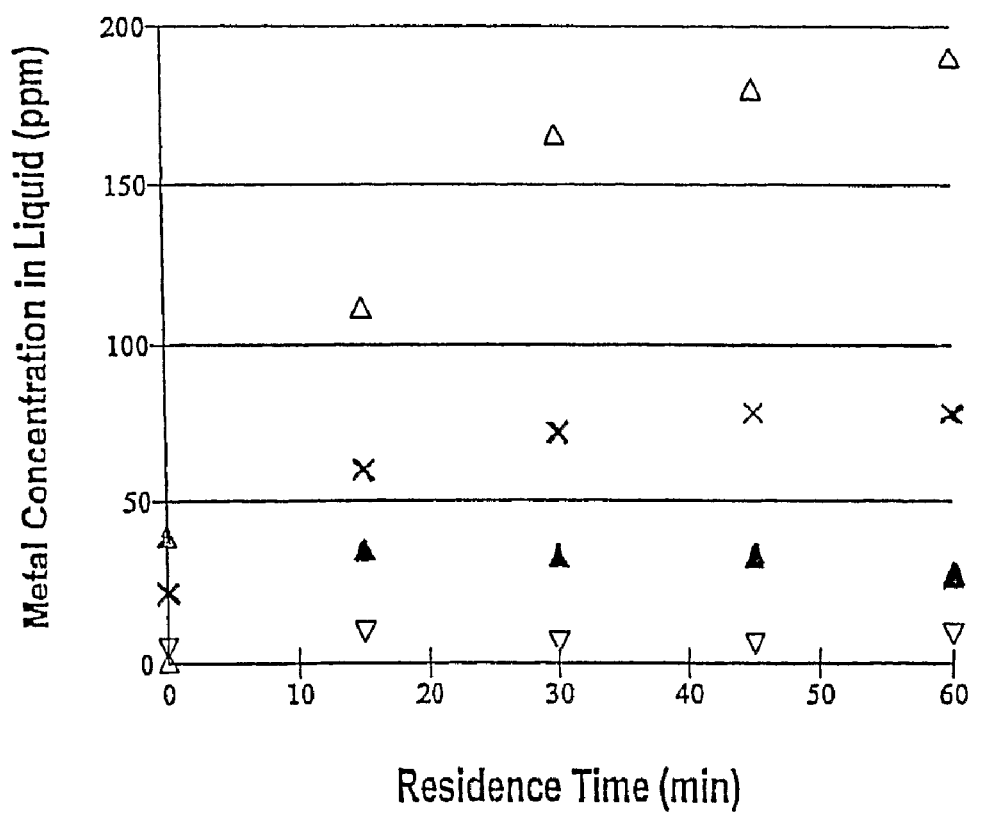
FIG. 7 is a graph showing extraction values for calcium, chromium, zinc and lead versus time, and using a hydrofoil impeller.

Agitation tests were performed under variable times from 15 to 60 minutes, using a hydrofoil impeller. The resulting granulometry of the solid fraction of the slurry, was obtained by a granulometer able to measure to the scale of a nanometer, according to the settings of number, surface and volume (FIG. 7). The corresponding granulometric variation after 60 minutes indicated an acceptable size, with a median of roughly 0.6 μm for the solid. This diameter was further reduced during the leaching of the second treatment. With other impellers, which had higher shear levels, the resulting granulometry was too fine for optimizing the first treatment. Other agitation tests, in which the supernatant liquid was analyzed after filtration for lead and calcium content, were performed and the results are presented in Table 7, and in FIG. 9. The chemical concentrations resulting from the test with the hydrofoil impeller indicated a stable concentration for an agitation time of 60 min. This agitation time represented a maximum for the extraction of calcium, and a plateau of saturation for the value of lead. For the other impellers, the elemental concentrations were too high, and thus not optimized.

TABLE 7

LEACHING OF EAF DUST DURING THE FIRST TREATMENT AT VARYING TIMES
Run#1: 10 kg on the system of Results of the AAS Analysis
1T of the pilot plant

| time min. | Pb ppm | Ca ppm | Cr ppm | Zn ppm | pH |
|---|---|---|---|---|---|
| 0 | 22 | 0.6 | 39.71 | 4.88 | |
| 15 | 60 | 111.1 | 35.53 | 9.72 | |
| 30 | 72 | 166.1 | 33.3 | 6.48 | |
| 45 | 78 | 180 | 33.3 | 6 | |
| 60 | 78 | 190.3 | 27.17 | 9.18 | |
| Washing | | | | | |
| 15 | 77 | 323.4 | 5.31 | 3.7 | 12.67 |
| 30 | 77 | 352 | 4.92 | 3.74 | 12.69 |
| 45 | 88 | 226.6 | 4.5 | 4.18 | 12.71 |
| 60 | 88 | 172.7 | 4.81 | 4.36 | 12.72 |

Figure 5:
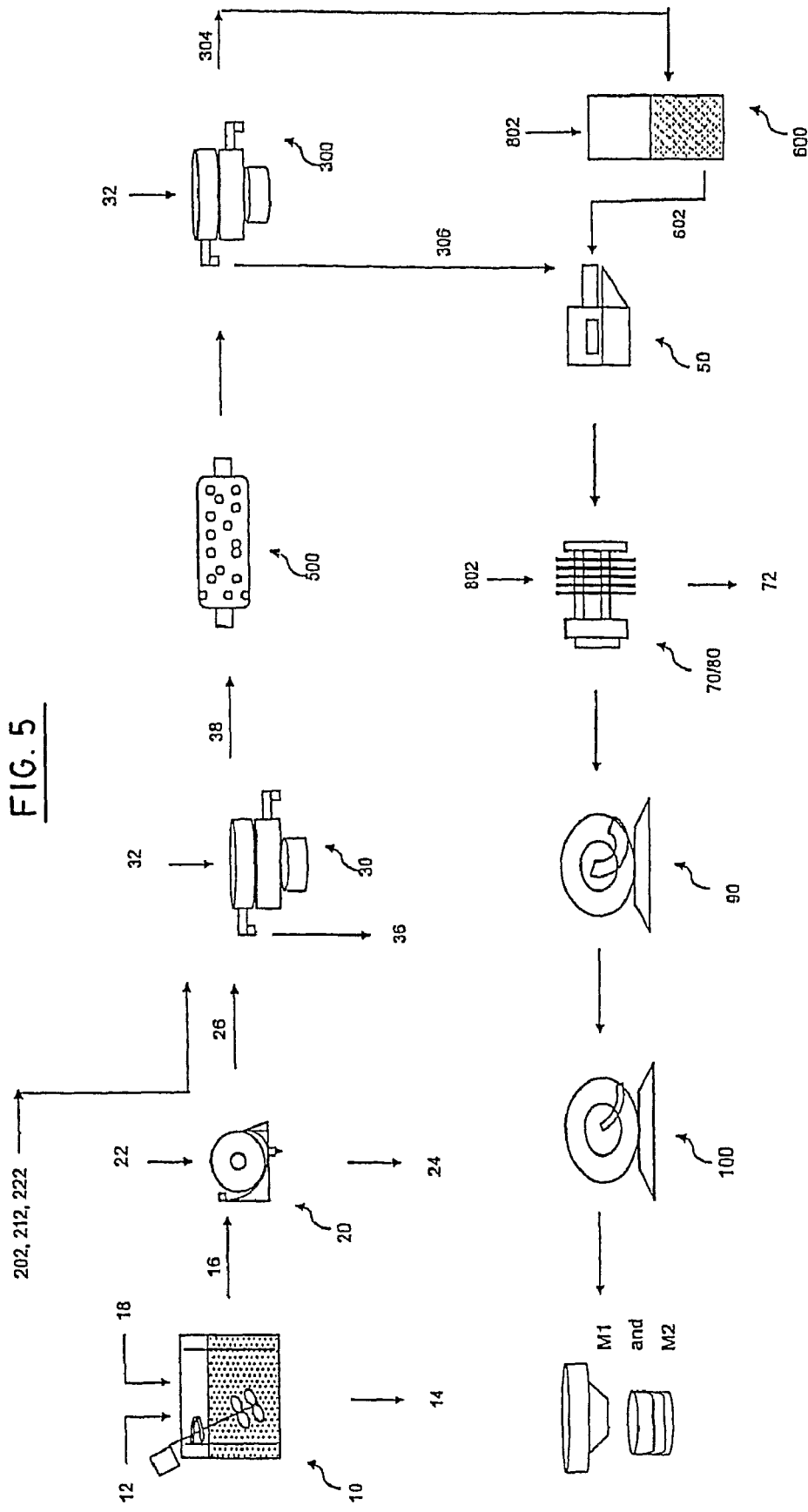
FIG. 5 is a flow chart of the process showing a fifth and a sixth variant suitable for producing magnetite pigments of the first grade and the second grade.
Figure 6:
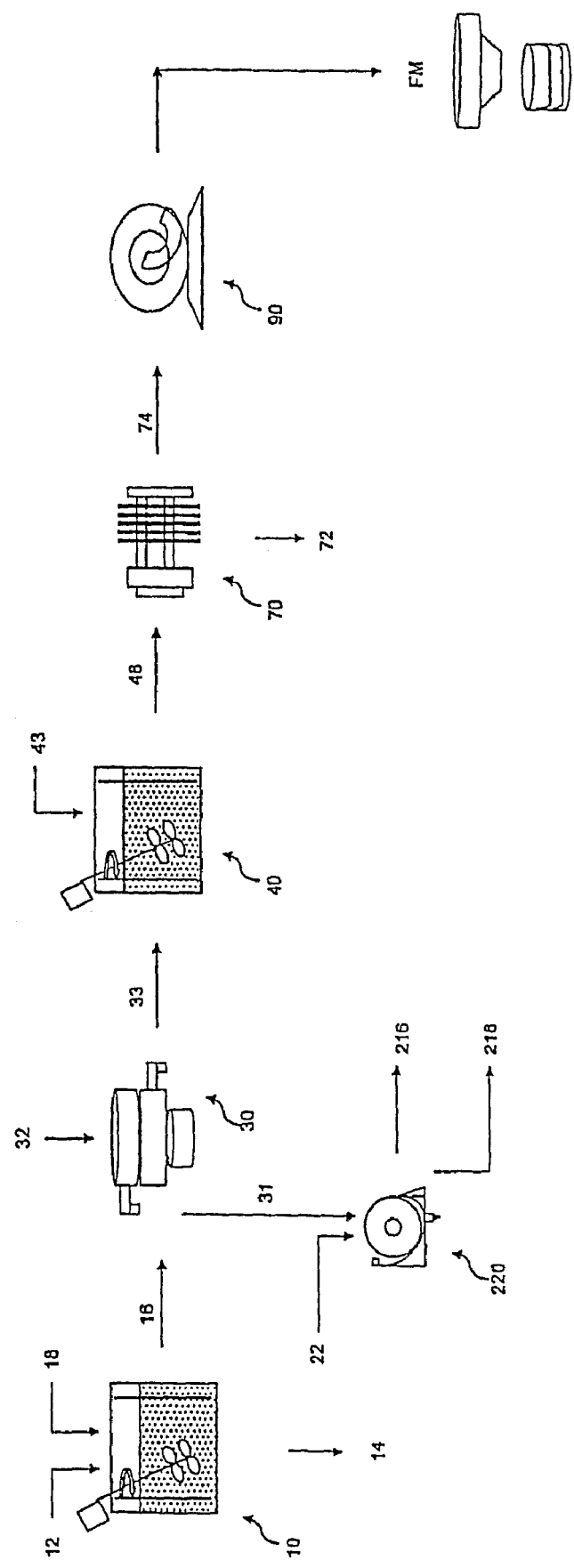
FIG. 6 is a flow chart of the process according to a seventh variant suitable for producing ferrite/magnetite pigments.

After the first treatment which is performed in the tank (10) of FIGS. 1 to 6, the slurry (16) is either sent to the magnetic separation (20) to separate the magnetite particles and the ferrite particles, as in FIGS. 1 to 5, which show the first to sixth variants; or it is sent to screening (30) and thereafter to the second treatment (40), as in FIG. 6 which shows the seventh variant, to ultimately produce a pigment of ferrite and magnetite suitable for use as a colorant for concrete.

The first to the sixth variants, which concern the production of ferrite pigments (FIGS. 1 to 4) and the production of magnetite pigments (FIG. 5), will now be described in further detail while referring to FIGS. 1 to 5. For each of these variants, as broadly described, the slurry (16) from the first treatment was subjected to a magnetic separation (20) to obtain a ferrite fraction (24) and a magnetite fraction (26). Both these fractions (24 and 26) were respectively subjected to a screening (30 or 300).

Referring to FIGS. 1 to 4, the refined ferrite fraction (34) from the screener (30) was further subjected to a second treatment (40) depending on the grade of ferrite pigments produced. In the case of the third and fourth variants (FIGS. 3 and 4), the second treatment was preceded by at least one of the following steps: decantation (60), grinding (50 or 55), and magnetic separation (200). After the second treatment (40), the slurry (46) obtained was subjected to filtration (70), and thereafter to the typical process steps used in the field of pigment production, as for example drying (90), coating (80) and micronization (100).

The filtration step (70) produces water to be recycled (72).

It is also worth mentioning that in the first and the third process variants, the second treatment was preferably followed by a second magnetic separation (200, 220) used to separate the magnetite fraction (202, 222) that remained in the slurry (46) from the ferrite fraction (206, 226). The ferrite fraction (206, 226) was sent back to the ferrite production line for producing the ferrite pigments, whereas the magnetite fraction (202, 222) was sent to the magnetite production line.

Referring to FIG. 5, the magnetic fraction (26) from the magnetic separation (20) was sent, preferably with magnetic particles (202, 212, 222) from other steps of the process, to a first screening (30) at 150 μm. The fraction (38) of less than 150 μm was sent to a ball mill (500) and then to a second screening (3000) to obtain a first finer fraction (304) with particles having a grain size of 6 μm or less; and a coarser fraction (306) with particles having a grain size greater than 6 μm. The coarser fraction (306) was then milled and screened at 40 μm (these steps are not shown on FIG. 5) to finally obtain a coarser fraction containing particles having a grain size between 40 and 6 μm.

The coarser fraction (306) was wet grinded by attrition (50) to attain a mean grain size of approximately 0.3 μm. It was thereafter subjected to the typical process steps used in the field of pigment production, as for example drying (90), coating (80) and micronization (100).

The finer fractions (304) were purified by suspending (600) residual contaminants contained therein with an anionic surfactant (802), to obtain a purified magnetic fraction (602).

Magnetic Separation (20)

The magnetic separation step (20) yields the first fraction (24) containing in a major portion ferrite particles and the second fraction (26) containing in a major portion magnetite particles.

In the raw EAF dust, the black magnetite is never apparent or visible to the naked eye, even though the magnetite is large and rough compared to the other components of the dust. This phenomenon is explained by the adsorption of the ferrites to the surface of the magnetites. In the raw dust, the ferrites are positive and the magnetite is negative, which causes an electrostatic attraction between these two chemical phases. This charge can be measured with an apparatus called "Electroacoustic Sonic Amplitude (ESA)", which enables the calculation of the zeta potential of the particles in aqueous medium, and the indirect and qualitative evaluation of the surface charge of the particles. The results indicate that ferrites have a positive charge with a zeta of +27 mV, whereas the magnetites are lightly negative and have a zeta of −3 mV, which corresponds to the charge values for naturally occurring magnetites. Also, given that the ferrites have a granulometry under 1 μm, they will coat the large rough surface of the magnetite. This rough texture of the magnetite surfaces seems to be produced by the deposition of phases of calcium and other composites which can be removed by attrition. These factors render it difficult to separate ferrites from magnetites. Laboratory experience teaches us that without a surfactant, it is possible to obtain a fraction concentrated in magnetite, but this fraction is brown and not black, and has a large proportion of ferrites trapped with the concentrated magnetite.

In the process according to the invention, by adding an anionic surfactant (preferably sodium metaphosphate), the positive charge of the ferrites is neutralized and can be inverted to attain negative charges with an intensity of −40 to −160 mV, and lower. The addition of surfactant increases the surface charges of the fine ferrites, decreases the cohesion or the attraction between the ferrites and magnetites, causes a stronger repulsion between the particles of ferrites and maintains these ferrites in suspension. The coarse magnetic fraction, which has a very small specific surface, is not greatly affected by the addition of surfactant. The granulometry and the mass of the magnetites enable the decantation of the magnetite with the ferrite in suspension. This procedure substantially improves the results of the magnetic separation and the screening. The condition at the isoelectric point is preferable in order to optimize the magnetic separation and the screening (see next section), while controlling the concentration of lead in the solid.

Evaluation of the Results

Magnetic separation in aqueous medium was performed with a drum for which a magnetic field was generated by an electro-magnet with a maximum power of about 1200 gauss. The slurry (16), which had a concentration of solids of 16% and a mass concentration of surfactant varying from 0.1% to 1.3%, was used in the separation. Magnetic separators are well known and do not need further description. The slurry (16) was fed with a flow rate of 1 l/min. To unstick the magnetic fraction from the drum, an additional flow of water (22) of 1.4 l/min was added, totaling 150 liters of liquid (to recycle) with a concentration of 3% solids to be recuperated by decantation (60) and screening (30).

The maximum fraction of magnetite recuperated in the pulp varied from one company to another according to its production. However, the maximum fraction recuperated was on the order of 15 to 20% for the producer using a pre-reduced hematite mineral and between 8 to 10% for the producer using scrap iron only.

The quality of separation was qualitatively evaluated under the microscope by observing the color, which distinguishes magnetite from coal. Color is also used to evaluate the quality of magnetic separation. Table 8 compares the three components of color, according to the HunterLab color scale, for the raw dust for separation, and for the separated and screened fractions of ferrites and magnetites. The parameter "L" of 0.00 corresponds to a black standard used to calibrate the apparatus whereas the value 100.00 is associated with the white standard. The parameter "L" indicated a paler shade for the fractions obtained without the addition of surface active, and which, in consequence, only contained a concentration of magnetite still coated with brown ferrites. On the contrary, with the addition of surface active, the magnetic fraction was of a blacker shade according to the optical apparatus and also according to the naked eye.

TABLE 8

COLOR COMPARISON FOR THE EAF DUST, FERRITE AND MAGNETITE, SEPARATED BY MAGNETIC SEPARATION (MSP)

| Samples | Color | | |
|---|---|---|---|
| | L | a | b |
| Raw Dust from mill 2 | 29.09 | 2.52 | 8.60 |
| Sample before MS with 0.4% NaMP | 28.63 | 2.05 | 8.01 |
| Sample after 20 μm Screening | 28.30 | 1.75 | 7.67 |
| Sample of Raw Magnetite <38 μm | 25.73 | −0.23 | 3.08 |

The efficiency of the magnetic separation is supported by the mass values of the quantity of ferrite trapped by the magnetite. The weights of the fractions indicate that without the addition of surfactant, the ferrite trapped by the magnetite reached a maximum. On the other hand, with the addition of a surfactant, the quantity of ferrite decreased (Table 9). The adsorption of the surfactant occurred preferentially on the fine fraction of the solid and thus in this case, on the ferrites. The magnetites, being rougher, experienced a change in charge that is less significant and thus there less of an effect on the mobility of this phase.

TABLE 9

QUANTITY OF FERRITES TRAPPED BY MAGNETITE AS A FUNCTION OF SURFACE ACTIVE

| Tank | Base | NaMP | MS <6 μm g. | Average weight g. | Difference with v. without NaMP in g. ou % |
|---|---|---|---|---|---|
| B99# 143 | MP-060/ISP | without | 1933 | | |
| B99# 144 | | without | 1990 | 1961 | |
| | | | | | 142 g. or 7.2% |
| B99# 145 | | with | 1849 | | |
| B99# 146 | | with | 1790 | 1819 | |
| S99# 71 | MP-060-070-120/STE | without | 712 | | |
| | | | | | 45 g. or 6.3% |
| B99# 68 | MP-060-070-120/STE | with | 667 | | |

Another indication of the efficiency of the separation is provided by the results of the tests of recuperation of magnetite obtained from the rough fraction≧20 μm after screening the non magnetic fraction. This ferrite fraction comprised rough contaminants (i.e. coal) and magnetite, with a smaller amount of fine silica and carbonates or calcium phases. The magnetite was not separated in the first magnetic separation as it was coated with silica and phases of calcium. The trapped quantity varied with the quantity and concentration of the added surfactant. For a separation without surface active, 197 g of rough magnetite was recovered. The same fraction after having added the surface active resulted in a recuperation of 221 g, or 11% more magnetite recovered. This result is explained by the fact that the surface active is more efficient in dispersing fine particles, and thus the finer contaminants from the larger spheroids of magnetite; coal does not influence the separation.

For the process according to the invention, it is preferable to use the surfactant according to a specific dosage in order to produce two fractions (24 and 26) that are adequate for realizing products suitable for commercial applications, as will be explained in more details further below.

Screening (300 or 30)

Screening of the ferrite fraction (24) or the magnetic fraction (26) is essential to produce ferrite pigments or magnetic pigments having a commercial value, because it allows the physical separation of larger agglomerates and certain contaminants accompanying the ferrites and magnetites. All particles or agglomerated substances of more than 20 μm with or without magnetic susceptibility, can be separated. Coal and even partially fused scrap metal fragments are separated by screening.

Figure 9:
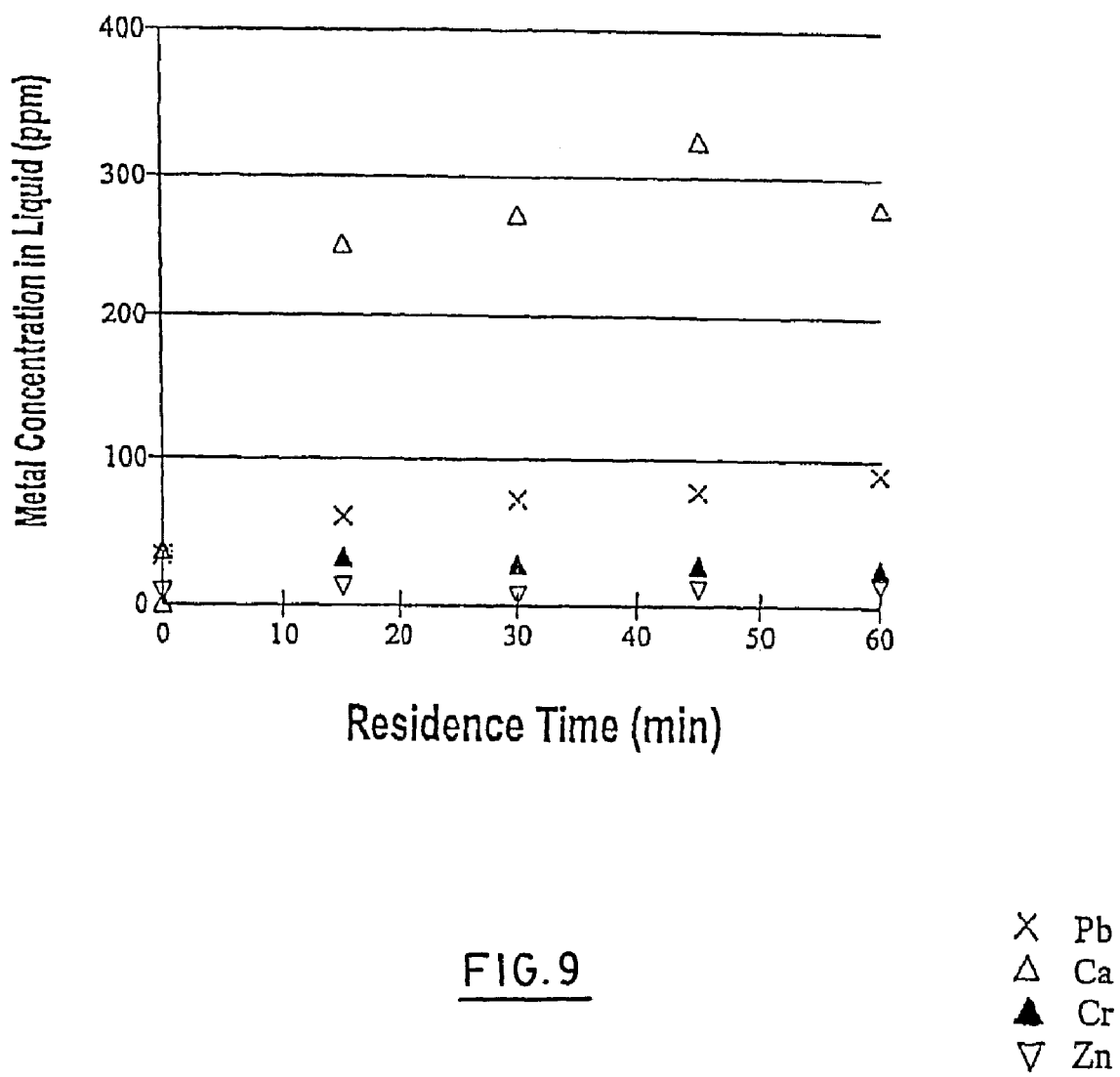
FIG. 9 is a graph showing extraction values for calcium, chromium, zinc and lead versus time, and using a high shear impeller.
Figure 10A:
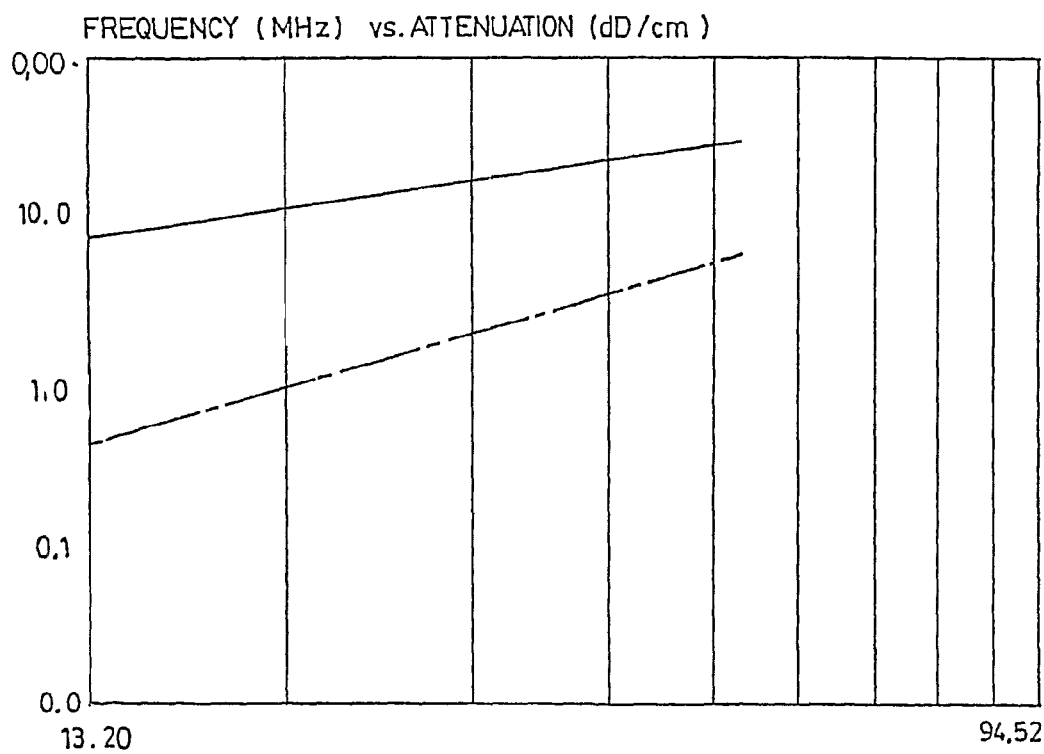
FIGS. 10 to 13 are graphs showing the granulometric distribution of the first fraction (ferrite fraction) after one or two passes in the grinder
Figure 10B:
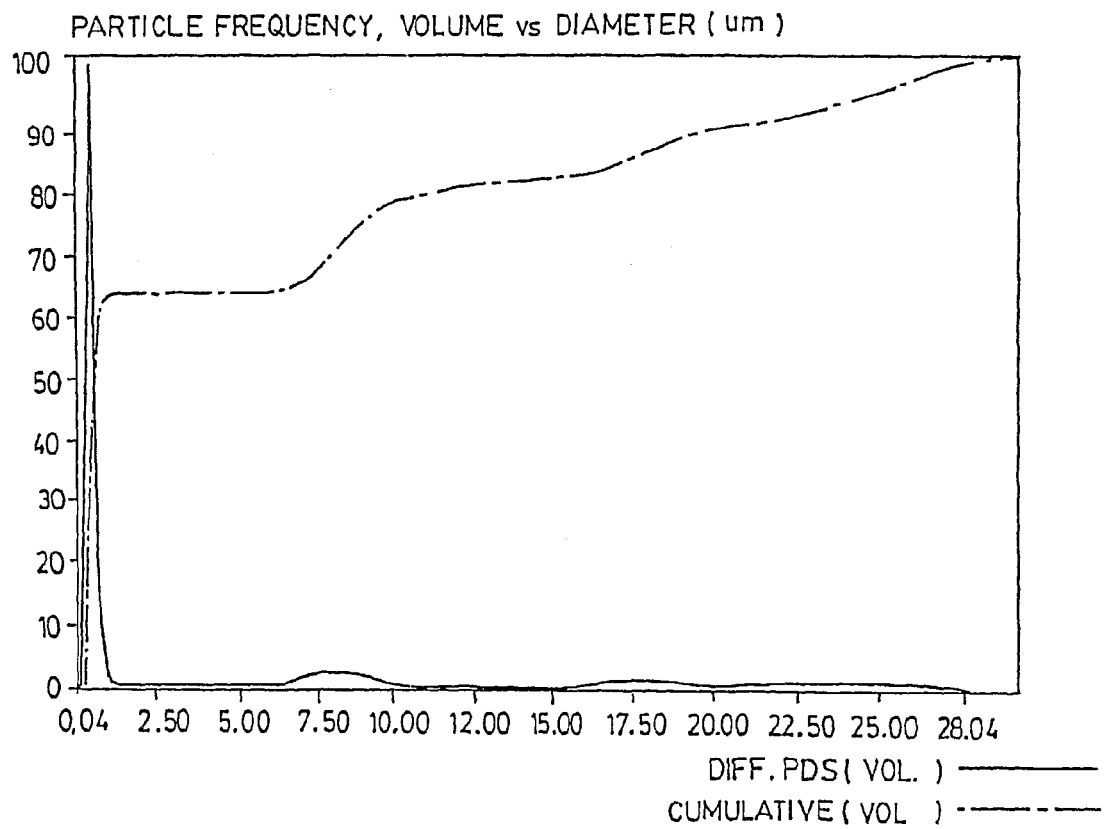
Figure 10C:
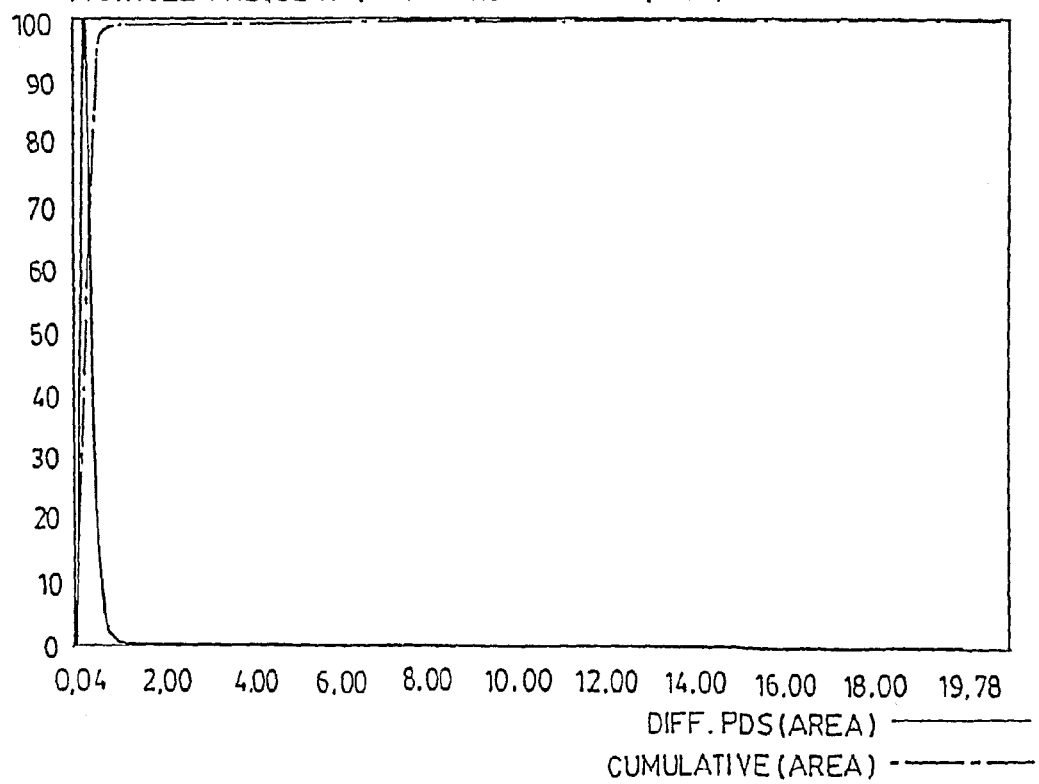
Figure 10D:
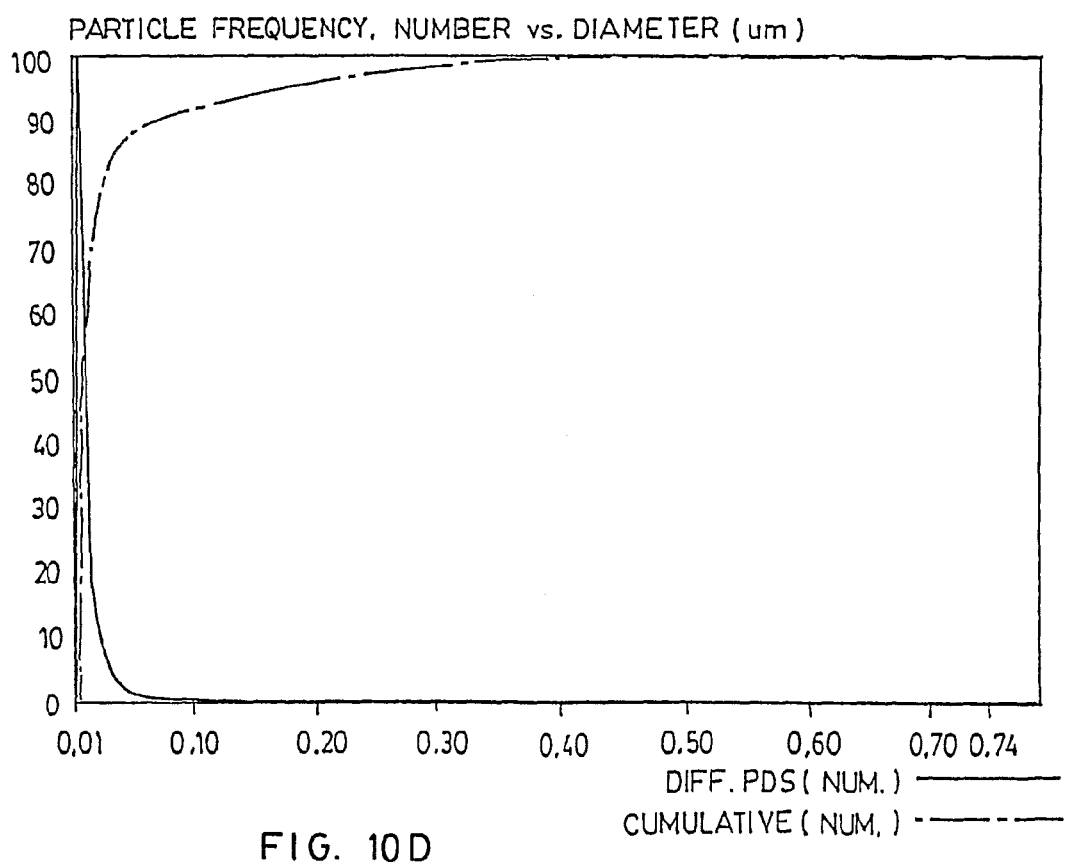
Figure 11A:
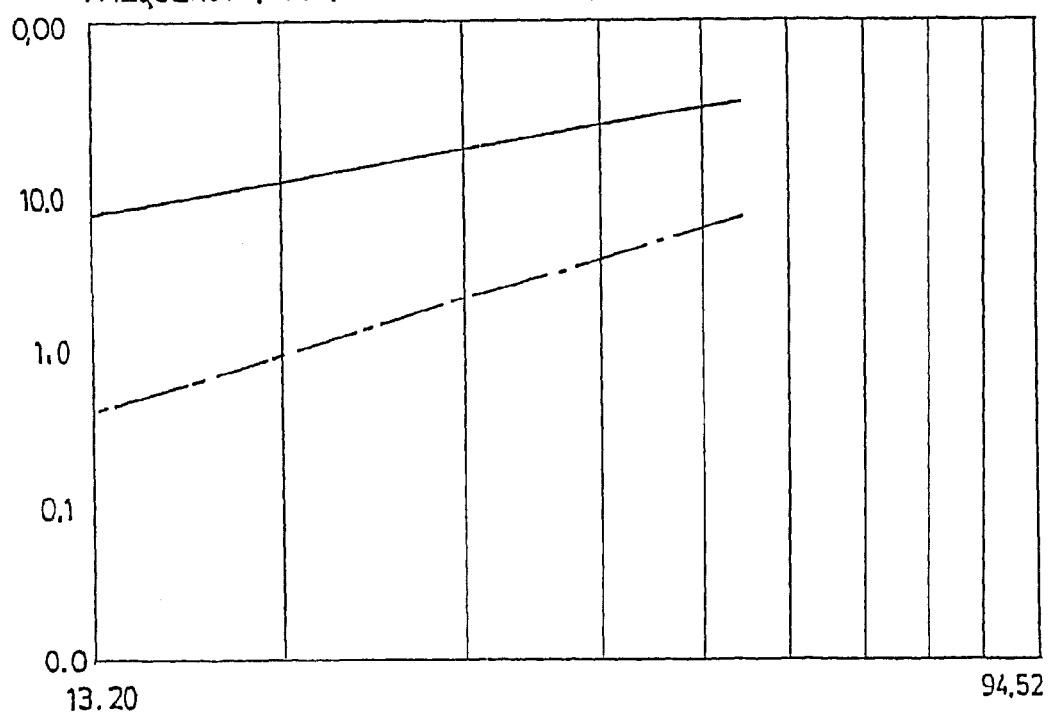
Figure 11B:
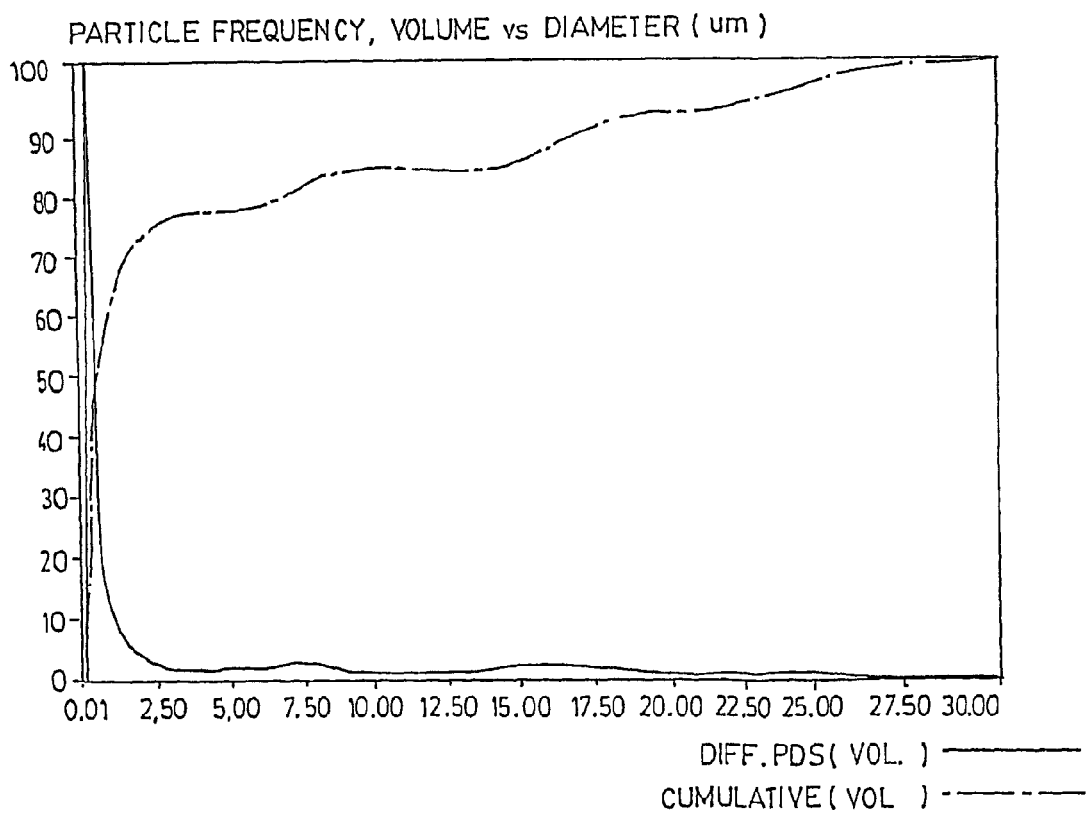
Figure 11C:
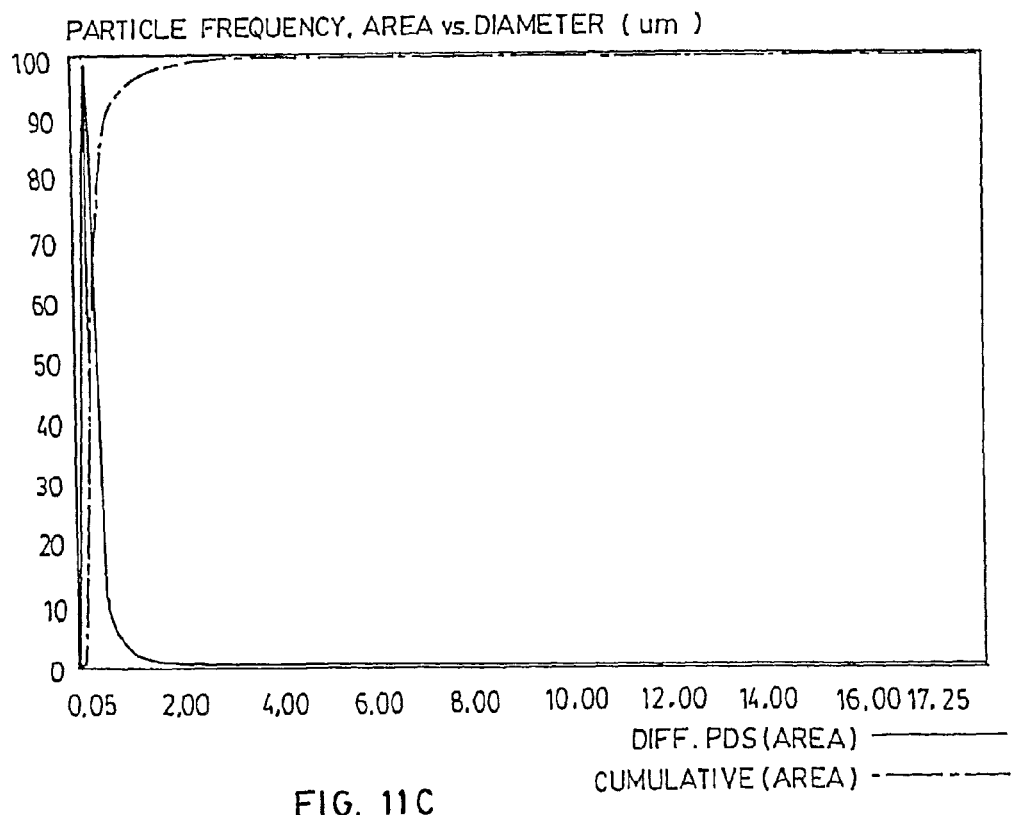
Figure 11D:
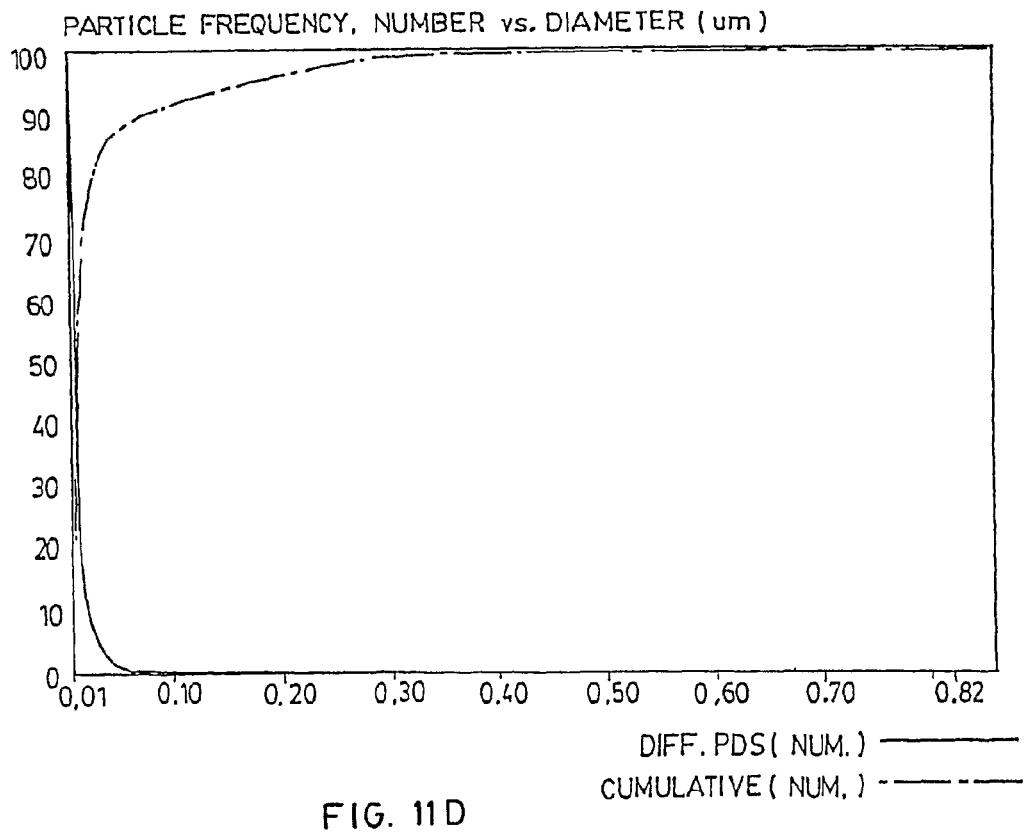

In addition to improving the separation of the ferrites and magnetites in the first treatment and the magnetic separation, the addition of surfactant prevents the clogging of the screens and enables screening with openings of 20 to 6 μm. The clogging is caused by portlandite, a calcium hydroxide $Ca(OH)_2$, which is produced from lime in the raw EAF dust. Portlandite in solution and in suspension is deposited on the walls of containers and, in particular, on the mesh of the screens, thus sealing the latter. By using an appropriate surface active (sodium metaphosphate), the calcium in solution is precipitated in the form of calcium phosphate. This precipitation is associated with the decrease in conductivity observed during the addition of surfactant and this decrease continues after reaching the isoelectric point, attaining, in certain cases, a minimum of conductivity (FIG. 9).

The screening tests demonstrated that the more the surface active concentration is increased, the more the solution approaches a minimum of conductivity and the less clogging of the screens is observed. Also, the inner walls of the tanks, screens and other equipment can be easily cleaned by simply rinsing with water.

If no addition of a surfactant is used, the portlandite which adheres to surfaces and screen mesh, must be cleaned with an acidic aqueous solution. The concentration of surfactant giving the minimum of conductivity is not preferred because such a high concentration of sodium metaphosphate interferes with the leaching of lead in the pulp.

The addition of surface active to give the isoelectric point was sufficient to double the slurry flow rate into the screens from 4 l/min to 7 or 8 l/min and thus increase the capacity of filtration. The addition of surface active decreased the number of required cleanings for a tank of 10 kg using a screen of 20 μm by a factor of three.

In addition to the slurry, a flow of water for screening (32) is used to facilitate the screening.

In the first to third variants, the rough screened fraction (36) issued from the first screening (30) was subjected to a magnetite separation (210) used to separate the magnetite fraction (212) that remained in the ferrite fraction (24). The magnetite fraction (212) was sent to the magnetite production line, as shown in FIG. 5.

Wet Grinding or Grinding by Attrition (50)

This wet grinding can be accomplished with silica sand, zirconium balls or other materials with a spherical morphology and sufficient hardness to resist abrasion. The results provided were obtained with the zirconium beads with a range of granulometry of 0.4 to 0.6 mm in a horizontal grinder, with horizontal type disks. The grinding conditions and results are presented in Table 10.

TABLE 10

WET GRINDING CONDITIONS AND RESULTS FOR FERRITES

1. Wet Grinding Conditions for Ferrites

| | Feed flow rate | Pulp conc.* | Disk speed | Amperage | Media | Load |
|---|---|---|---|---|---|---|
| Condition #1-2 | 0.2 l/min | 350 g/l | 27k FPM | 3.8 | Zr/Sr 0.4-0.6 mm | 80% |
| Condition #1-4 | 0.5 l/min | 350 g/l | 27k FPM | 3.7 | Zr/Sr 0.4-0.6 mm | 80% |

2. Wet Grinding Results for Ferrites

| | Surface area micron (APS) | Volume micron (APS) | Viscocity cps |
|---|---|---|---|
| Condition #1-2 | 0.276 | 0.432 | 810 |
| Condition #1-4 | 0.252 | 0.517 | 470 |
| pulp before grinding | 0.415 | 6.307 | 124 |

*The pulp used in the optimization tests is a B99

Figure 12A:
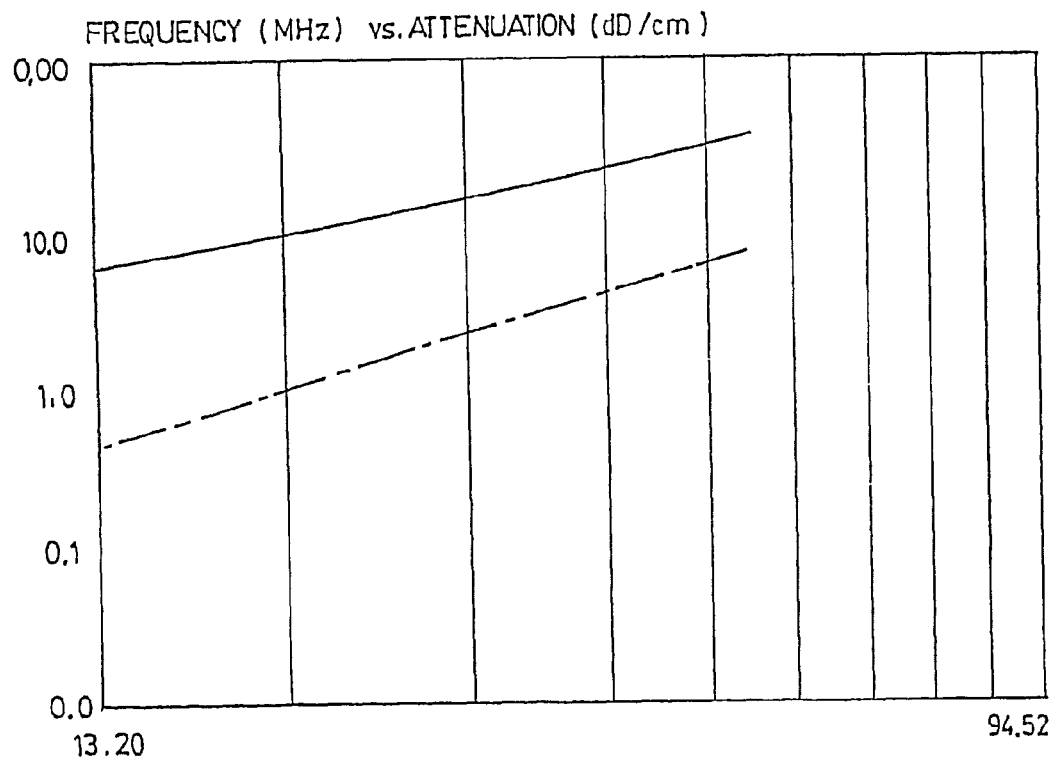
Figure 12B:
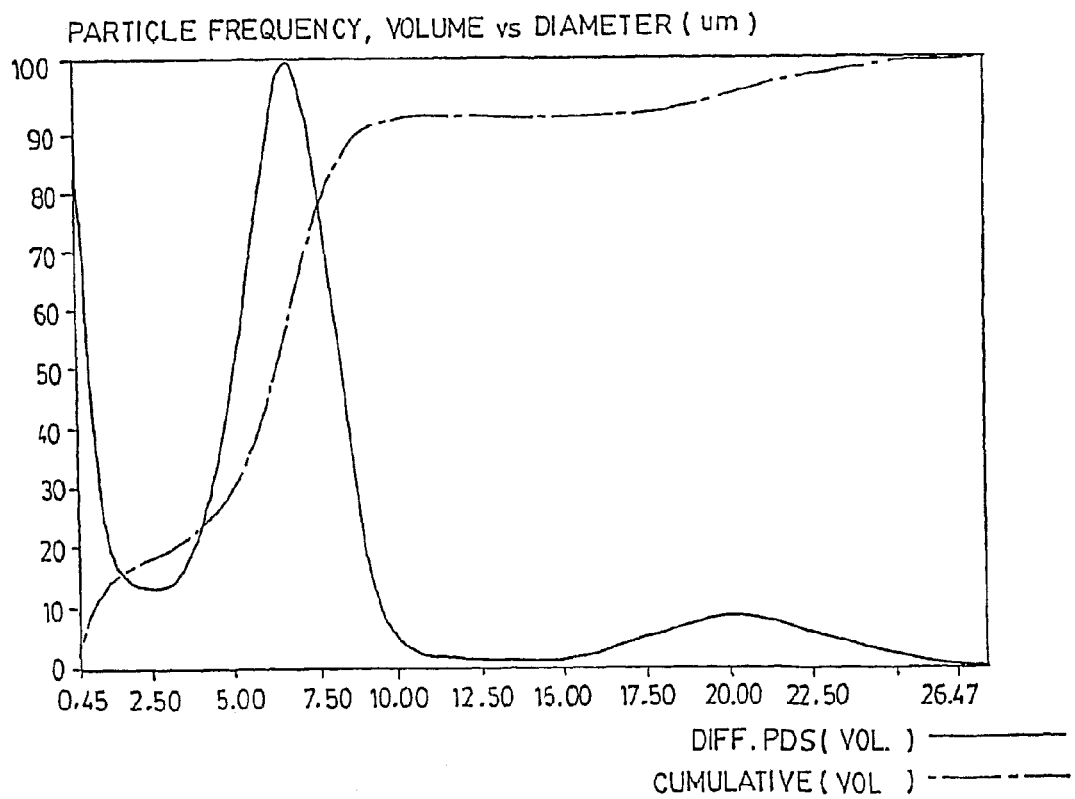
Figure 12:
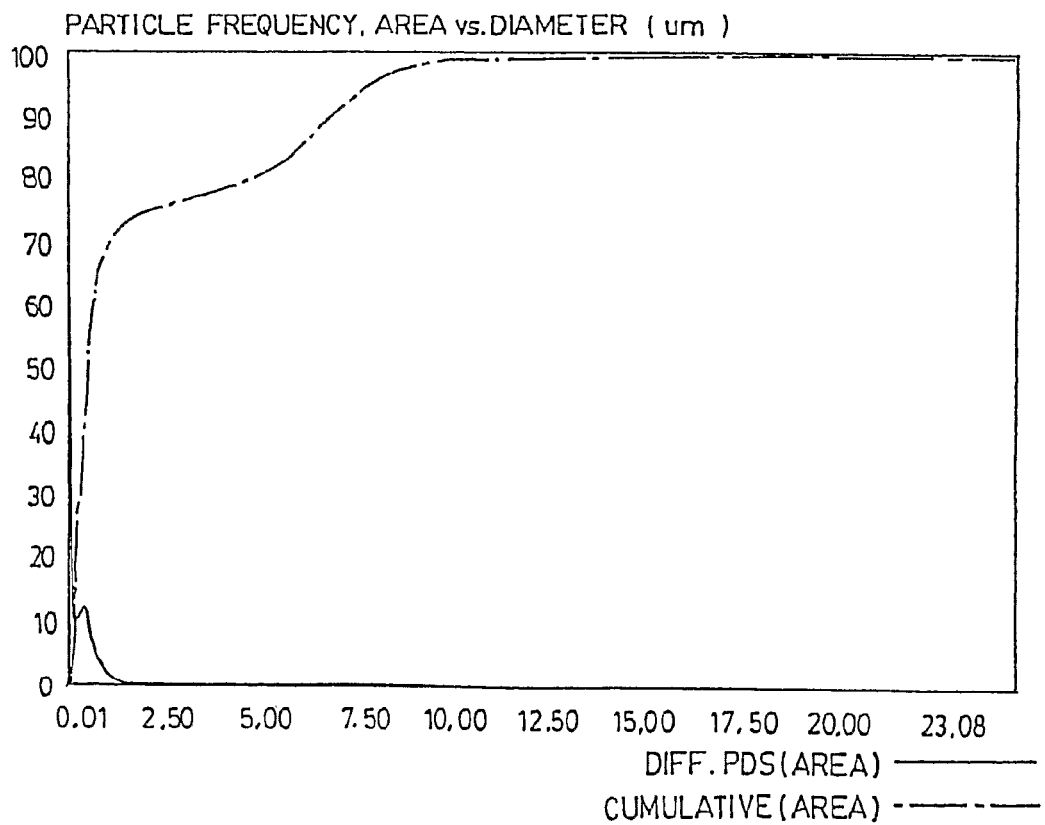
Figure 12D:
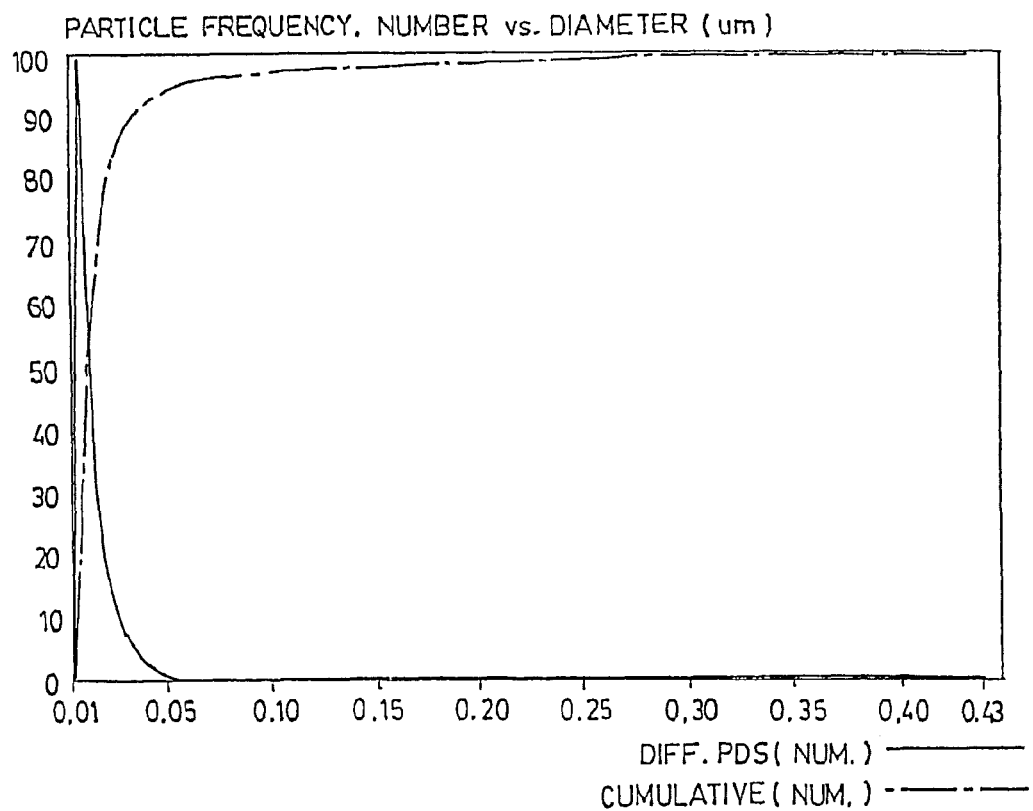
Figure 13:
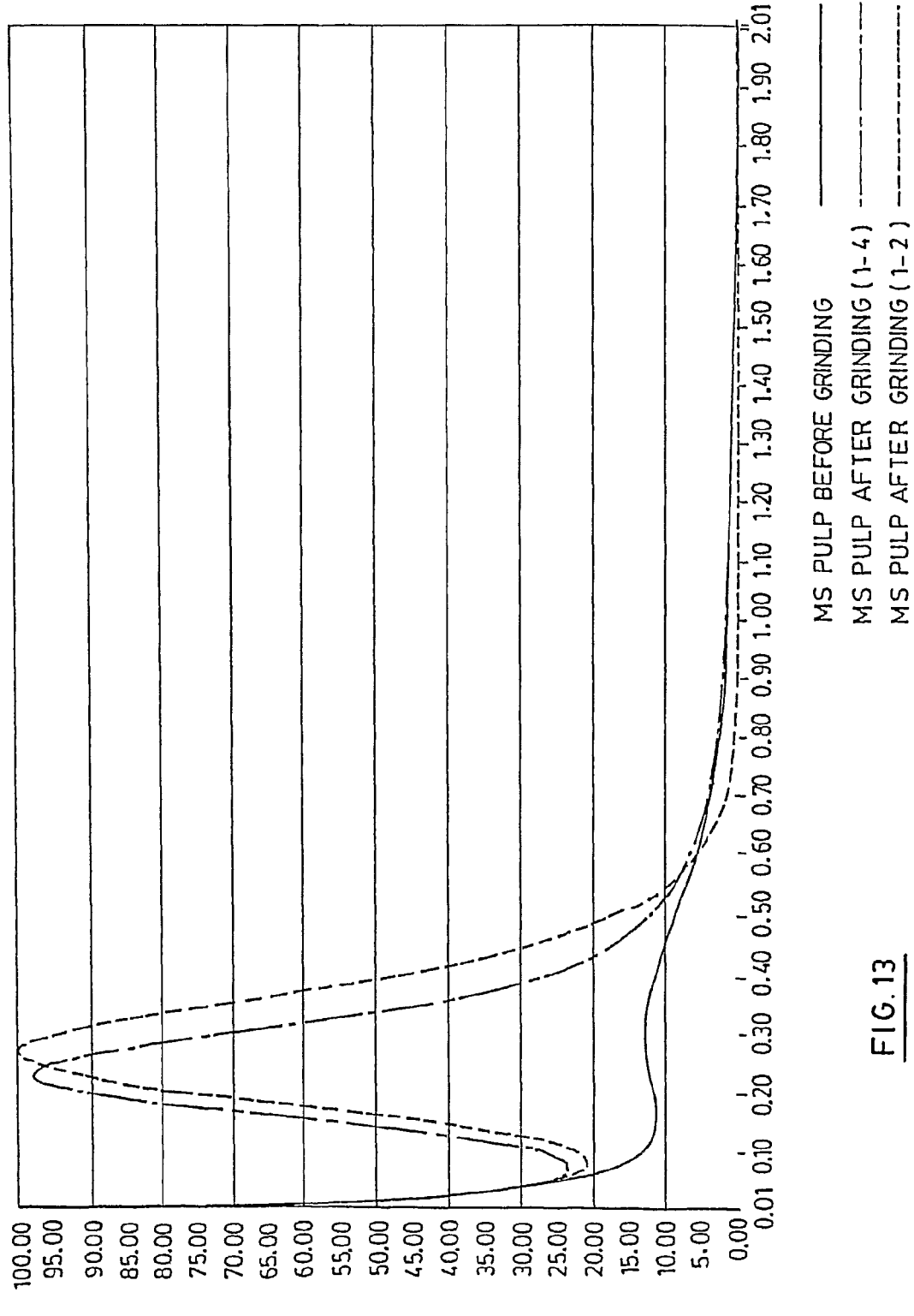

The goal of this grinding is to break the large aggregates of more than 5 to 20 μm in order to give the ferrite pigment particles a restricted range of granulometry, more specifically, a bell curve distribution with a median around 0.3 μm. The granulometric distribution after wet grinding assures that the fraction of rough aggregates of the dust is eliminated and transferred into the range of fine granulometry. The obtained diameter (in surface) is from 0.25 to 0.28 μm, with a bell curve distribution desired for the pigments. The results are illustrated in FIGS. 10, 11, 12 and 13. FIGS. 11 and 12 illustrate the granulometric distributions for slurries after one and two passes in the grinder. For more aggressive leaching processes, as for the second grade ferrite pigment, the slurry does not require grinding, the granulometric median being already close to or just under 0.8 μm. Normally, the first grade ferrite pigment requires grinding in order to obtain an adequate dispersion. Also, some dusts may contain enough aggregates around 20 μm as to require the use of a wet grinder. For cement additives, wet grinding is necessary, because it decreases the granulometry, increases the surface contact between the particles, and generates new surfaces for a more efficient leaching at the second treatment (40).

Figure 14:
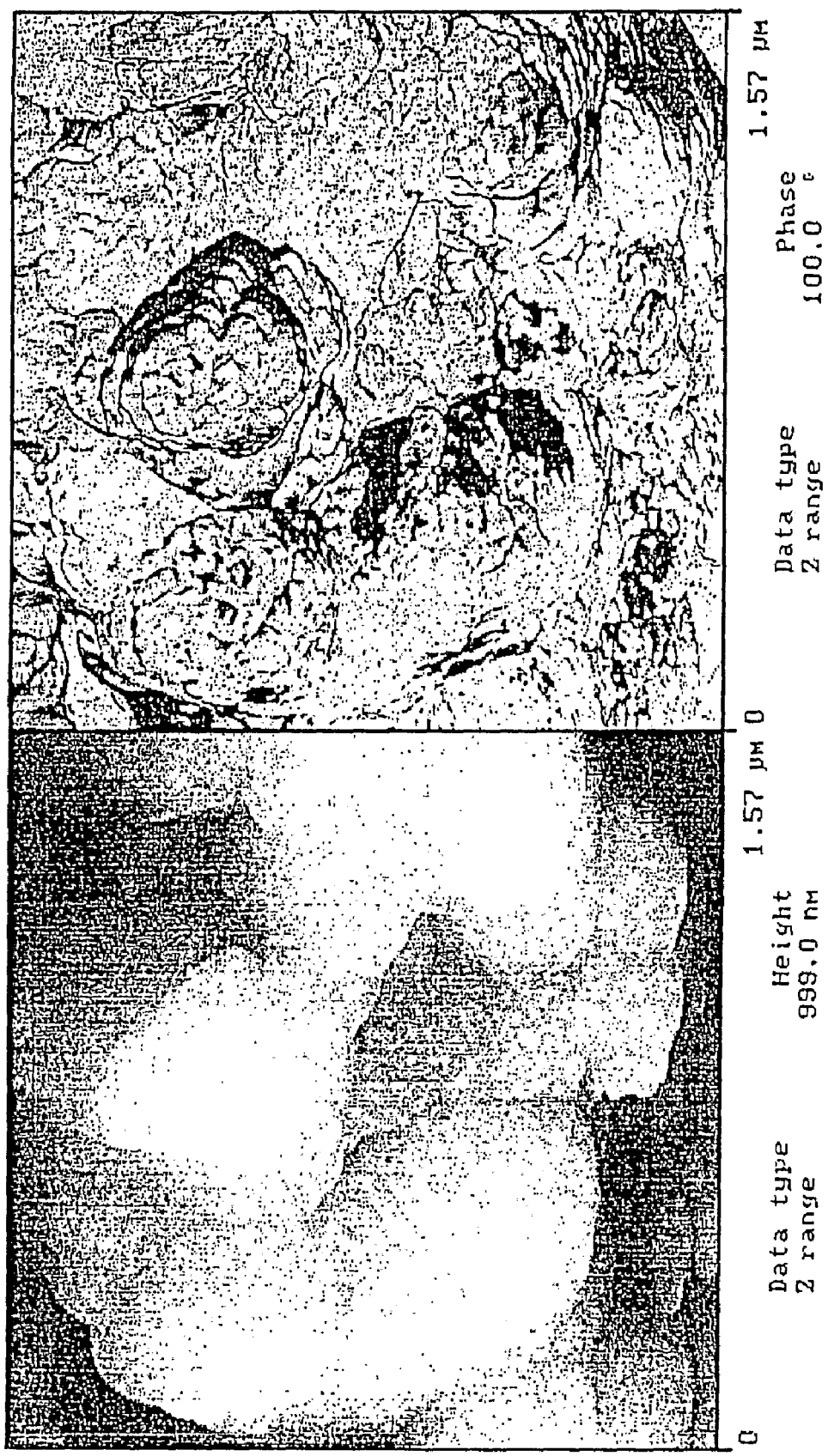
FIG. 14 is a photo of ferrite pigments taken with an AFM microscope after wet grinding by attrition, showing the state of agglomeration and the fine size of the constituent ferrite fragments.

The ferrite pigment particles, even after grinding, are still aggregates of fine nanometric particles. FIG. 14 (AFM microscope) confirms this state of agglomeration and the fine size of the constituent beads or fragments.

3.2) Second Treatment (40) of the Ferrite Fraction: Example

The goal of the second treatment (40) is to leach the heavy metals still in the slurry, to eliminate the less stable ferrites and give certain required surface characteristics to the pigments (sign and zeta potential intensity), in order to improve the pigment compatibility in paints, plastics and concrete.

The chemical composition of the pigmentary spinels resulting from the second treatment (40) is represented by the chemical compositions given in Table 11. These pigments represent various slightly differing ferrites or spinels rich in iron, zinc, magnesium and manganese and contain the elements Al, Si, Pb, Ni, Cr etc, as minority components. All minority components are stabilized in the structure of the spinels and the lead adheres to the leachate criteria of the TCLP and to the norms and expectations used by paint manufacturers of which the most stringent imposes a maximum concentration of 500 ppm of lead in paint.

TABLE 11

VARIATION OF CHEMICAL COMPOSITION OF THE PIGMENTS FERRITE AS A FUNCTION OF pH

| | | | SAMPLES | | | |
|---|---|---|---|---|---|---|
| Elements | Code | Units | Fm# 1226 pH 3.0 | Fm# 1217 pH 2.0 | Fm# 1314 pH 1.5 | Fm# 1491 pH 0.5 |
| AL | ICP90 | ppm | 4500 | 4000 | 4100 | 3400 |
| Ba | ICP90 | ppm | 70 | 51 | 45 | n.d. |
| C | CHM118 | ppm | 3700 | 3700 | n.d. | n.d. |
| Ca | ICP90 | ppm | 8800 | 5900 | 7200 | 6700 |
| Cd | ICP90 | ppm | 107 | 101 | 112 | 90 |
| Co | ICP90 | ppm | 11 | <10 | 47 | n.d. |
| Cr | ICP90 | ppm | 1580 | 1710 | 1920 | 1745 |
| Cu | ICP90 | ppm | 2560 | 2510 | 2600 | 2645 |
| Fe | ICP95 | ppm | >30 | >30 | >30 | 528100 |
| K | ICP90 | ppm | 600 | 400 | 500 | n.d. |
| Mg | ICP90 | ppm | 24600 | 26800 | 28700 | 30100 |
| Mn | ICP90 | ppm | 24450 | 27090 | 28260 | 25900 |
| Mo | ICP90 | ppm | <10 | <10 | 11 | n.d. |
| Na | ICP95 | ppm | 2700 | 2700 | n.d. | n.d. |
| Ni | ICP90 | ppm | 187 | 187 | 219 | n.d. |
| P | ICP90 | ppm | 11400 | 400 | 600 | n.d. |
| Pb | ICP90 | ppm | 10870 | 3780 | 3030 | 1685 |
| S | CHM12 | ppm | 100 | 100 | n.d. | n.d. |
| Si | ICP95 | ppm | 12900 | 8800 | n.d. | n.d. |
| Ti | ICP90 | ppm | 600 | 600 | 600 | n.d. |
| V | ICP90 | ppm | 108 | 110 | 102 | n.d. |
| Zn | ICP90 | ppm | 89140 | 91470 | 117300 | 100600 |

As an example, the effect of the second treatment is illustrated in Table 11 by the variation of lead for the different third grade pigment leached at different pHs with nitric acid. The most important variations are the lead concentrations and the zeta for the different pigments. The sign of the relative charge represented by the zeta potential in aqueous medium is particularly important, the latter changing from +40 mV for the first grade to −9 to 11 mV for the leached pigment at a pH of 1.5 to 0.5. This parameter is important for the behavior of the pigment and also influences the pigmentary properties and the coating mechanism, or even the type of coating it can accept, if required.

Conditions for the Second Treatment (40)

A pulp of 8 to 10% solids in 55 liters of water was acidified with nitric acid 6 N to the desired pH by continuous addition of acid for a period of 30 min. The pH was maintained for 60 min. by sporadically adding the acid while agitating the pulp. Decantation was preferred and the surpernatant liquid was removed.

In the first variant, simply water (37) is used as the leaching agent. In the second variant, sulfuric acid (42) is used, and in the third variant, nitric acid (43) is used as the leaching agent.

3.3) Production of the Ferrite/Magnetite Pigments (Seventh Variant): Example

Referring to FIG. 6, and in accordance with the seventh variant used to produce ferrite/magnetite pigment, the slurry (16) from the first treatment (10) was not subjected to magnetite separation. The slurry was rather subjected to a screening at the 60 μm or less. The coarser fraction (31) was separated into higher-magnetic (216) and lower-magnetic (218) fractions, by magnetic separation (220), and these fractions could be used in other parts of the process. The finer fraction, hereinafter referred as to the refined slurry (33) was subjected to the second leaching treatment (40) with nitric acid (43) at a pH of about 3, to obtain a leached slurry (48) with no or a controlled amount of ZnO which retards the setting of concrete. The leached slurry (48) was separated into a solid fraction (74) containing a mixture of ferrite and magnetite pigments and a liquid fraction (72) containing constituents soluble in nitric acid. The solid fraction (74) was then dried (90) to obtain dry pigments containing a mixture of ferrite and magnetite.

4) Characteristics and Pigmentary Properties of the Pigments

The ferrite-based and magnetite-based pigments produced by the processes described here above, have certain characteristics and pigmentary properties, some of which were measured and tabulated.

4.1) Characteristics of the Ferrite-Based Pigments

Of particular interest are the ferrite-based pigments produced by the above-described process and have anticorrosion applications. These ferrite-based pigments may be used in a paint formulation to coat a substrate, in particular a metal corrosion-prone substrate, to protect it from the corrosive effects of humidity, water and penetrating ions.

The ferrite-based pigments are formed from a condensation reaction of metal vapors of Fe with other metal vapors present in the EAF vessel, which include Zn, Mn and Mg. Zn metal vapors are involved in the reaction. This condensation reaction yields selected EAF dust with a particular composition of ferrites, magnetites, pollutants, and various oxides and metals, which are treated according to the hydrometallurgical process described here-above. It is with this process that the ferrite-based pigment is isolated from the selected EAF dust in a "non aggressive" manner, and is thus able to retain certain desirable properties that would otherwise be destroyed or modified.

The ferrite-based pigment thus contains a non toxic amount of lead, as the latter was leached out of the EAF dust.

The pigment further includes condensed metal oxides. These oxides comprise a diverse array of ferrites, which were formed by the condensation reactions and which include zinc ferrites, magnetite (iron ferrites), calcium ferrites, magnesium ferrites, manganese ferrites, and also minor amounts of other metal-based ferrites. The general formula of the ferrites is $MOFe_2O_3$, where M is one or more of the aforementioned metals. Of course, other metals may form many ferrite complexes and other compounds as well. A general formula for a multiple metal ferrite complex, for example, is $(Mn_xZn_y Fe_{1-x-y})Fe_2O_4$.

It should be noted that the ferrites of the ferrite-based pigment may include magnetites. The degree to which the magnetite is present depends primarily on the magnetic separation step of the hydrometallurgical process. Thus, non-magnetic ferrite-based pigments may be obtained insofar as the magnetic field was able to magnetically remove the magnetic fraction from the non-magnetic ferrite fraction.

Preferably, the ferrite-based pigment contains Zn-based ferrites, which may also include Mn.Zn ferrites. These ferrites are in fact preserved from the EAF dust, which contains a plurality of Zn and Mn based ferrites.

The condensed metal oxides thus include ferrite or ferrite-like structures substantially preserved from the EAF dust. These structures form aggregates of ferrite and ferrite-like structures of varying sizes. The aggregates may also contain filler material of virtually inert compounds, which are often found in pigments for use in paints. As mentioned here-above, the granulometry of the pigments may be calibrated by various grinding steps to bring the aggregate size to the desirable median. The aggregate size and shape are also influenced by the specific leaching steps and pH level used to purify the pigment product in the second treatment. This will be further detailed here-below.

The ferrite-based pigment also includes CaO entrapped by the ferrite or ferrite-like structures. This CaO is at least partially available to react with humid air and/or water to protect the substrate against corrosion. The entrapped CaO is a result of the suspended CaO particles that became associated with condensing metals in the formation of the ferrite structures. The CaO is also a result of the agglomeration phenomenon, wherein the ferrite or ferrite-like structures become bound together in part by the action of the CaO. Thus, the CaO is entrapped by being both associated between the ferrite structures to help form the agglomerates (so-called "first portion") and associated within the ferrite structure itself (so-called "second portion").

The entrapped CaO is not, however, all permanently chemically or physically fixed in a certain state, but is rather at least partially available to react with humid air or water. More specifically, the CaO that holds the agglomerates together is most readily available for reactions. These pigments react with water, humid air and/or oxidizing conditions by releasing or yielding CaO that is trapped within the aggregates formed of nano particles of ferrites and also within the lattice of the ferrites. The CaO displays an exothermic reaction with water and is viewed as the first compound to react having a higher energy state. The primary reaction is the following:

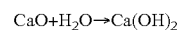
$$CaO+H_2O \rightarrow Ca(OH)_2$$

This reaction has the immediate effect of locally increasing the pH at the surface of the pigment. This reaction also has the effect of triggering other chemical reactions. As the pH conditions change and the CaO within the aggregates is depleted, a variety of physical and chemical phenomenon may occur. Thus, the CaO that is initially available for this triggering reaction may be termed as "sacrificial calcium".

The first portion of CaO is most readily available to act as sacrificial calcium. However, the second portion of CaO will become more available as the first portion is depleted, the former thereby replenishing the sacrificial calcium. This is particularly advantageous to provide the pigment with long-lasting anticorrosion properties.

The sacrificial calcium may also trigger the formation a variety of protective hydroxide phases, depending on the concentration of calcium and the composition of the ferrites, aggregates and filler of the pigment.

Preferably, the protective hydroxide phase comprises $Zn(OH)_2$, which may be observed in the form of a precipitate. In some of the salt-spray tests, a precipitate of white film comprising $Zn(OH)_2$ as observed. Of course, depending on the other reactions and the degree of the corrosive environment and the resulting iron oxides present, the precipitate may be orange-colored. The precipitate was seen to occur in a film covering the metal substrate. This type of corrosion protection could be characterized as "self-healing," as the exposed metal surface is coated and "healed" by a physical layer of $Zn(OH)_2$ for protection.

Also preferably, the protective hydroxide phase comprises one selected from amorphous calcium hydroxide phases and portlandite. Portlandite is the crystalline form of calcium hydroxide that was identified by X-ray diffraction.

Also preferably, the protective hydroxide phase comprises a calcium-zinc hydroxide. A plurality of calcium-zinc hydroxide phases are possible, but a preferable one is a crystallographic phase presenting a crystal structure analogous to that of $CaZn_2(OH)_6$ hydrate.

Furthermore, the protective hydroxide phase may comprise an iron-calcium-zinc hydroxide. The preferred one of such phases is $Fe(CaZn)_2(OH)_8$ hydrate that is in all probability present in the measured diffraction spectrums.

In some cases, such as for $Zn(OH)_2$, the hydroxide phase forms a physical protective layer on the metal substrate to help physically protect the metal substrate from penetrating ions, water and oxygen.

The ferrite-based pigment contains not only a first portion of CaO that is initially available for immediate reactions with water, but also contains a second portion of CaO trapped within the ferrite or ferrite-like structures. This second portion of CaO is mush less available as sacrificial calcium, being entrapped within the ferrites. However, when protecting against corrosion, it is advantageous to enable the protection to be sustained over time. This may be achieved by providing anticorrosion agents with differing availabilities. It has been found that the ferrite-based pigment according to the invention is extremely useful at protecting metal substrates over long periods of time. Some CaO is readily available to react with water, while the second portion—that is, the CaO entrapped within the ferrite structures—is available to react at a slower rate and in the case when the first portion of reacted CaO has been leached out. Thus, though the protective hydroxide phases may be leached out or otherwise depleted over time, more reactions proceed and enable more hydroxides to be formed to re-supply the protective layer at the metal surface.

It should be noted that it is advantageous to produce the ferrite-based pigment of the present invention by using an anionic surfactant in step c) of the hydrometallurgical process. As described above, the surfactant sequesters some of the calcium, thereby helping to avoid loosing it during the washing and the subsequent magnetic separation and screening separation phases.

Figure 15A:
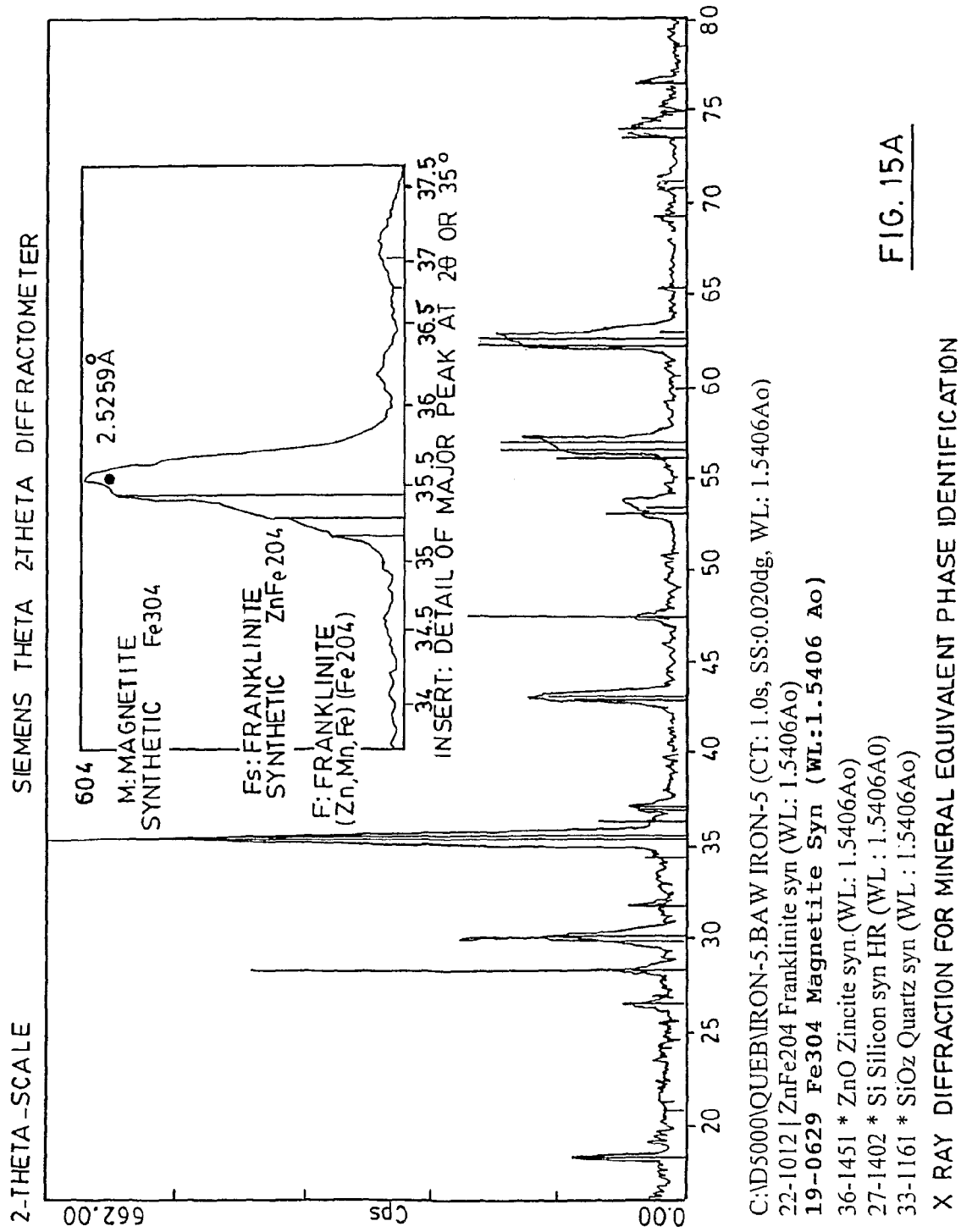
FIGS. 15A and 15B respectively are an X-ray powder diffraction graph of the spinels in the EAF flue dust and Scanning Electron microscope photos of the flue dust.
Figure 15B:
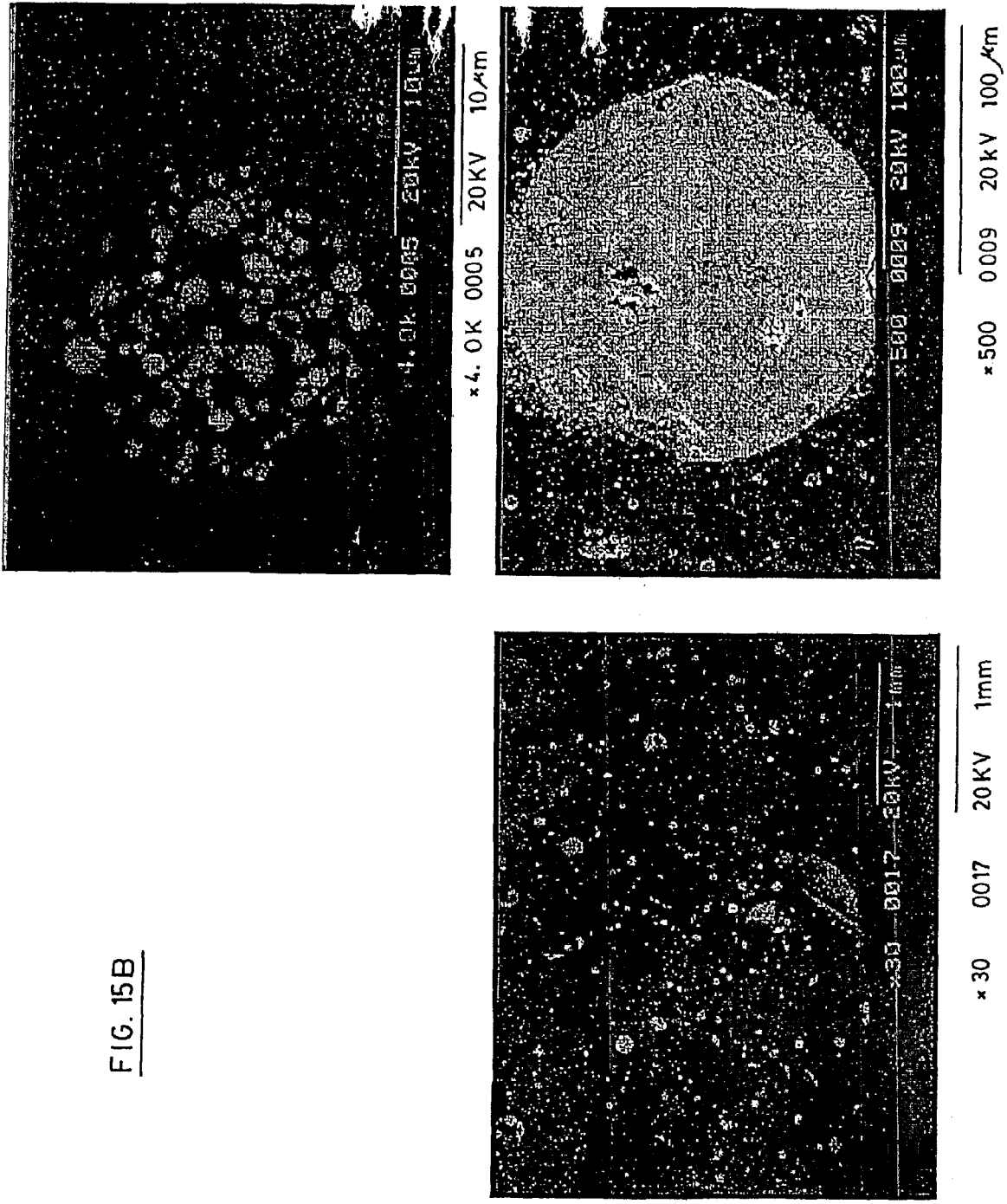

As a result, ferrite pigments produced from such EAF dust by the processes described herein contain a significant quantity of calcium, at least part of which is available as sacrificial calcium. Depending on the origin of the EAF flue dust, various concentrations of heavy metals, calcium oxides and spinels (as shown in FIG. 15A) are present in the raw dust. This depends on hematite, scrap metal and other reactant qualities and origins, as well as the steel mill operating conditions and production demands. FIG. 15B generally shows the flue dust morphology and texture by SEM.

Figure 16:
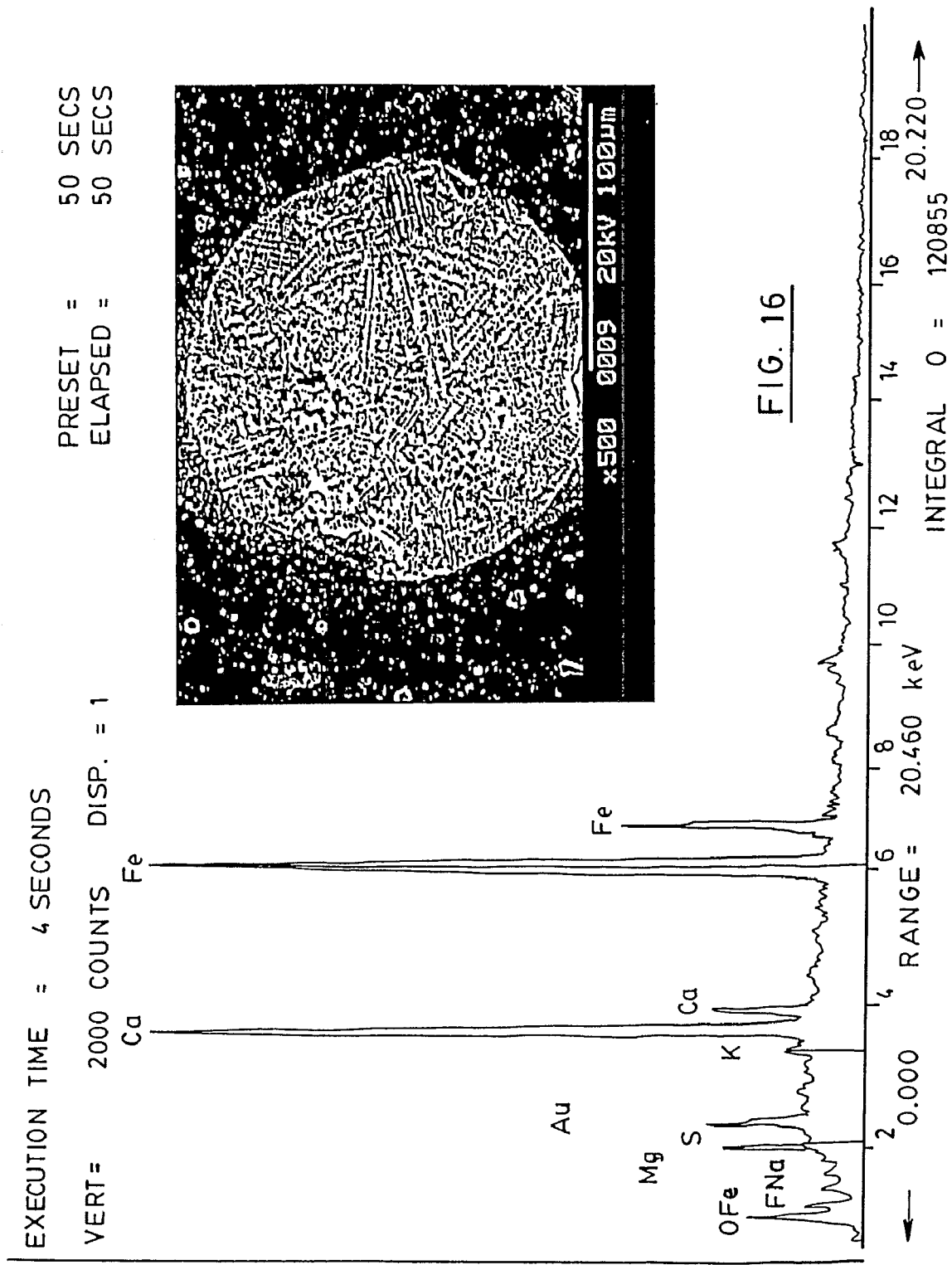
FIG. 16 is a Dispersive System Analysis of a calcium ferrite phase of the pigment, including a fluorescence graph and a Scanning Electron Microscope (SEM) photo thereof.
Figure 17:
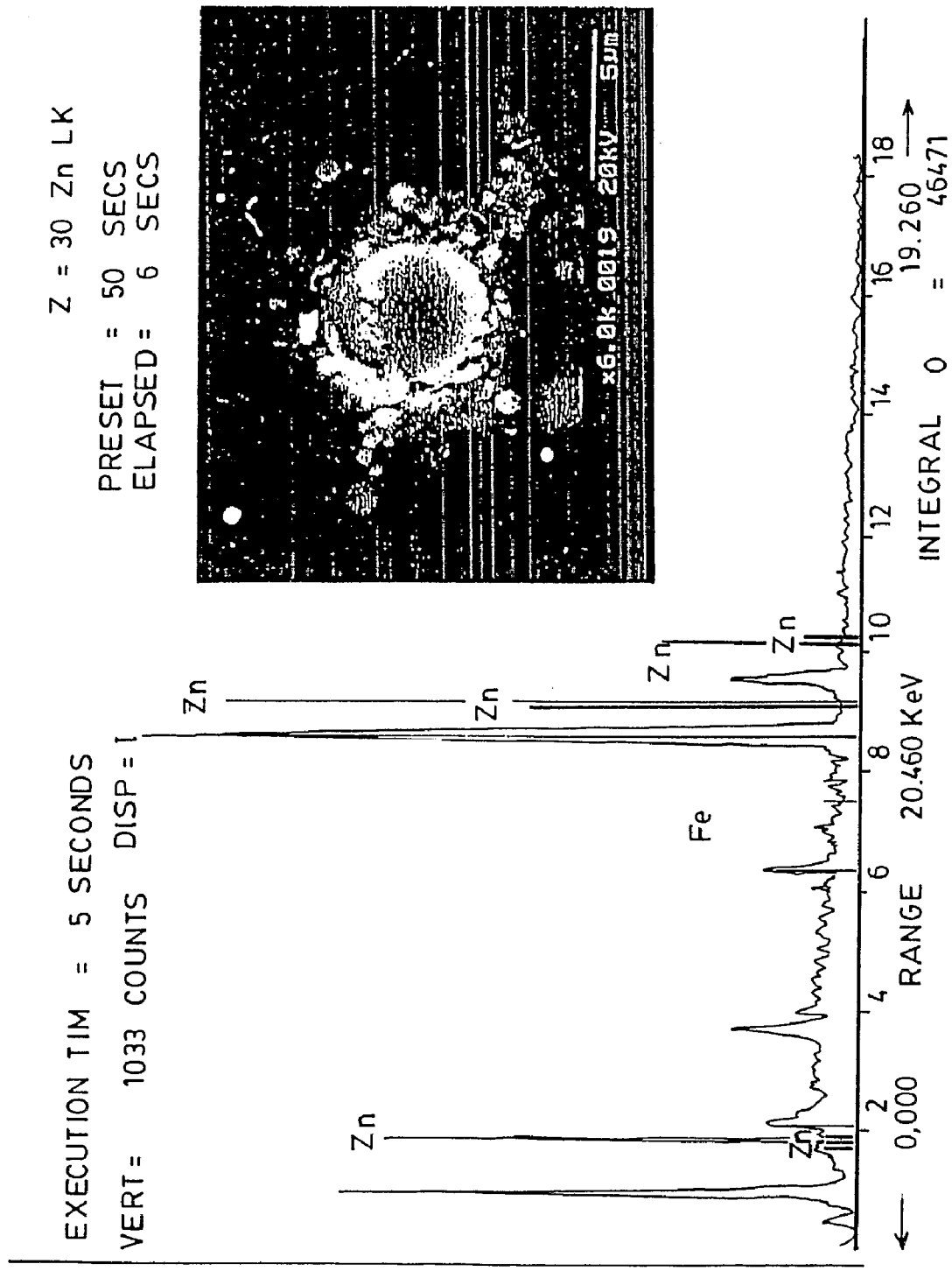
FIG. 17 is a Dispersive System Analysis of a zincite phase of the pigment, including a fluorescence graph and a Scanning Electron Microscope (SEM) photo thereof.

FIG. 16 shows isolated calcium ferrites as viewed by a Scanning Electron Microscope (SEM), and FIG. 17, by comparison, shows the zincite phase viewed by a SEM. The calcium ferrite particles occur as large spherical agglomerates in which a variety of ferrite families are present. FIGS. 16 and 17 also show a Dispersive System Analysis by fluorescence, which displays the various components present in the particular phases. The active ferrite pigments, containing calcium ferrites as well as other phases of calcium, display an active resistance to corrosion. On the other hand, ferrite and magnetite pigments derived from EAF dust that contains more significant quantities of lead and other toxic compounds contain a decreased amount of calcium (due to leaching) and display a more passive resistance to corrosion.

Preferably, the anti-corrosion ferrite pigments undergo wet grinding, and the passive ferrite pigments additionally undergo leaching, advantageously with nitric acid.

Ferrite Pigment Chemical Activity

Active ferrite pigments are exceptional inhibitors of corrosion. An active ferrite pigment includes any ferrite pigment grade that contains at least some calcium available as sacrificial calcium to react with air and/or water to form protective calcium phases, and more specifically to the first grade ferrite pigment described herein. An active ferrite pigment advantageously contains at least 4% calcium by weight. These ferrite pigments with at least 4% by weight calcium contain sacrificial calcium, and thus display chemically active anti-corrosion characteristics. The active ferrite pigments preferably contain about 10% by weight calcium and still preferably 14% by weight calcium or more.

Table 12 shows the partial chemical analysis of a first grade ferrite pigment. The calcium concentration is 4.4% by weight.

TABLE 12

PIGMENT CHEMICAL ANALYSIS OF
AN ACTIVE FERRITE PIGMENT

| Elements | | |
|---|---|---|
| | | % |
| Major | Fe | 31.4 |
| | Zn | 32.8 |
| | Ca | 4.4 |
| | Mg | 3.2 |
| | Mn | 2.9 |
| | | PPM |
| Trace | Pb | 6510 |
| | Cr | 1775 |
| | Cd | 170 |
| | Cu | 1500 |
| | Ni | n.d. |
| | V | n.d. |

Calcium is present in the form of various phases associated with the ferrite structures. The calcium could be physically trapped within, chemically integrated within or associated around or between the spinel structure of the ferrites. The calcium phases include a variety of calcium ferrites, portlandite, calcium oxide, among others, and are crystalline or amorphous. The concentration of calcium in the active anti-corrosion ferrite pigment varies primarily according to the raw EAF dust source and the harshness and number of leaching steps, which usually depend on the amount of heavy metals that must be eliminated from the slurry. The calcium initially present in the raw dust is sequestered by the anionic surfactant and retained throughout subsequent separation processing steps in order to be present in the ferrite pigment product.

The ferrite particles, which present certain crystal structures, comprise and associate with elements including iron, zinc and calcium, as well as different phases thereof. Reactions between a pigment containing ferrite particles and penetrating ions due to moisture and oxygen include chemical and electrochemical reactions.

At least part of the calcium present in the active ferrite pigment is available as sacrificial calcium that is available for chemical reactions to form protective calcium phases. The protective phases advantageously take the form of a protective layer and include oxides and/or hydroxides of calcium combined with other metals, and preferably displays a crystallographic structure. The sacrificial calcium is associated with the ferrites so as to be available for chemical reactions, particularly in an air or water environment to form protective phases.

Figure 18:
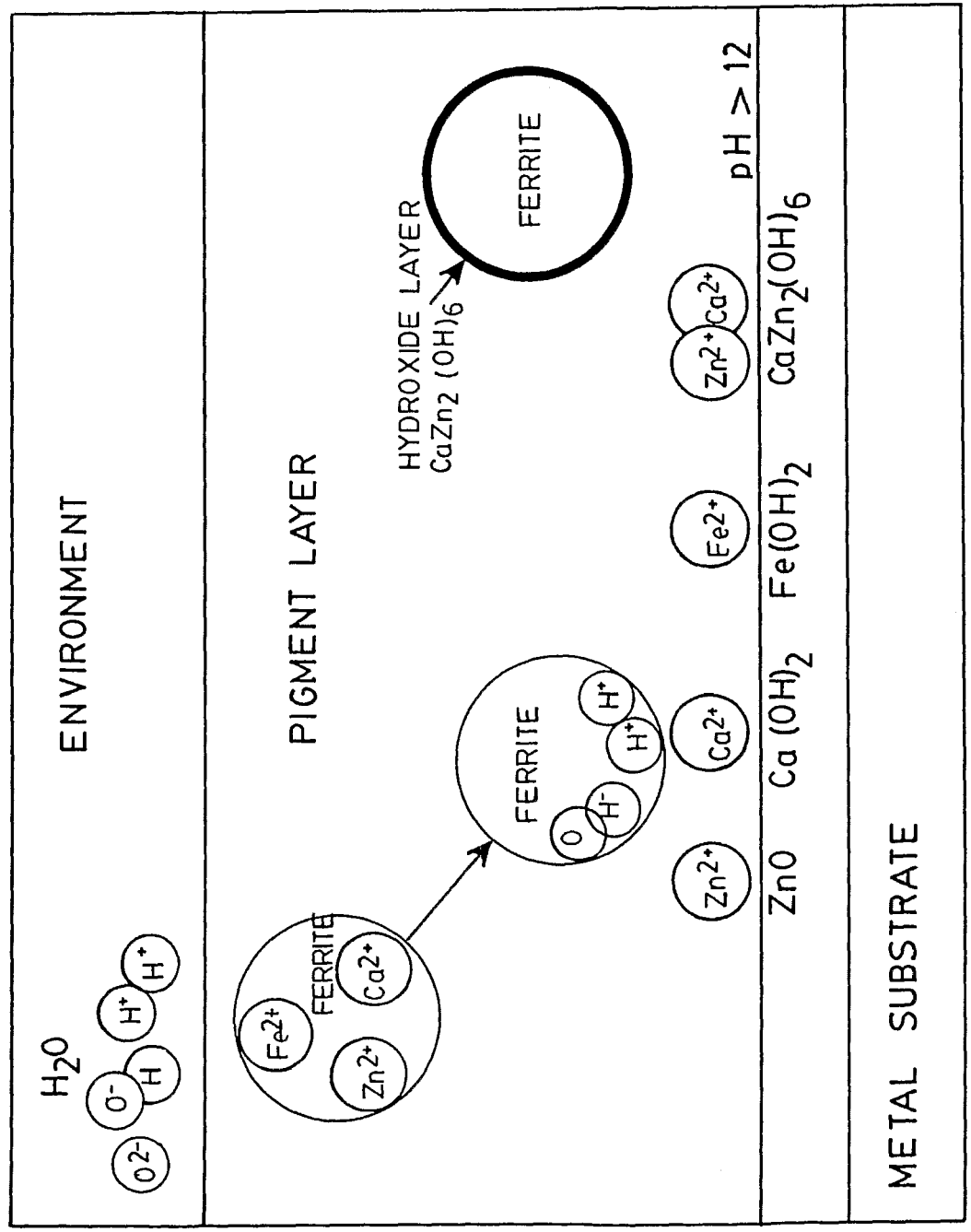
FIG. 18 is a representation of a pigment layer protecting a metal substrate against corrosion through a chemical activity mechanism.

The sacrificial calcium associated with the ferrite particles is available for chemical reactions that produce calcium phases associated with the ferrite particles. For instance, calcium oxide (CaO), which is present in the ferrite pigment and holds the calcium ferrite agglomerates together, is transformed into calcium hydroxide $(Ca(OH)_2)$ by penetrating ions. As a result, the agglomerates of calcium ferrites are no longer held together and calcium becomes available to dissolve out of the ferrites and/or change phases. In a preferred embodiment of the active ferrites, as shown in FIG. 18, the sacrificial calcium reacts with zinc and hydroxide ions to produce a calcium-zinc-hydroxide layer of hydroxides including $CaZn_2(OH)_6$ and others. The protective layers at least partially coating the ferrite particles are formed by sacrificial calcium reacting with penetrating ions and pigment components, and enable the pigment layer containing said ferrite particles to protect a metal substrate coated therewith in an active manner.

An advantage of these chemically active ferrite pigments is that the reactions involving sacrificial calcium proceed at an alkaline pH, preferably at a pH>12. Soluble components including sacrificial calcium are released and facilitate a constant basic pH on the pigment paint coating. Notably, calcium hydroxide formation reactions raise the pH. This constant basic pH has advantageous applications in the field of antifouling, in which fouling rates decrease in high pH.

Characterisation of the Protective Hydroxide Phases

The protective phases produced by the ferrite during corrosion resistance reactions were characterized in various ways.

A) Chemical Activity

Some of the ferrite-based pigments contain significant enough amounts of calcium to be termed "active" pigments. Active ferrite pigments contain about 4% calcium and are particularly proficient at resisting corrosion.

In order to characterize some of the protective hydroxide phases of the ferrite-based pigments, X-ray diffraction, SEM, Differential Thermal Analysis (DTA) and Thermogravimetric Analysis (TGA) techniques were employed.

Figure 19:
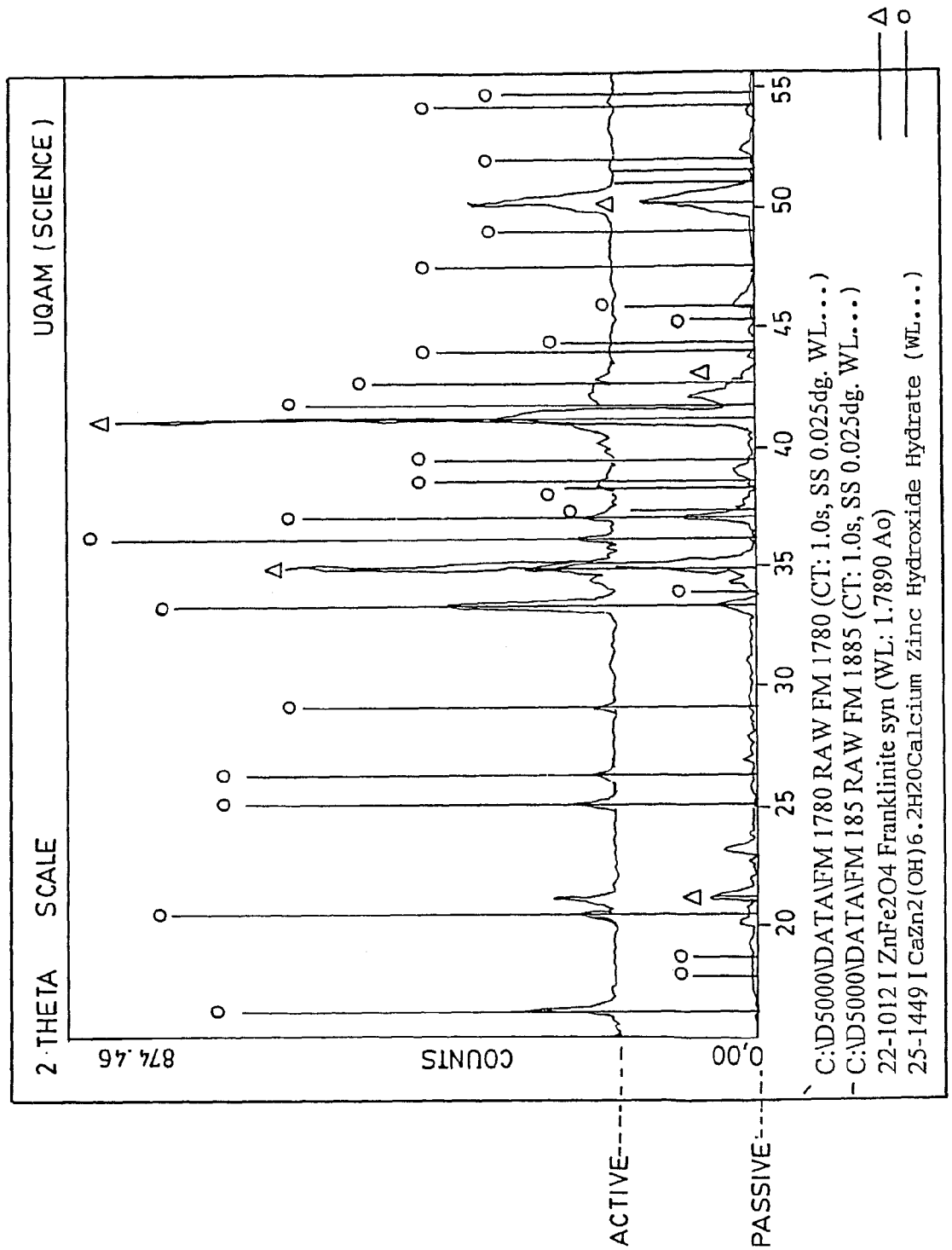
FIG. 19 is an X-ray powder diffraction graph comparing the active ferrite, passive ferrite, franklinite and calcium zinc hydroxide hydrate.
Figure 20C:
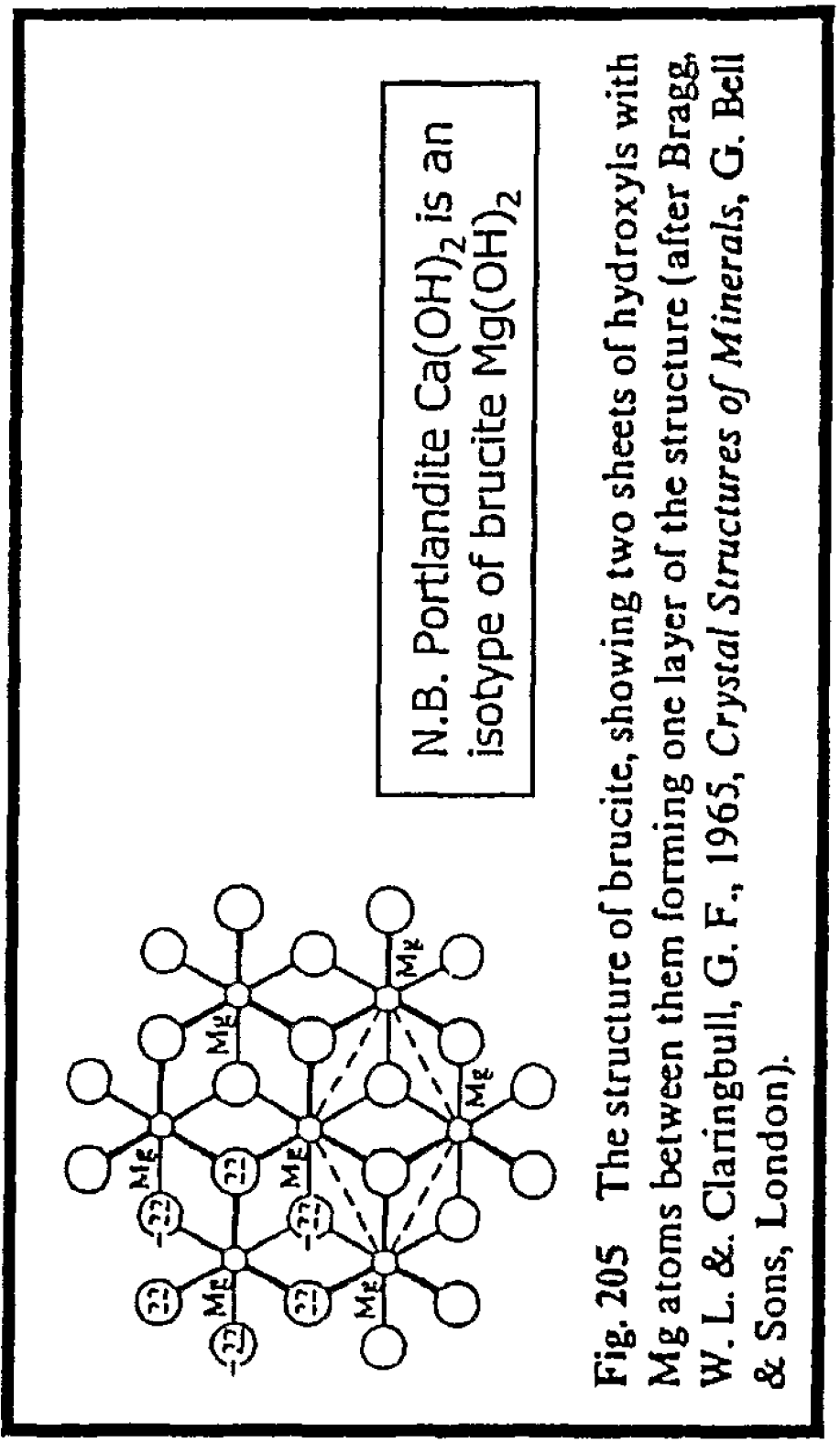

More particularly, using calcium-zinc-hydroxide $(CaZn_2(OH)_6)$ hydrate as a crystallographic reference, the active and passive ferrite pigments were compared. FIG. 19, an X-ray powder diffraction graph, shows that the active ferrite pigments contain calcium complexes at least partially in a crystallographic form analogous to the crystallographic structure of $CaZn_2(OH)_6$. Spinels display an array of subtle differences in prism structure and component make-up (shown in FIGS. 20A, 20B and 20C). $CaZn_2(OH)_6$ hydrate displays certain characteristics due to its crystallographic structure, and the active ferrite pigments contain complexes that display similar crystallographic characteristics. In FIG. 19, many of the characterising peaks of the active ferrite pigment correspond to the signature peaks of $CaZn_2(OH)_6$ hydrate, while the passive ferrite pigment lacks such peaks. In fact, the passive ferrite pigment seems to lack any crystallographic similarities to $CaZn_2(OH)_6$ hydrate. On the other hand, the active ferrite pigments contain calcium in a crystallographic form, which is, more specifically, analogous to that of $CaZn_2(OH)_6$ hydrate.

Figure 21:
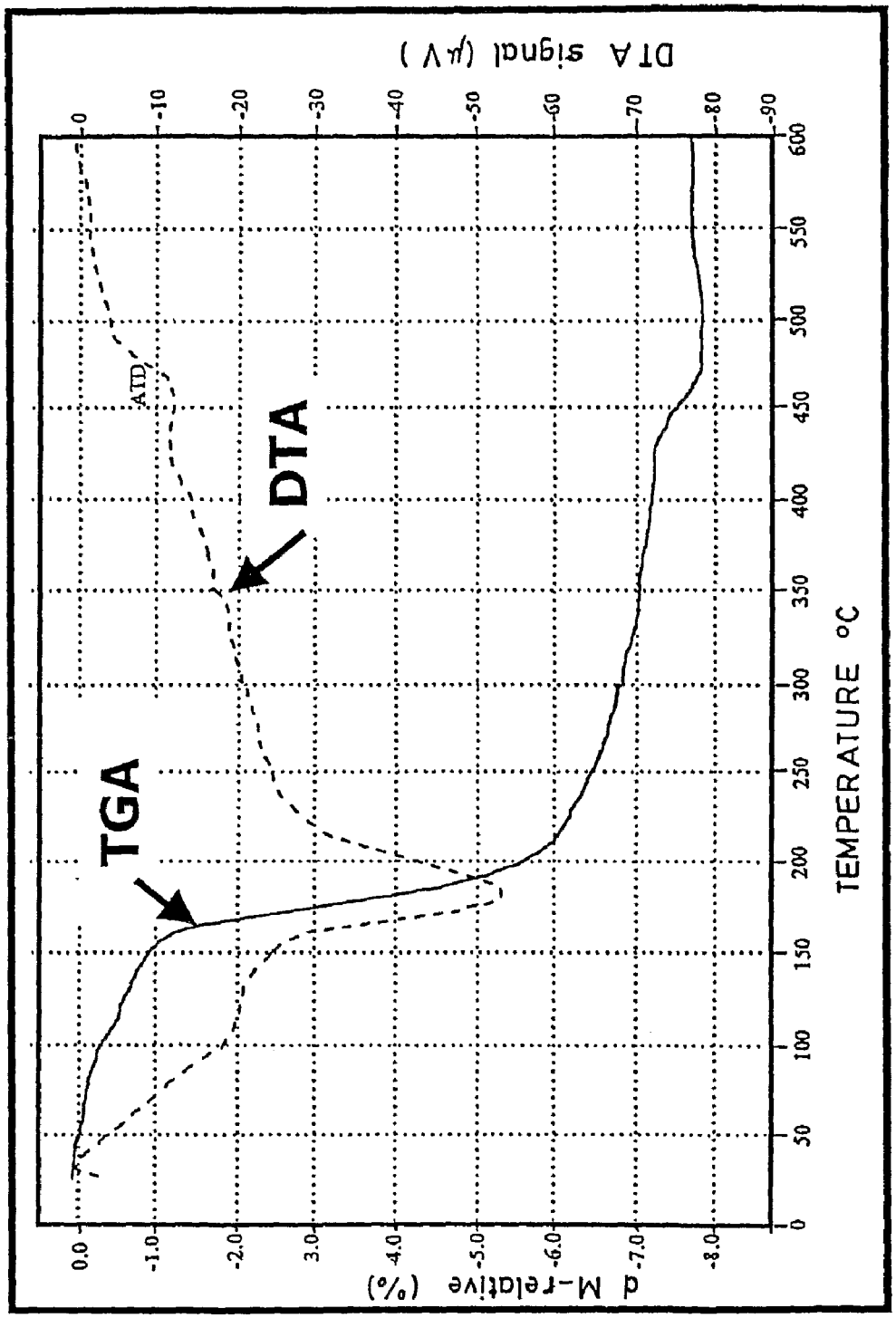
FIG. 21 is a graph showing DTA and TGA analyses of the active ferrite pigment.
Figure 22:
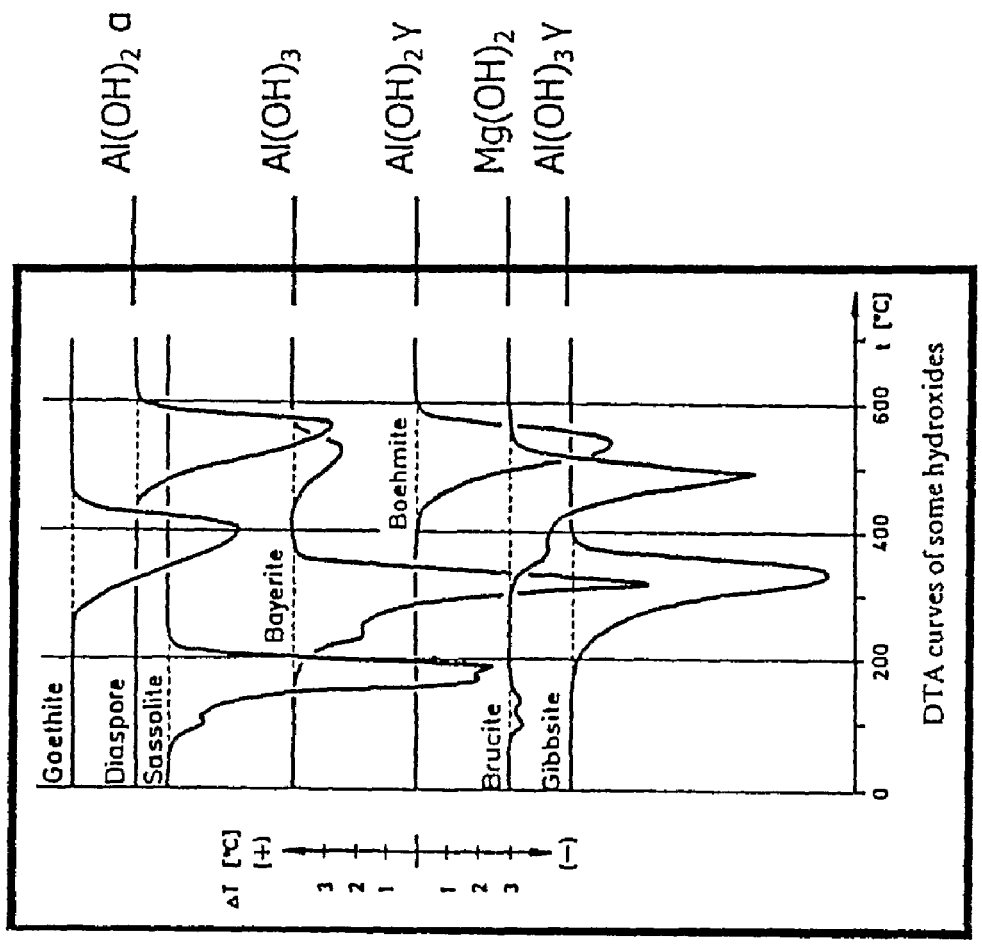
FIG. 22 is a graph showing DTA plots for different hydroxides.

Furthermore, FIG. 21 shows Differential Thermal Analysis (DTA) and Thermogravimetric Analysis (TGA) results of the degradation of an active ferrites pigment according to the present invention. The DTA curve shows that endothermic peaks occurred around 100° C. and 180° C. The peaks represent such phenomena as water desorption, phase transitions, and crystallisations. The TGA curve shows a significant loss of weight between about 160° C. and 215° C. The combined diffraction, DTA and TGA results provide a particular ferrite fingerprint that shows the decomposition, phase response and/or crystal response to heating. DTA fingerprints of other hydroxides are well known in the art and examples thereof can be seen in FIG. 22. Of course, the DTA and TGA characterisations are complementary to other forms of compound identification.

Figure 23:
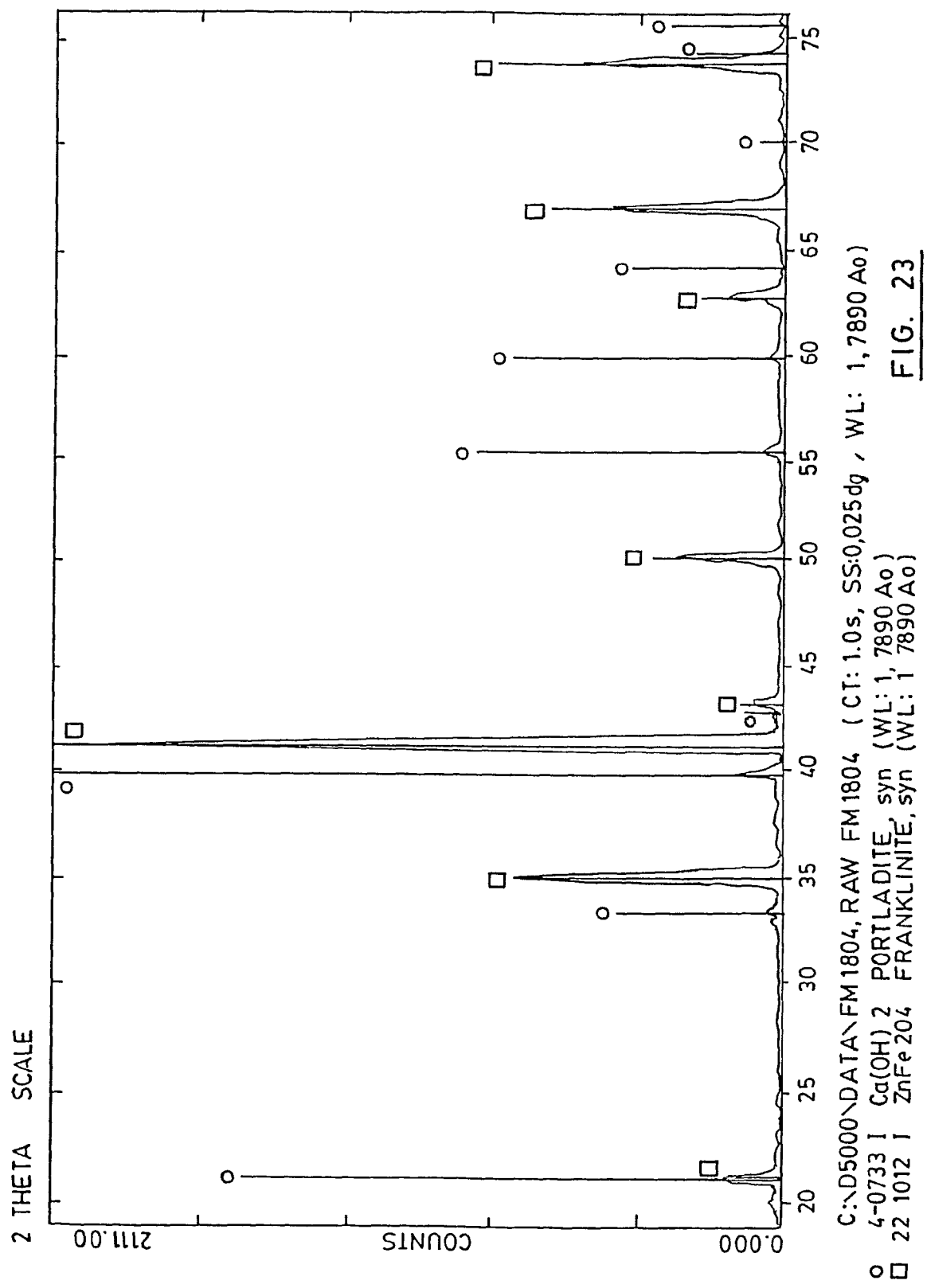
FIG. 23 is an X-ray powder diffraction graph comparing franklinite, portlandite and the active ferrite pigment.

Furthermore, some of the $Ca(OH)_2$ present in the ferrite pigment displays crystal structure. $Ca(OH)_2$ that displays a crystal structure is referred to as portlandite, an isotope of brucite. The crystal structure is shown on FIG. 20C. This structure was also characterized by an X-ray powder diffraction analysis of the ferrite pigment, shown in FIG. 23. This figure also shows that franklinite, $(Zn, Fe, Mn)(Fe, Mn)_2O_4$, is present in this active ferrite pigment.

The chemically active ferrite pigments, with the general DTA and TGA fingerprint for a certain temperature range defined in FIG. 21 and containing the calcium phases characterized in X-ray diffraction analyses, contain calcium and other components that react with penetrating ions. The reactions advantageously maintain a constant basic pH on the coating. The specific action depends on the calcium concentration as well as the various reactions between the pigment components and penetrating ions.

Figure 24A:
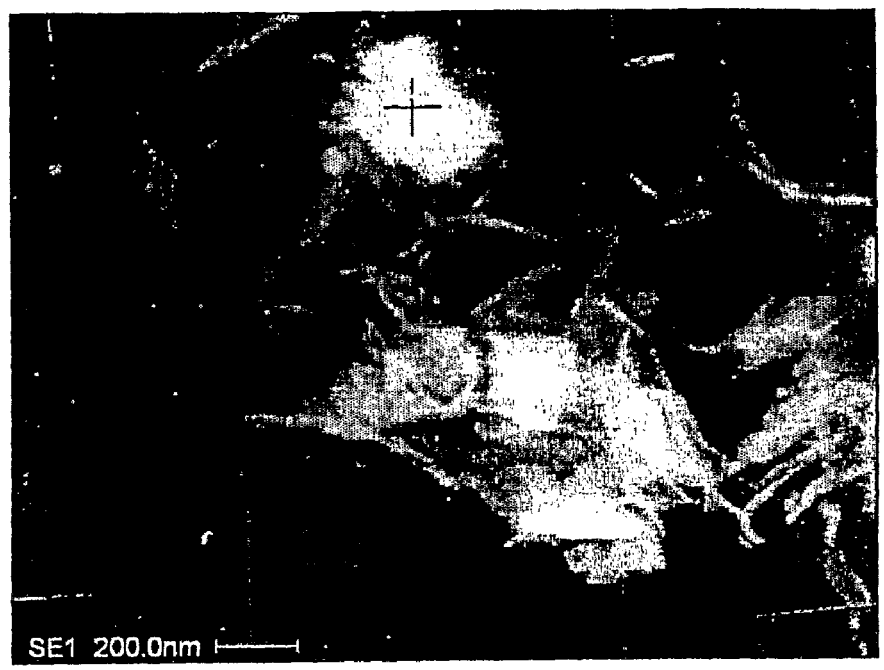
FIGS. 24A to 24C are SEM photos of the zinc-based precipitate.
Figure 24B:
Figure 24C:
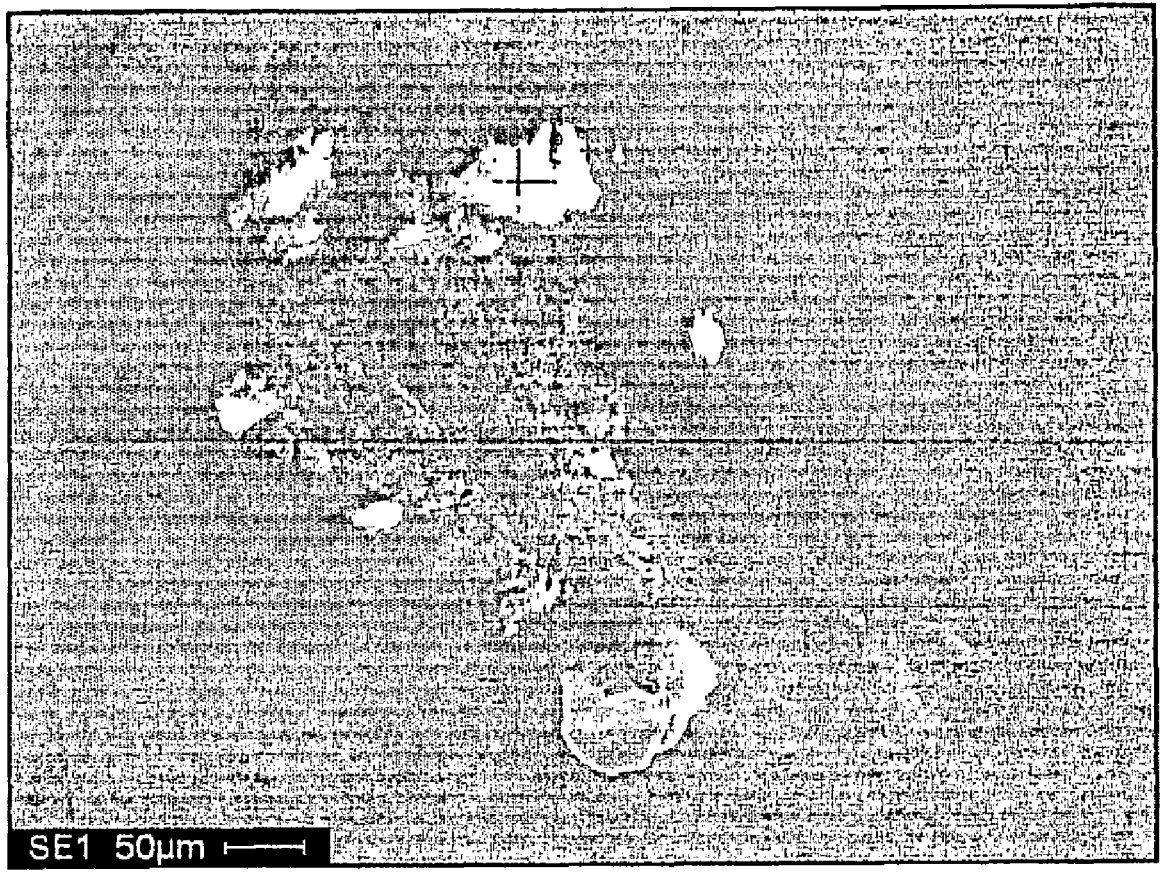

In regards to the zinc-based precipitate that contains the protective hydroxide phase $Zn(OH)_2$, FIGS. 24A, 24B and 24C show the morphology of the precipitate, while Table 13 shows the respective compositions of the different structures.

TABLE 13

COMPOSITIONS OF ZINC-BASED PRECIPITATE

| Element | A Wt % | A At % | B Wt % | B At % | C Wt % | C At % |
|---|---|---|---|---|---|---|
| O | 26.60 | 42.23 | 21.48 | 36.74 | 11.33 | 28.92 |
| Si | 3.96 | 3.58 | 4.91 | 4.78 | 4.74 | 6.89 |
| S | — | — | 1.94 | 1.65 | — | — |
| Mg | — | — | — | — | 2.48 | 4.16 |
| Cl | 2.93 | 2.1 | 1.1 | 0.85 | 0.52 | 0.6 |
| Ca | — | — | — | — | 2.85 | 2.9 |
| Ti | — | — | — | — | 0.89 | 0.75 |
| Mn | — | — | — | — | 3.99 | 2.97 |
| Fe | — | — | — | — | 37.09 | 27.11 |
| Zn | 66.51 | 53.84 | 70.57 | 45.97 | 35.11 | 25.01 |
| Matrix | Correction | ZAF | Correction | ZAF | Correction | ZAF |

B) Electrochemical Activity

The ferrite pigments derived from EAF dust also display electrochemical activity in response to penetrating ions and the cathode action of a paint-covered substrate. In the prior art, chromate pigments (cathodic reaction) and phosphate pigments (anodic reaction) have been used to protect a substrate by electrochemical action. A process of passivation of iron (substrate) by chromate is one that is known in the art, the passivation reactions of which result in a protective $Fe(OH)_2 \cdot 2CrOOH$ barrier.

Most ferrite pigment grades described herein display some level of electrochemical action. In particular second, third and fourth grade ferrite pigments emphasize this protection mechanism. There may be an electro-chemical anti-corrosion protection process. The calcium that undergoes electrochemical reactions is said to be non-sacrificial, and is transformed into hydroxides such as portlandite $Ca(OH)_2$, while other pigment components form compounds such as zincite $ZnO$, zinc hydroxide, iron (II) hydroxide $Fe(OH)_2$, and other hydrated ferrites as, for example, $Fe(ZnCa)(OH)_8$ hydrate.

A protective barrier is primarily formed at and associated with the substrate, protecting it from further ion penetration and corrosion. This barrier composed of calcium phases and other phases can be crystalline or amorphous.

Preferably, the first grade or the active pigments have both the first and second portions of CaO, which bestows long-lasting anticorrosion properties. In particular, this provides the endurance required of an antifouling pigment.

The chemically active grade may offer a longer resistance to corrosion if compared with the coated grades, as the latter depend much more on the hydroxides present in the coated layer.

C) Passive Protection

Passive ferrite pigments contain less than 4% by weight calcium and offer protection primarily by providing a physical barrier to the environment rather than a reactive layer associated with the ferrite particles or the substrate. Table 14 shows the partial chemical analysis of a fifth grade ferrite pigment. The calcium concentration is 0.68% by weight. The passive ferrite pigments are chemically inert and form a protective barrier in a packed layer. The second, third and fourth grade ferrite pigments described herein are also used as passive anti-corrosion pigments.

TABLE 14

PIGMENT CHEMICAL ANALYSIS OF A PASSIVE FERRITE PIGMENT

| Elements | | |
|---|---|---|
| | | % |
| Major | Fe | 48.8 |
| | Zn | 16.8 |
| | Ca | 0.68 |
| | Mg | 8.41 |
| | Mn | 4.36 |
| | | PPM |
| Trace | Pb | 660 |
| | Cr | 2640 |
| | Cd | 30 |
| | Cu | 1510 |
| | Ni | n.d. |
| | V | n.d. |

D) Active/Passive Ferrite Mixtures

Active ferrite pigments can be mixed with passive ferrite pigments to form hybrid pigments. Passive ferrite pigments can also be coated with calcium phase containing solutions (such as the leachate from some of the leaching steps of the process described herein). The anticorrosion performance of the ferrite pigments can thus be enhanced. The hybrid pigments can also be made by mixing active and passive ferrite pigments directly so that the resulting ferrite pigments contain an overall calcium concentration of 4% by weight or greater.

Pigmentary Properties of Some of the Ferrite Pigments

The pigmentary properties for the ferrite pigments are shown in Tables 15A to 15C along with commercial pigments recognized as ferrites. These commercial ferrites are obtained by mixing oxides according to a company-specific formulation and then calcining at high temperature. The table shows different important quantitative pigmentary properties such as pH, humidity, "long oil" absorption, dry color of pigment, paint color, gloss, dispersion on the Hegman gage, resin incorporation time.

TABLE 15A

PIGMENTARY PROPERTIES OF FERRITE PIGMENTS

| | FM # | | | | |
|---|---|---|---|---|---|
| | 1000 | 1017 | 1323 | 1275 | 1224 |
| | | | Grade | | |
| | Brun 10 | 130BM | B-HS4 (third grade) pH 1.5 Note: | B-HS (second grade) | B-PE (first grade) |
| | Shepherd | Bayer | 0.3% NaMP with Wet Grinding (WG) | pH 1.0 | MS with surfactant WG normal |
| Dispersion: | STM1/020 | STM1/020 | STM1/020 | STM1/020 | STM1/020 |
| | 1¼ | 1¾ | 45 sec. | 40 sec. | 6½ |
| | — | 6-5½ LN 0 | — | — | |
| | 6½ - 7 N 5¼ | Full Nibs | 6¾ N 5½ | 6¼ N 5 | 5¾ N 4 |

TABLE 15B

PIGMENTARY PROPERTIES OF FERRITE PIGMENTS OF THE THIRD GRADE

| | 10% | 20% | 10% | 20% | 10% | 20% | 10% | 20% | 10% | 20% |
|---|---|---|---|---|---|---|---|---|---|---|
| Finished Paint: | | 15.63 | | 22.47 | 13.74 | 14.71 | 13.20 | 13.74 | 15.17 | 15.47 |
| | | 8.76 | | 25.04 | 3.29 | 3.00 | 3.30 | 3.21 | 3.37 | 3.20 |
| | | 7.22 | | 12.21 | 5.53 | 5.16 | 5.47 | 5.25 | 6.43 | 6.25 |
| | | 80.6 | | 47.3 | 75.3 | 73.4 | 69.4 | 63.7 | 82.0 | 86.2 |
| | | 93.3 | | 81.1 | 23.2 | 22.2 | | | | |
| | | | | | 99.0 | 98.2 | 100.0 | 100.0 | 100.0 | 100.0 |
| | | | | | 1.89 | 2.15 | 1.74 | 1.89 | 2.30 | 2.39 |
| | | | | | 1.91 | 2.19 | 1.73 | 1.89 | 2.29 | 2.39 |
| Pigmentary Properties: | | | | | | | | | | |
| pH | | 8.9 | | 7.4 | | 6.3 | | 5.7 | | 11.7 |
| Humidity | | 0.17 | | 0.26 | | 0.75 | | 0.45 | | 1.47 |

TABLE 15C

PIGMENTARY PROPERTIES OF FERRITE PIGMENTS OF THE THIRD GRADE

| | | | | | |
|---|---|---|---|---|---|
| Oil absorption | 9.2 | 18.5 | 12.0 | 12.0 | 20.3 |
| Soluble salts | 0.12 | 0.14 | | 0.23 | 0.41 |
| 325 mesh residu | 0.022 | 0.853 | 0.039 | 0.059 | 0.098 |
| Bulk Density | | | | 0.83 | 0.43 |
| | | | | 1.20 | 0.64 |
| Dry color: | 27.56 | 31.80 | 27.07 | 24.61 | 29.70 |
| | 9.04 | 25.41 | 2.65 | 2.83 | 2.20 |
| | 7.95 | 12.13 | 8.03 | 7.40 | 8.05 |
| MP Humidity | | | | | |

Another advantage of ferrite pigment of the third grade is its color stability at temperatures exceeding 300° C. Table 16 shows the color parameters for a ferrite before and after heating to 300° C.

TABLE 16

COLOR PARAMETER CORRECTION FOR HS4 FERRITE PIGMENT (THIRD GRADE) BEFORE AND AFTER HEATING TO 300° C.

| FM# | Grade | Temp. ° C. | Time min | Color L | a |
|---|---|---|---|---|---|
| 1257 | B99-HS4 (third grade) pH 1.50 | 300 | 0 | 26.37 | 1.88 |
| | | | 60 | 26.82 | 2.53 |

Another advantageous property of the pigments according to the present invention, is that during processing, the pulp has self-preserving properties. There is no need to add preservatives to a pulp that is left or stored for further processing. This is in contrast to titanium oxide, which must include a preservative when stored in order to avoid its going bad due to mold, mildew or other causes of putrefaction.

Salt Mist Tests

Salt mist tests for the pigments for which the properties were presented in the preceding section, are given in Table 17 for exposure times of 500, 1000 and 1500 hours, in a chamber designed for accelerated corrosion testing.

TABLE 17

SALT MIST ACCELERATED CORROSION TESTS FOR FERRITES
Performance of coatings after 1512 h

| Groove Zone Coating Systems/ Products | Corrosion ASTM D1654/ 10 | Formation of blisters ASTM D714 | Swelling ASTM D1654 | DIC* Peeling ASTM D1654/ 10 | Larg. Max. mm | Surface rust ASTM D610/ 10 | Groove Zone Formation of blisters ASTM D714/ 10 | | Remarks |
|---|---|---|---|---|---|---|---|---|---|
| FM#1000-2 B-PE (first grade) | 7.5 | 7G, 8M 1P | 8 | 8.5 | 4 | 10 | 0 | 56.6 | visual: 7 |
| FM#1017-3 B-PE (first grade) | 7.5 | 4G, 1M 6P | 8.5 | 8.5 | 10 | 10 | 0 | 63.4 | visual: 6 |
| FM#1174-4 B-PE (first grade) | 8 | 0G, 3M 0P | 8 | 7.5 | 6 | 10 | 0 | 59.2 | visual: 3 |
| FM#1267-1 | 8.5 | 0G, 1M | 8.5 | 9 | 5 | 10 | 0 | 62.2 | visual: 2 |

TABLE 17-continued

SALT MIST ACCELERATED CORROSION TESTS FOR FERRITES
Performance of coatings after 1512 h

| Groove Zone Coating Systems/ Products | Corrosion ASTM D1654/ 10 | Formation of blisters ASTM D714 | Swelling ASTM D1654 | DIC* Peeling ASTM D1654/ 10 | Larg. Max. mm | Surface rust ASTM D610/ 10 | Groove Zone Formation of blisters ASTM D714/ 10 | | Remarks |
|---|---|---|---|---|---|---|---|---|---|
| Zinc chromate FM#1276-4 | 8.5 | 1P 0G, 0M | 8.5 | 9.5 | 3 | 10 | 0 | 40.2 | visual: 1 |
| Strontium chromate FM#1341-3 S-HS4 (third grade) pH 1.5 | 8.5 | 1P 1G, 1M 2P | 8.5 | 8.5 | 10 | 10 | 0 | 54.4 | visual: 4 |
| FM#1364-1 S-HS4 (third grade) pH 0.5 | 8 | 1G, 5M 1P | 8 | 8 | 9 | 10 | 0 | 53.3 | visual: 5 |
| Acceptable code | 7 à 10 | | 7 à 10 | 6 à 10 | | 8 à 10 | | | |

*DIC: Corrosion induced loss of adherence
**ND: Not determinable

| | Position 1512 h |
|---|---|
| FM# 1000 Brun 10 of Shepherd | 6 |
| FM# 1017 130 MB of Bayferrox | 7 |
| FM# 1174 B-PE | 3 |
| FM# 1267 Basic Zinc Chromate 233 | 2 |
| FM# 1276 Strontium Chromate 177 | 1 |
| FM# 1341 S-HS4 pH 1.5 (0.3% NaMP in granules) | 4 |
| FM# 1364 S-HS4 pH 0.5 (0.3% Na MP) | 5/7 |

4.2) Characteristics of Some of the Magnetite Pigments

Magnetite production uses the same treatment units with the exception of an impact grinder and a 6 μm screen. Normally, magnetite does not require leaching with acid and its surface characteristics are more constant.

Two magnetites undergo wet grinding: (1) the magnetite fraction after impact grinding, between 38 and 6 μm and (2) the fraction of <6 μm after the purification with the surfactants. In both cases, the particles are too coarse or large in diameter to be classified as pigments and require attrition. Zirconium beads of 0.4 to 0.6 or 0.8 mm were used to attain a median particle size of 0.3 pm. The initial concentration of the pulp was 350 g/l and the grinding was performed continuously until the desired granulometry was obtained.

The magnetite requires purification by putting ferrites and other contaminants such as calcium and silica into suspension. This suspension is accomplished with the aid of an anionic surfactant such as sodium metaphosphate or saratan. The required dosage, in order to optimize the suspension, is obtained after titrating the pulp with the surfactant.

The results for the magnetite pigmentary properties of the present invention and the competitors' pigment properties are shown in Tables 18A to 18C.

TABLE 18A

PIGMENTARY PROPERTIES OF MAGNETITE PIGMENTS

| | FM # | | | |
|---|---|---|---|---|
| | 1335 | 1336 | 1239 | 1280 |
| | Grade | | | |
| | B-Mag-PE (M1) | B-Mag-HS4 (M2) | Shepherd Black 376 | Bayferrox 303T |
| | Note: | | | |
| | WG: SM 1.5/2 h | WG: SM 1.5/2 h | Magnetite | |
| Dispersion: | | | | |
| Formula used: | SPTM1/020 | SPTM1/020 | SPTM1/020 | SPTM1/020 |
| Incorporation: (min.) | 21 | 15 | 40 sec. | 30 sec. |
| Hegman: (N.S.) | | | | |
| from 0-8 from 4-8 | N3 | N1 | 6¾ N 4½ | 8 |

TABLE 18B

PIGMENTARY PROPERTIES OF MAGNETITE PIGMENTS

| | | 10-20% PVC | 10% | 20% | 10% | 20% | 10% | 20% | 10% | 20% |
|---|---|---|---|---|---|---|---|---|---|---|
| Finished Paint: | Color: | L | 10.52 | 15.44 | 10.81 | 14.02 | 7.00 | 7.71 | 8.65 | 10.06 |
| | | a | 0.87 | 0.02 | 0.70 | 0.20 | 0.64 | 0.49 | 1.02 | 0.69 |

TABLE 18B-continued

PIGMENTARY PROPERTIES OF MAGNETITE PIGMENTS

|  |  | b | 2.17 | 1.70 | 2.19 | 1.88 | 0.89 | 0.82 | 0.22 | 0.22 |
|---|---|---|---|---|---|---|---|---|---|---|
|  | Gloss | 20° | 8.0 | 0.9 | 2.7 | 1.2 | 92.2 | 79.0 | 85.4 | 37.8 |
|  |  | 60° | 52.4 | 15.9 | 28.7 | 23.3 | 95.3 | 89.9 | 69.0 | 56.2 |
|  | Opacity | % | 100.0 | 100.0 | 100.0 | 100.0 | 100.0 | 98.3 | 98.7 | 100.0 |
|  |  | yn | 1.18 | 3.14 | 1.24 | 2.15 | 0.49 | 0.59 | 0.75 | 1.01 |
|  |  | yb | 1.03 | 1.09 | 1.03 | 1.79 | 0.49 | 0.60 | 0.76 | 0.96 |
| Pigmentary Properties: |  |  |  |  |  |  |  |  |  |  |
| pH |  |  |  | 11.9 |  | 8.4 |  | 8.2 |  | 8.4 |
| Humidity |  | (%) |  | 2.51 |  | 2.77 |  | 0.29 |  | 0.27 |

TABLE 18C

PIGMENTARY PROPERTIES OF MAGNETITE PIGMENTS

| Oil absorption (%) |  | 23.1 | 21.3 | 12.0 | 14.8 |
|---|---|---|---|---|---|
| Soluble salts (%) |  | 0.14 | 0.13 | 0.15 | 0.23 |
| 325 mesh residu (%) |  | 0.059 | 0.024 | 0.007 | 0.0194 |
| Bulk Density | non-compacted | 0.38 | 0.43 | 0.69 | 0.94 |
|  | compacted | 0.63 | 0.71 | 1.24 | 1.33 |
| Dry color: | L | 24.55 | 23.61 | 18.41 | 19.71 |
|  | a | 0.07 | −0.10 | −1.03 | −0.99 |
|  | b | 3.86 | 3.99 | 1.00 | 0.21 |
| MP | L |  |  |  |  |
|  | a |  |  |  |  |
|  | b |  |  |  |  |
| Humidity | (%) |  |  |  |  |

The salt mist tests are also represented in this table for the magnetites.

Magnetite pigments may also be modified so as to display passive and active anti-corrosion characteristics. The pigment will be active, when they are coated using selected leachate from the hydrometallurgical process preferably with the liquor from the $HNO_3$ leaching of the ferrite. The leachate at least partly contains calcium-zinc base characteristics that can help protect the substrate against corrosion. The calcium in the added leachate associates with the larger magnetite pigments, coating them and protecting the substrate.

Table 19 shows the partial chemical analysis of a magnetite pigment. The calcium concentration is 1.25% by weight.

TABLE 19

PIGMENT CHEMICAL ANALYSIS OF MAGNETITE PIGMENT

| Metal | % |
|---|---|
| Aluminum (Al) | 0.95 |
| Calcium (Ca) | 1.25 |
| Iron (Fe) | 50.16 |
| Magnesium (Mg) | 2.37 |
| Manganese (Mn) | 2.63 |
| Zinc (Zn) | 2.98 |
| Cadmium (Cd) | <d/l |
| Chromium (Cr) | 0.33 |
| Copper (Cu) | 0.11 |
| Lead (Pb) | 0.09 |

It should also be noted that the magnetite coming from EAF dust by the hydrometallurgical process has other distinguishing features. As was explained above, the EAF dust contains condensed metal oxides including $Fe_3O_4$, magnetite. The black balls of magnetite in the EAF dust are not only coated by adsorbed ferrite particles, but also contain some ferrite and other compounds. More specifically, it seems that the magnetite balls formed in the EAF vessel encompass other compounds so that when the magnetite balls are fractured and broken open there is a release of ferrites, calcium oxide and other compounds. Thus, depending on the grinding steps performed on the magnetite, different structures and make-ups may be possible. As was touched on previously, this phenomenon observed with the magnetite on a larger scale is reasonably thought to occur below the μm size with the ferrites. Accordingly, the ferrites would physically trap the fine dust of calcium oxides in suspension with the metallic vapour, which would constitute the second portion of CaO available for reaction and protection against corrosion. This process is unique and cannot be duplicated by a calcining procedure. Furthermore, the physically trapped CaO weakens the crystallographic structure and helps increase the availability of such elements as Zn, Mg, Mn and Fe.

5) Paint Formulations Containing the Ferrite-Based or Magnetite-Based Pigment: Examples The anti-corrosion potential and advantages of the "active" and "passive" ferrite-based pigments were demonstrated in the following examples.

Paints containing different grades of active or passive ferrite pigments, or magnetite pigments were prepared in paint formulations and then compared to various commercially available paints containing anti-corrosion pigments. Examples of an interior latex formulation integrating the ferrite pigment and a two component epoxy formulation integrating the pigment are shown in Tables 20 and 21. Table 22 shows a primer formulation. The pigment, integrated into a paint formulation, was applied to a substrate plate. The plate was a cold roll steel Q plate, and had a 20 micron profile. The plate was scratched down the middle so as to expose the substrate via a "scribe line", and then the sample plate was subjected to a salt Spray for 1,500, 1,000 or 500 hours. The resulting corrosion around the scribe line was then observed and analyzed.

TABLE 20

INTERIOR LATEX PAINT FORMULATION INTEGRATING PIGMENTS

| COMPONENT | MASS (g) |
|---|---|
| Water | 176.0 |
| Natrasol plus | 6.0 |
| Tektamer | 0.64 |
| KTPP | 1.8 |
| Colloid 226 | 5.0 |
| Colloid 643 | 2.0 |

TABLE 20-continued

INTERIOR LATEX PAINT FORMULATION INTEGRATING PIGMENTS

| COMPONENT | MASS (g) |
|---|---|
| A2M2P1 | 0.80 |
| Water | 176.0 |
| Pigment | 200.0 |

Mixed with a high speed disperser for 30 min. to attain a dispersion of 5 on the Hegmen gauge.

| | |
|---|---|
| Camelcal | 150.0 |
| Propylene Glycol | 30.0 |
| Ethylene Glycol | 6.0 |
| Texanol | 6.0 |
| Resin | 400.0 |
| Water | 24.0 |
| Colloid 643 | 2.0 |
| Ammonia | 1.2 |
| TOTAL | 1,186.44 |

TABLE 21

TWO COMPONENT EPOXY FORMULATION INTEGRATING PIGMENTS

| | MASS (g) |
|---|---|
| COMPONENT A | |
| D.E.R.671X75 | 363.3 |
| Texaphor 963 (657) | 4.0 |
| Wollastonite | 257.3 |
| Heucophos ZPA | 112.8 |
| Pigment (ferrite) | 128.8 |

Mixed with a high speed disperser for 30 min. to attain a dispersion of 5 on the Hegmen gauge.

| | |
|---|---|
| Texaphor se. | 5.0 |
| Xylene | 27.2 |
| Toluene | 68.1 |
| M.I.B.K. | 94.0 |
| Isopropanol | 68.1 |
| TOTAL | 1,128.7 |
| COMPONENT B (POLYAMIDE) | |
| Versamid 115 * 70 | 78.4 |
| M.I.B.K. | 45.0 |
| Toluene | 50.0 |
| Xylene | 15.0 |
| TOTAL | 188.4 |

TABLE 22

PRIMER FORMULATION

| COMPONENT | MASS (lb.) |
|---|---|
| Aroplaz 2636M50 | 255.0 |
| Antiterra 204 | 4.0 |
| Bentone SD-3 | 4.7 |
| Pigment (ferrite) | 182.0 |
| Artic Mist | 80.0 |
| Butrol 22 | 50.0 |
| Zecospheres 200 | 100.0 |
| Xylene | 131.0 |

Disperse to 5.5 Hegman
Let down.

| | |
|---|---|
| Aroplaz 2636M50 | 96.0 |
| Xylene | 94.6 |
| Cobalt Naphthenate 6% | 0.8 |
| LTD Nuxtra 18% | 1.0 |
| Duskin No. 2 | 0.9 |
| TOTAL | 1000.0 |

Photographs were taken and observations were made to compare the anticorrosive results (in salt spray tests) of the inventive ferrite or magnetite pigments and pigments found in the marketplace. It was evident that the anticorrosive ferrite pigments have an equal or greater anticorrosive effect. Also, the ferrite pigments are easily added to paint formulations to coat a variety of surfaces.

Example I

Comparison was made between pigments found in the prior art and the pigments according to the present invention in a salt spray test. The pigments according to the present invention are equal if not better in protecting the substrate against salt spray corrosion. This is evident from the quantity of corrosion holes around the scratch on the plates.

The tests conducted were:
a 1,500 h salt spray test for a first grade ferrite pigment, zinc chromate and strontium chromate.
a 1,500 h salt spray test for a first grade ferrite pigment, zinc chromate and zinc compound.
a 1,500 h salt spray test for first grade ferrite pigment, as well as for commercially available pigments.
a 1,500 h salt spray test for a fourth grade ferrite pigment, as well as for commercially available pigments.

Example II

Comparison was made between a first grade pigment according to the present invention and a titanium oxide, as well as different mixtures of the first grade ferrite pigment with titanium oxide. The improved inhibiting effect on corrosion is noteworthy, especially at a 50% mixture.

The tests conducted were:
a 1,000 h salt spray test for a first grade ferrite pigment at different dilution levels in titanium dioxide.
a 500 h salt spray test results for a first grade ferrite pigment at different dilution levels in titanium dioxide.

Example III

Comparison was made between the coated and non-coated ferrite pigments. It is apparent that the coated pigments display a greater resistance to corrosion. Coating the passive fourth grade pigments increased the quantity of calcium therein, and resulted in improved anti-corrosive properties.

The tests conducted were:
a 1,000 h salt spray test for the coated and non-coated fourth grade ferrite pigment.
a 500 h salt spray test results for a coated and non-coated fourth grade ferrite pigment.

Example IV

A similar procedure was performed as in example III, but a mixture of different ferrite grades was used. The results were that the ferrite-based pigments performed as good or better than the others.

The test conducted was:
 a 500 h salt spray test results for a mixed ferrite pigment comprising first and fourth grade ferrite pigments.

Example V

A similar procedure was performed as in example III, but a magnetite pigment was used. The results were that the ferrite-based pigments performed as good or better than the others.
The test conducted was:
 a 1,500 h salt spray test for magnetite pigments, as well as a commercially available pigment.

Example VI

An adhesion test was performed in order to verify the ability of the pigment containing formulation to adhere to metal under certain test conditions. It was observed that the pigment has excellent adhesion properties, as there is virtually no peeling of breaking on the paint coating along the grooves. By comparison, though $TiO_2$ did adhere to a coating of the pigment primer, the presence of some breaks along the grooves was observed.
The tests conducted were:
 an adhesion test of first grade ferrite pigment on metal.
 an adhesion test of titanium dioxide top on ferrite pigment primer.

Example VII

Acid resistance tests were also conducted, and the results showed that the ferrite pigment resists acid attacks, as no metal is exposed. A white line in the middle of the plate was observed and indicated the reactive rim including calcium sulphate. Comparison was made to a metal surface coated with a Bayer™ iron oxide pigment, and it was observed that the latter was not as acid-resistant to sulphuric acid as the ferrite pigment. This was evident from the presence of exposed metal on the Bayer™ sample.
The tests conducted were:
 a concentrated sulfuric acid test on the ferrite pigment.
 a concentrated sulfuric acid test on the iron oxide.

Example VIII

A formulation containing 10% first grade pigment was applied to a one plate and a formulation contain 10% third grade, coated pigment was applied to another plate. These covered plates were subjected to 500 hrs of salt spray and compared to conventional Zn phosphate and Y-805K formulations. It was seen that both the formulations containing pigments of the present invention had superior corrosion prevention.

6) Pigments Coated with Leachate Solution

As mentioned above, it may be desirable to coat the ferrite-based (or magnetite-based pigments) with an inorganic or organic coating. It is particularly preferable when such a coating is used, to employ a leachate solution derived from the hydrometallurgical purification process of EAF dust.

More specifically, the leachate coating solution is produced from the third process variant in the leaching step with nitric acid. When the EAF dust has a low content of CaO and other calcium compounds, for example below about 4% by weight, and has a high concentration of zinc of about 30% by weight, this is particularly preferred. The leaching step of the second treatment may be performed at a pH of 0.5 with nitric acid, which results in a lead concentration of about 600 ppm compared with other variants, which yield lead concentrations of about 1200 ppm or greater. The ferrite-based pigments obtained from the low-lead EAF dust will themselves contain lower levels of lead, which offers significant advantages since lead is an undesirable element due to its toxicity. These pigments also present high thermal resistivity and present other desirable properties for pigments. This pigment may be coated with the leachate solution to significantly improve its corrosion resistance.

The liquid coating solution is produced in the following manner. The effluent of the leaching treatment is a liquor rich in zinc, calcium, magnesium and manganese with some minor concentration of lead. The lead may be selectively precipitated either by adding concentrated $H_2SO_4$ acid that will for lead sulfate or by raising the pH with a base such as sodium hydroxide. By raising the pH to 5.2 the lead is precipitated and the liquid may be filtered and used with very little metal addition for coating the pigment or its equivalent slurry. This leachate coating increases the calcium content and triggers the coating at the surface of the pigment. This phenomenon may be associated with charge attraction between the pigment (negative) and the material in suspension (positive).

To make the coated pigment, the slurry or the pigment pulp (of for example the, third or fourth grades, or M2 magnetite after purification) is preferably added to the liquor to yield a concentrated liquid—preferably 10% solid, but may also be 20% or 30% depending on the production required and also the efficiency that is expected of the production line. It is procedure depends on the finished pigment size characteristics that need to be reached and the amount of filler that may be tolerated for optimal corrosion resistance.

After initiating the coating with lime, the procedure most often followed is to slowly raise the pH with the addition of NaOH and the system is then pushed the a buffer encountered at a pH of about 6.5 and up to a pH of about 12.6, as the case may be. The resulting coating preferably has surface similarities to the pigment of the first grade, due to the elevated presence of calcium and zinc phases. As a result, this coating bestows added corrosion resistance properties and notable physical and chemical characteristics.

Table 23 shows the composition of the solution at different pHs.

TABLE 23

COMPOSITION OF THE SOLUTION AT DIFFERENT PHS

| Metal | Solution at pH 6.0 (mg/l) | Solution at pH 12.0 (with NaOH) (mg/l) |
|---|---|---|
| Al | <5 | 0.17 |
| Cd | 12 | <0.01 |
| Ca | 19000 | 750 |
| Cr | <0.01 | <0.01 |
| Cu | 0.18 | <0.009 |
| Fe | 0.1 | <0.1 |
| Pb | 6.8 | 0.26 |
| Mg | 3600 | 0.1 |
| Mn | 840 | 0.08 |
| Na | 3800 | 6500 |
| Zn | 16000 | 6.4 |

The liquor used for coating the ferrite and magnetite pigments of the present invention could also be used to coat other commercially available pigments like red iron oxide or natural magnetite and even $TiO_2$ to render them more resistant to corrosion

6.1) Characteristics of Coated Pigments

The ferrite-based pigments having less than 4% by weight calcium were coated with the leachate solution, to produce coated pigments, which were then analyzed using various techniques.

A) Coating at pH 9

Figure 26:
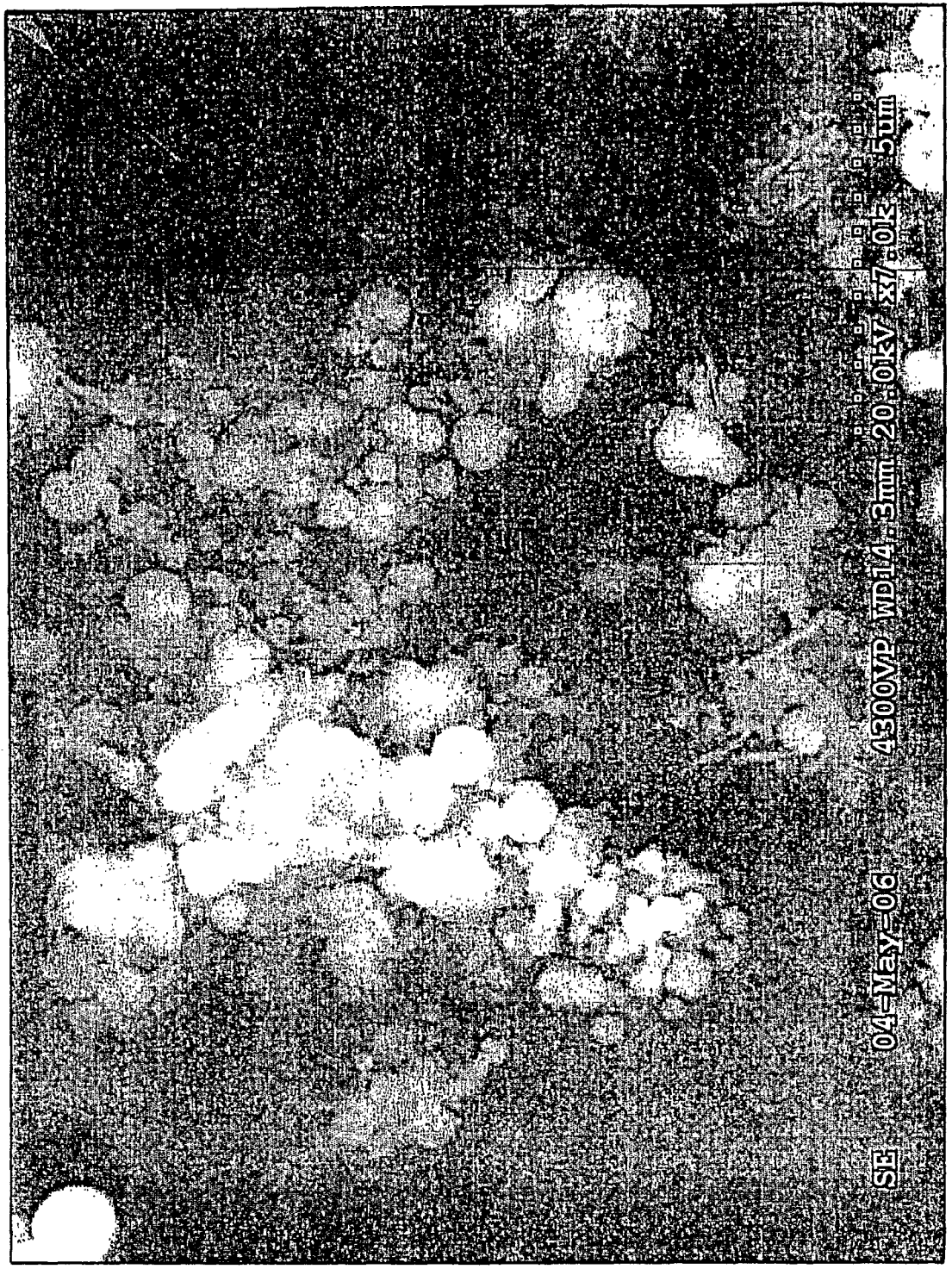
FIG. 26 is a SEM photo of the coated pigment at a pH of 9.

The overall texture of the coated pigment at a pH of 9 is illustrated by a SEM photo in FIG. 26. The coated solid pigment displays coated spheres which are large, as well as some filler material. For the filler, some particles have a regular morphology of crystal-like shapes (octahedral or columnar). Others display a fibrous morphology which appears to form irregular masses or patches.

Figure 27:
FIG. 27 is a SEM photo of the coated pigment at a pH of 9, showing a prismatic tubular crystal.

FIG. 27 is an SEM photograph that illustrates a prismatic tubular crystal, which seems to have incorporated some small pigment spheres to form an aggregate. Table 24 shows the composition of this particle. The Ca content is low, whereas there are relatively high quantities of Mg and Mn. The solid also displays a high Zn and Fe content.

TABLE 24

COMPOSITION OF A COATED PIGMENT PARTICLE

| Element | Wt % | At % |
| --- | --- | --- |
| O | 35.21 | 63.04 |
| Mg | 7.34 | 8.65 |
| Ca | 0.55 | 0.39 |
| Cr | 1.08 | 0.6 |
| Mn | 7.2 | 3.75 |
| Fe | 30.29 | 15.53 |
| Zn | 18.34 | 8.04 |
| Matrix | Correction | ZAF |

Figure 28:
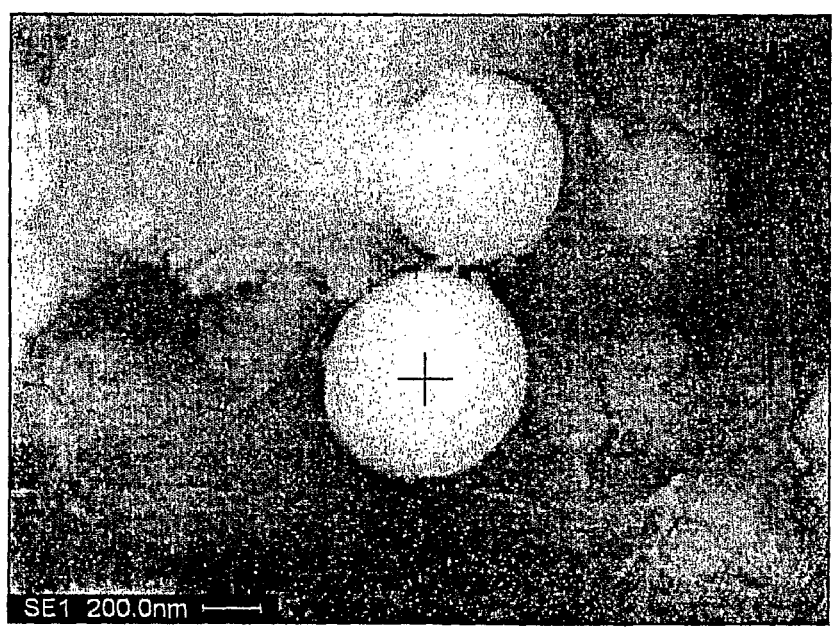
FIG. 28 is a SEM photo of the coated pigment at a pH of 9, showing a pigment sphere.

FIG. 28 is an SEM photograph that illustrates coated pigment spheres of 0.5 μm, which are abundant and have a Ca concentration of about 0.6% by weight, relatively lower amounts of Mg and Mn and relatively higher amounts of Zn and Fe. Table 25 shows the composition of this particle.

TABLE 25

COMPOSITION OF A COATED PIGMENT SPHERE

| Element | Wt % | At % |
| --- | --- | --- |
| O | 31.71 | 61.43 |
| Mg | 1.87 | 2.39 |
| Al | 0.67 | 0.77 |
| Si | 1.09 | 1.2 |
| Ca | 0.59 | 0.46 |
| Mn | 2.92 | 1.65 |
| Fe | 38.46 | 21.35 |
| Zn | 22.69 | 10.76 |
| Matrix | Correction | ZAF |

Figure 29:
FIG. 29 is a SEM photo of the coated pigment at a pH of 9, showing a small pigment sphere.

FIG. 29 is a SEM photograph that illustrates a smaller coated pigment sphere of 0.2 μm, which seems to have retained the original pigment composition produced at pH of 0.5 of the fourth grade. The composition and size would tend to support the conclusion that the grain (i.e. sphere) was not coated or received a relatively thin coating since the Ca, Zn and Fe concentrations are closer to the original uncoated grade concentrations. Table 26 shows the composition of this particle.

TABLE 26

COMPOSITION OF A COATED PIGMENT SPHERE

| Element | Wt % | At % |
| --- | --- | --- |
| O | 40.04 | 66.82 |
| Mg | 9.26 | 10.17 |
| Ca | 0.43 | 0.29 |
| Mn | 5.63 | 2.73 |
| Fe | 25.32 | 12.10 |
| Zn | 19.32 | 7.89 |
| Matrix | Correction | ZAF |

Figure 30:
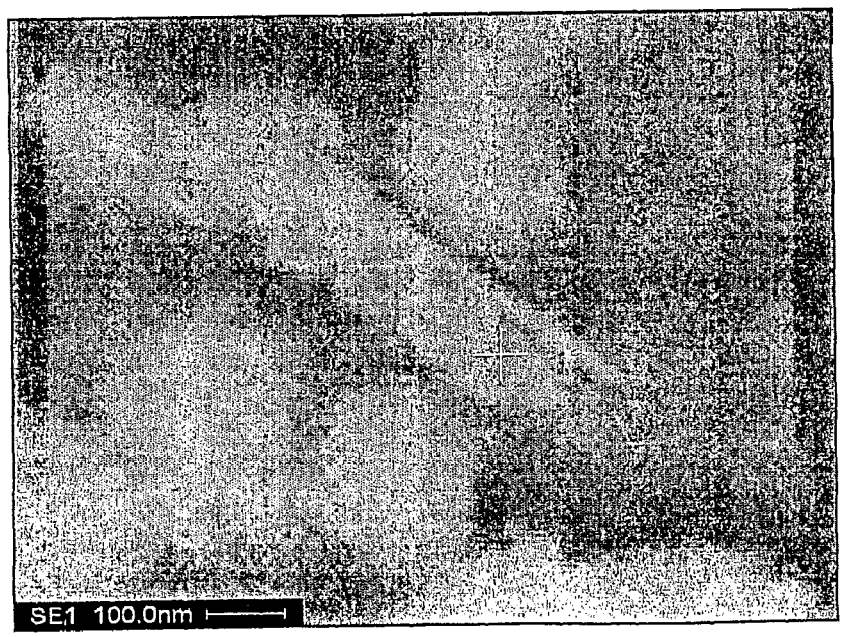
FIG. 30 is a SEM photo of the coated pigment at a pH of 9, showing columnar stick-like structure.

FIG. 30 is an SEM photograph that illustrates a columnar stick-like structure, which is associated with a filler type material having a corresponding composition high in Zn and low in Ca, with usual amounts of Mg, Mn and Fe. Table 27 shows the composition of this particle.

TABLE 27

COMPOSITION OF A COATED PIGMENT COLUMN

| Element | Wt % | At % |
| --- | --- | --- |
| O | 36.19 | 67.12 |
| Mg | 2.95 | 3.6 |
| Ca | 0.47 | 0.35 |
| Mn | 2.32 | 1.25 |
| Fe | 17.0 | 9.03 |
| Zn | 41.06 | 18.64 |
| Matrix | Correction | ZAF |

Figure 31A:
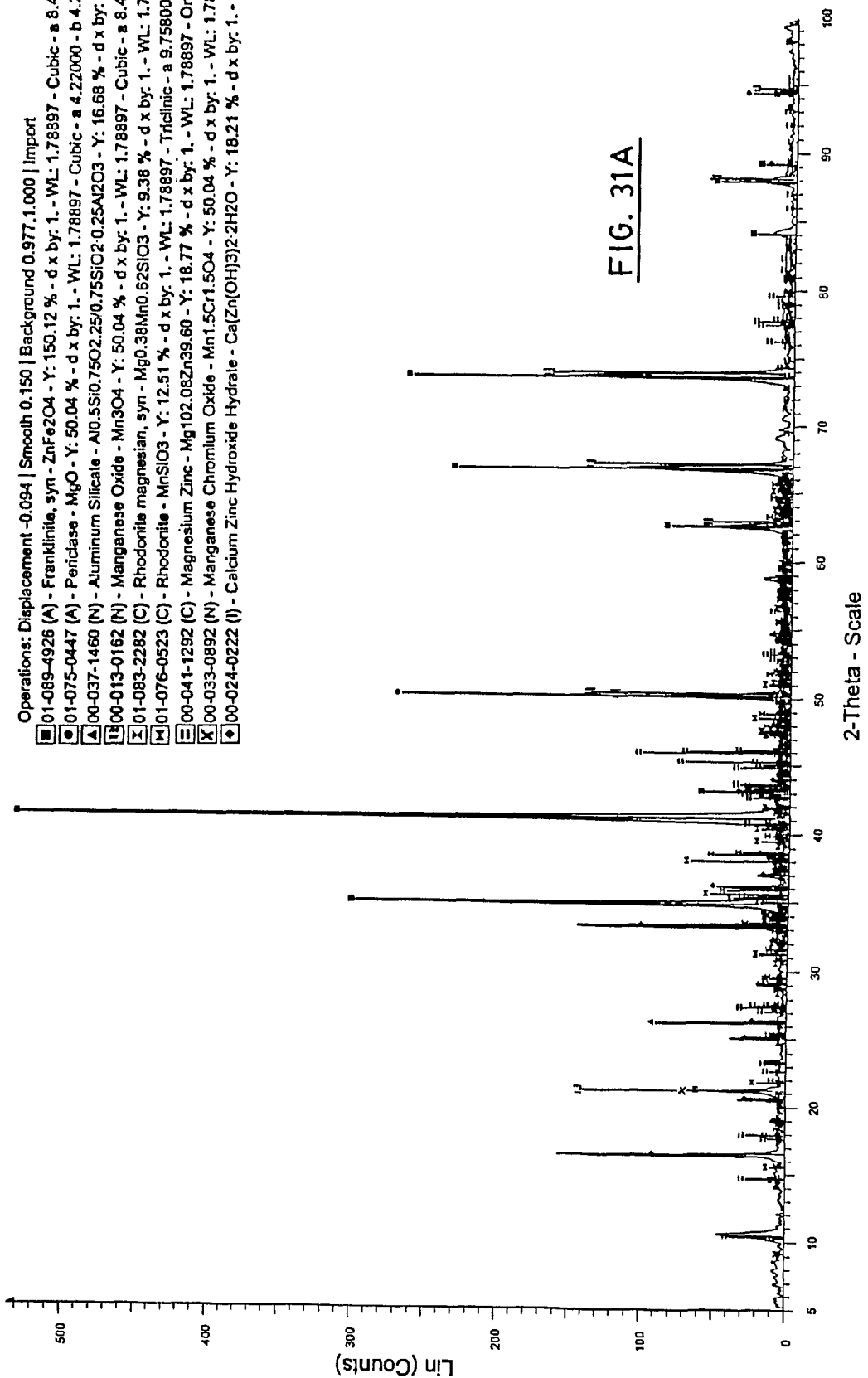
FIG. 31 is an X-ray powder diffraction graph of the pigment coated at a pH of 9.

The coated pigment at pH 9 was also characterized by X-ray diffraction. FIG. 31A is a graph showing the different structures contained in this pigment, including franklinite and calcium-zinc hydroxide hydrate (i.e. $Ca(Zn(OH)_3)_2 \cdot 2H_2O$).

B) Coating at pH to 12.5

Figure 32:
FIG. 32 is a SEM photo of the coated pigment at a pH of 12.6, showing platy rhobohedral crystals.

When the pH of the slurry is increased from 9 to about 12.6, the resulting pigment shows a significantly different texture and morphology. In FIG. 32, which is a SEM photograph, the morphology is seen to be mostly large platy rhombohedral type crystals of 10 to 20 μm on which the more usual sphere-like pigments are attached or agglomerated. The large number these structures in comparison to the pigments indicates that at a pH greater than 9 the irregular masses already described for the pH 9 case, keep growing and finally incorporate most of the pigment material in these tubular crystals.

Figure 33:
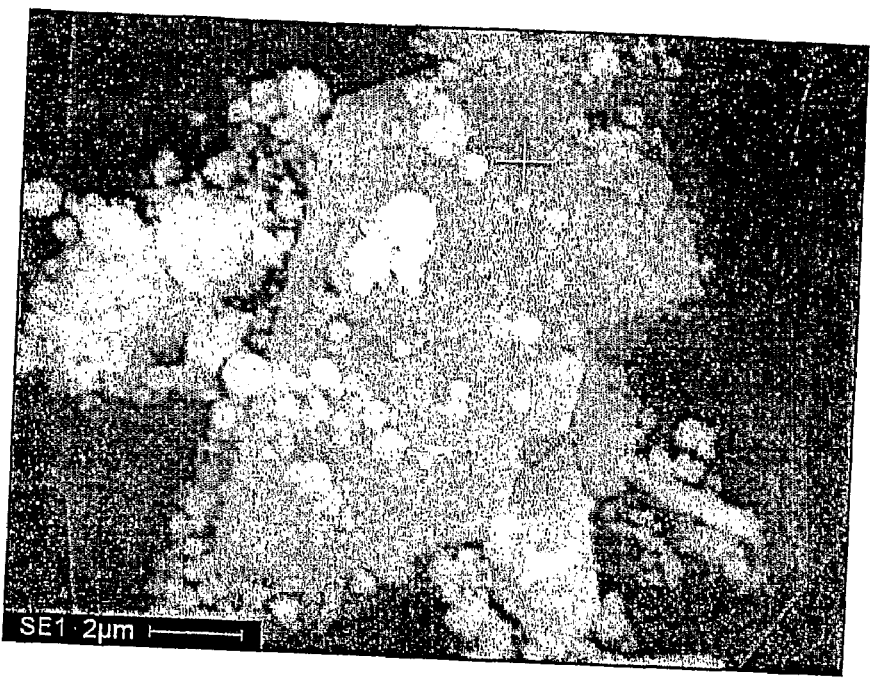
FIG. 33 is a close up SEM photo of the coated pigment of FIG. 32.

In FIG. 33, the platy structure is seen from close up, with the attached pigment pigment particles. Upon closer examination, it seems that some of the pigment has been incorporated into the larger crystal. As seen in Table 28, the composition has high values of Ca and Zn with low amounts of Fe, Mg and Mn. This composition would indicate that the analysis represents filling material.

TABLE 28

COMPOSITION OF A COATED PLATY STRUCTURE

| Element | Wt % | At % |
| --- | --- | --- |
| O | 42.88 | 72.52 |
| Mg | 1.34 | 1.49 |
| Ca | 9.62 | 6.5 |
| Mn | 0.55 | 0.27 |
| Fe | 4.78 | 2.32 |
| Zn | 40.83 | 16.9 |
| Matrix | Correction | ZAF |

Figure 34:
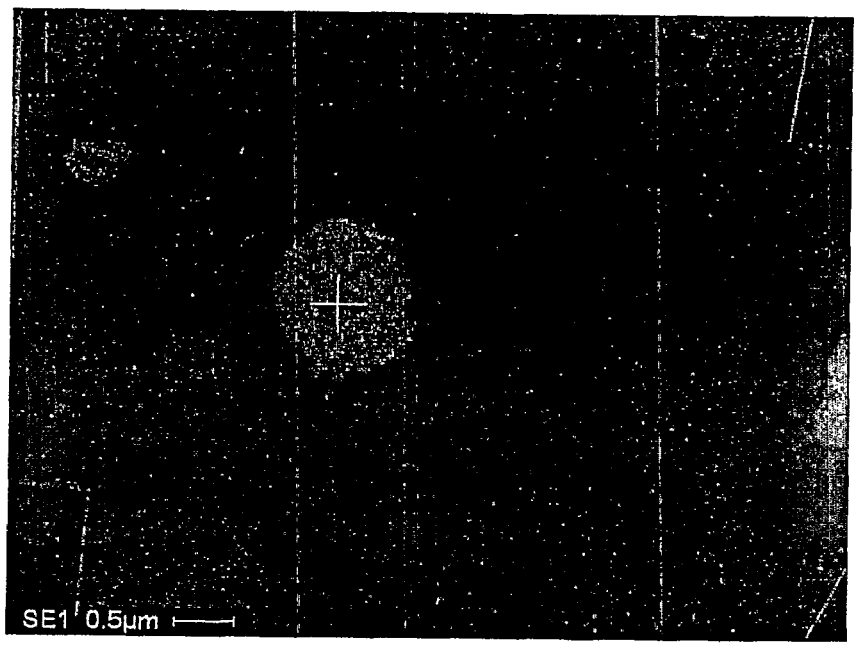
FIG. 34 is a SEM photo of the coated pigment at a pH of 12.6, showing a small pigment sphere.

FIG. 34 is an SEM photograph that illustrates a small coated pigment sphere of about 0.1 μm. This sphere contains amounts of Fe, Mg and Mn that are quite close to those encountered in a pigment, but is relatively low in Zn and has an increased Ca concentration of 1.5%. Table 29 shows the detailed composition of this small spherical particle.

TABLE 29

COMPOSITION OF A SMALL COATED SPHERE

| Element | Wt % | At % |
|---|---|---|
| O | 36.25 | 64.49 |
| Mg | 5.8 | 6.79 |
| Ca | 1.52 | 1.08 |
| Mn | 2.27 | 1.18 |
| Fe | 38.79 | 19.77 |
| Zn | 15.37 | 6.69 |
| Matrix | Correction | ZAF |

Figure 35:
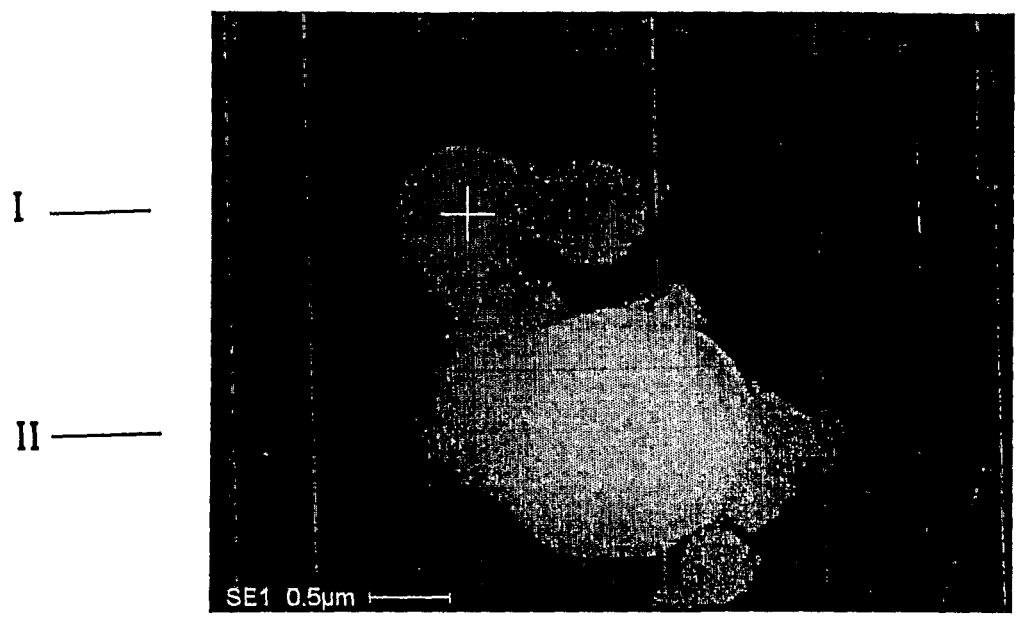
FIG. 35 is a SEM photo of the coated pigment at a pH of 12.6, showing two small pigment spheres.

FIG. 35 is an SEM photograph that illustrates a small coated pigment sphere of about 0.75 to 1.5 µm. Table 30 indicates that the late material precipitating from the coating liquor is relatively poor in zinc (between 14% and 17%) and relatively rich in calcium (between 0.7% and 3%). (These are similar results as those shown in FIG. 34 and Table 29.)

TABLE 30

COMPOSITION OF SMALL COATED SPHERES

| | Sphere I | | Sphere II | |
|---|---|---|---|---|
| Element | Wt % | At % | Wt % | At % |
| O | 37.97 | 67.87 | 35.95 | 64.32 |
| Mg | 2.31 | 2.72 | 4.99 | 5.87 |
| Ca | 0.72 | 0.51 | 3.01 | 2.15 |
| Mn | 2.49 | 1.3 | 2.53 | 1.32 |
| Fe | 38.65 | 19.79 | 38.86 | 19.92 |
| Zn | 17.85 | 7.81 | 14.67 | 6.42 |
| Matrix | Correction | ZAF | Correction | ZAF |

If the pigment of FIG. 35 is micronized, all of the large platy crystals are ground up and the material displays all of the required properties for a pigment. This is illustrated on FIG. 36 as well as in Table 31. This pigment has a composition quite similar to the dust initially treated, with the exception of the heavy metals, which have been removed.

TABLE 31

COMPOSITION OF MICRONIZED PIGMENT

| Element | Wt % | At % |
|---|---|---|
| O | 23.92 | 51.42 |
| Mg | 2.69 | 3.81 |
| Al | 0.54 | 0.68 |
| Si | 0.64 | 0.78 |
| Ca | 5.92 | 5.08 |
| Mn | 3.6 | 2.25 |
| Fe | 33.29 | 20.5 |
| Zn | 29.41 | 15.47 |
| Matrix | Correction | ZAF |

Figure 36:
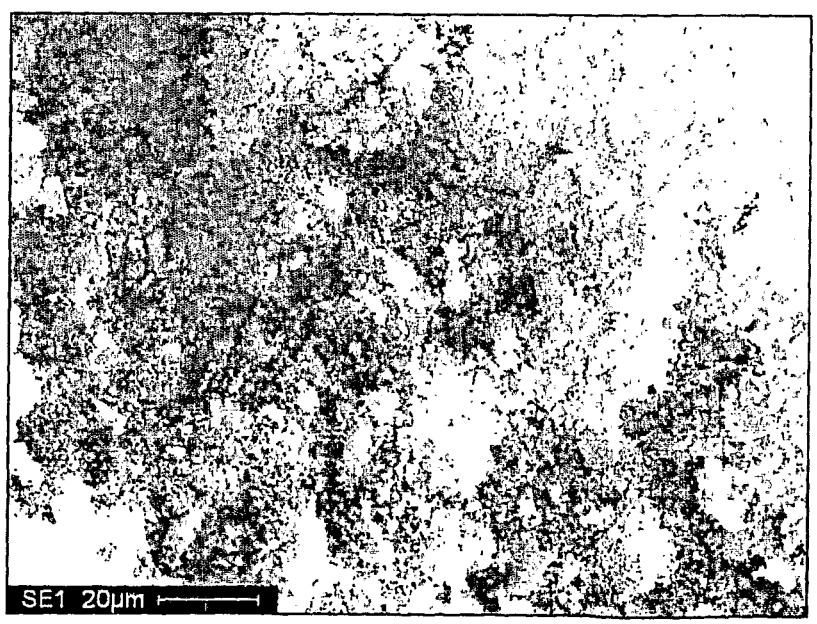
FIG. 36 is a SEM photo of the micronized pigment of FIG. 35.
Figure 37:
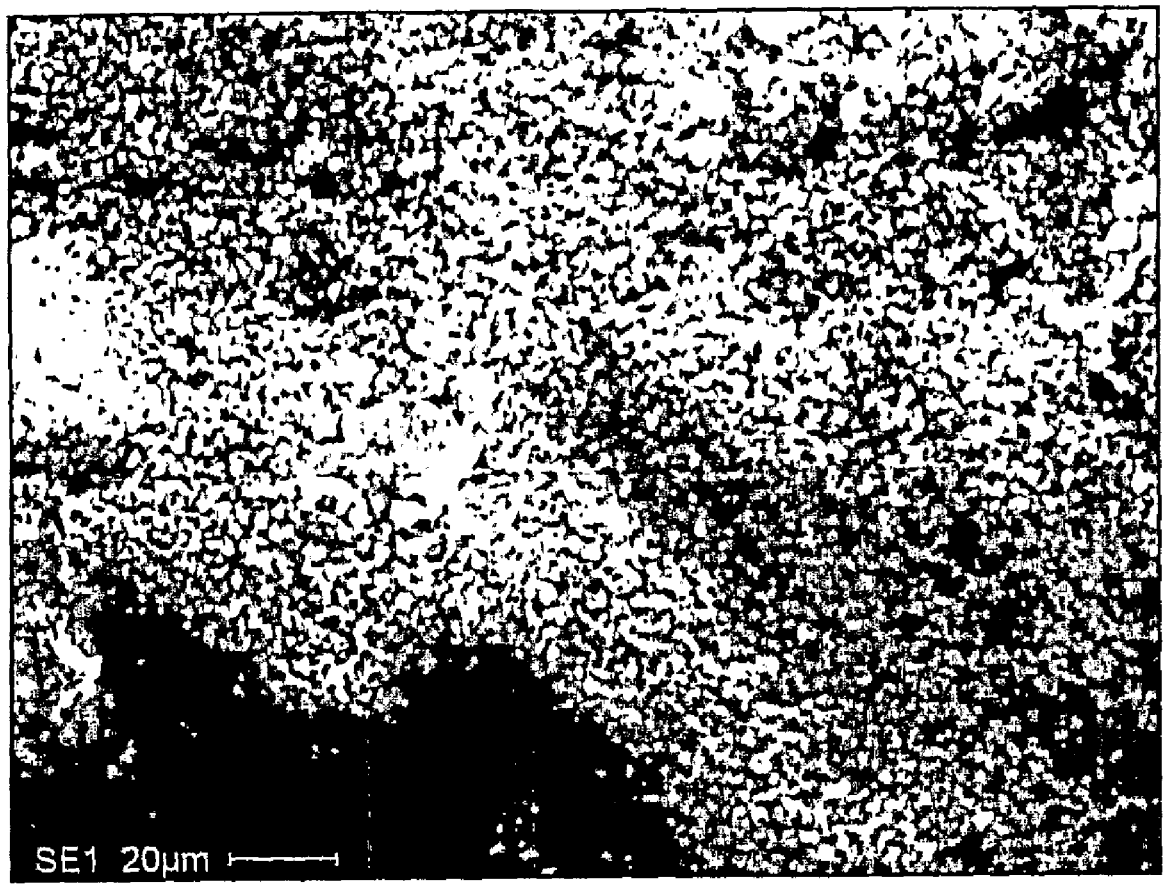
FIG. 37 is a SEM photo of an uncoated pigment of the third grade.

For the sake of comparison, one may look the uncoated pigment (third grade) of FIG. 37 and Table 30 in relation to the coated pigment of FIG. 36.

TABLE 32

COMPOSITION OF UNCOATED PIGMENT

| Element | Wt % | At % |
|---|---|---|
| O | 25.03 | 53.07 |
| Mg | 2.88 | 4.01 |
| Si | 0.98 | 1.18 |
| Ca | 0.57 | 0.48 |
| Mn | 4.77 | 2.94 |
| Fe | 47.38 | 28.77 |
| Zn | 18.4 | 9.54 |
| Matrix | Correction | ZAF |

Figure 38A:
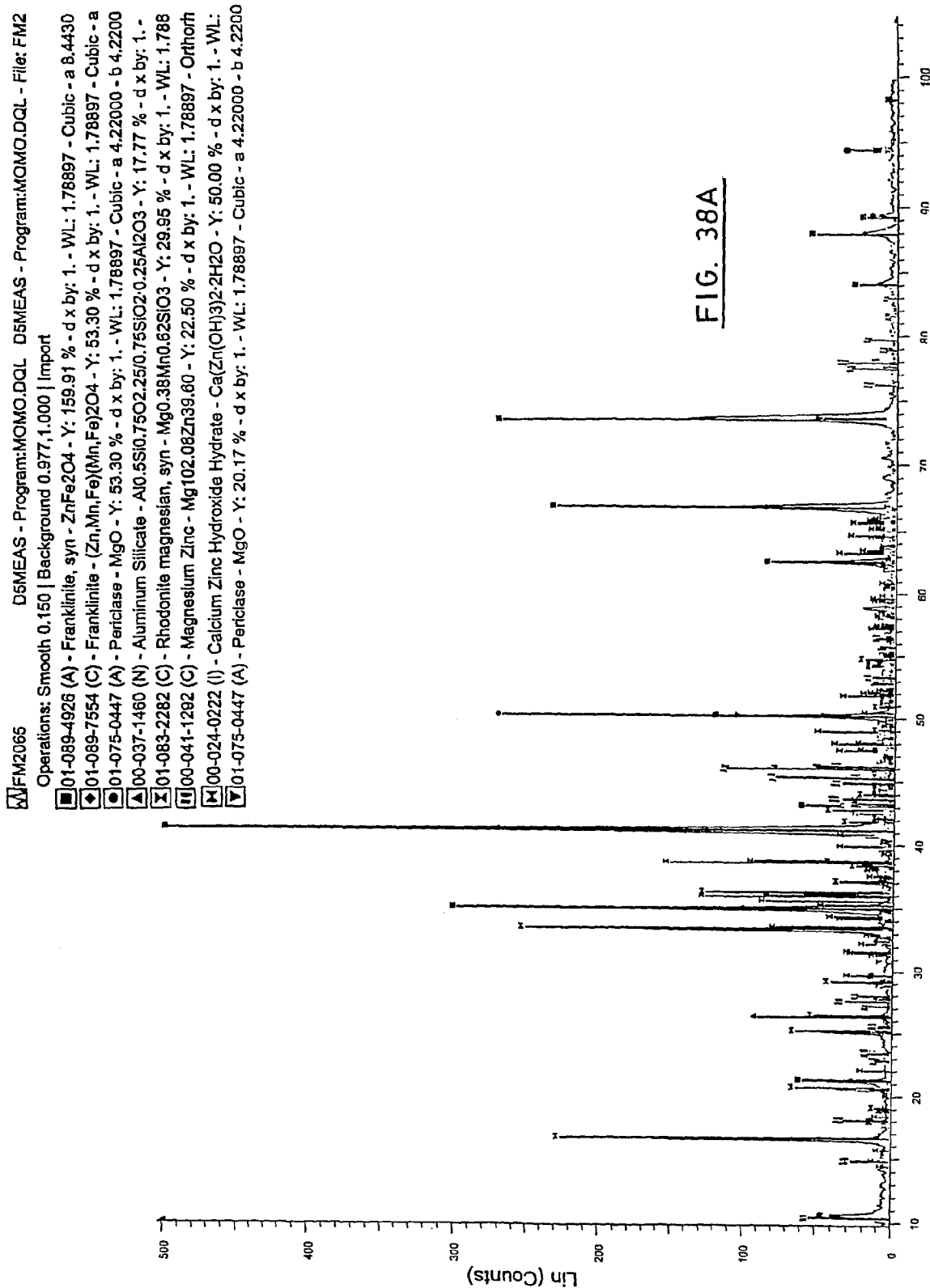
FIG. 38A is an X-ray powder diffraction graph of the pigment coated at a pH of 12.6.
Figure 38:
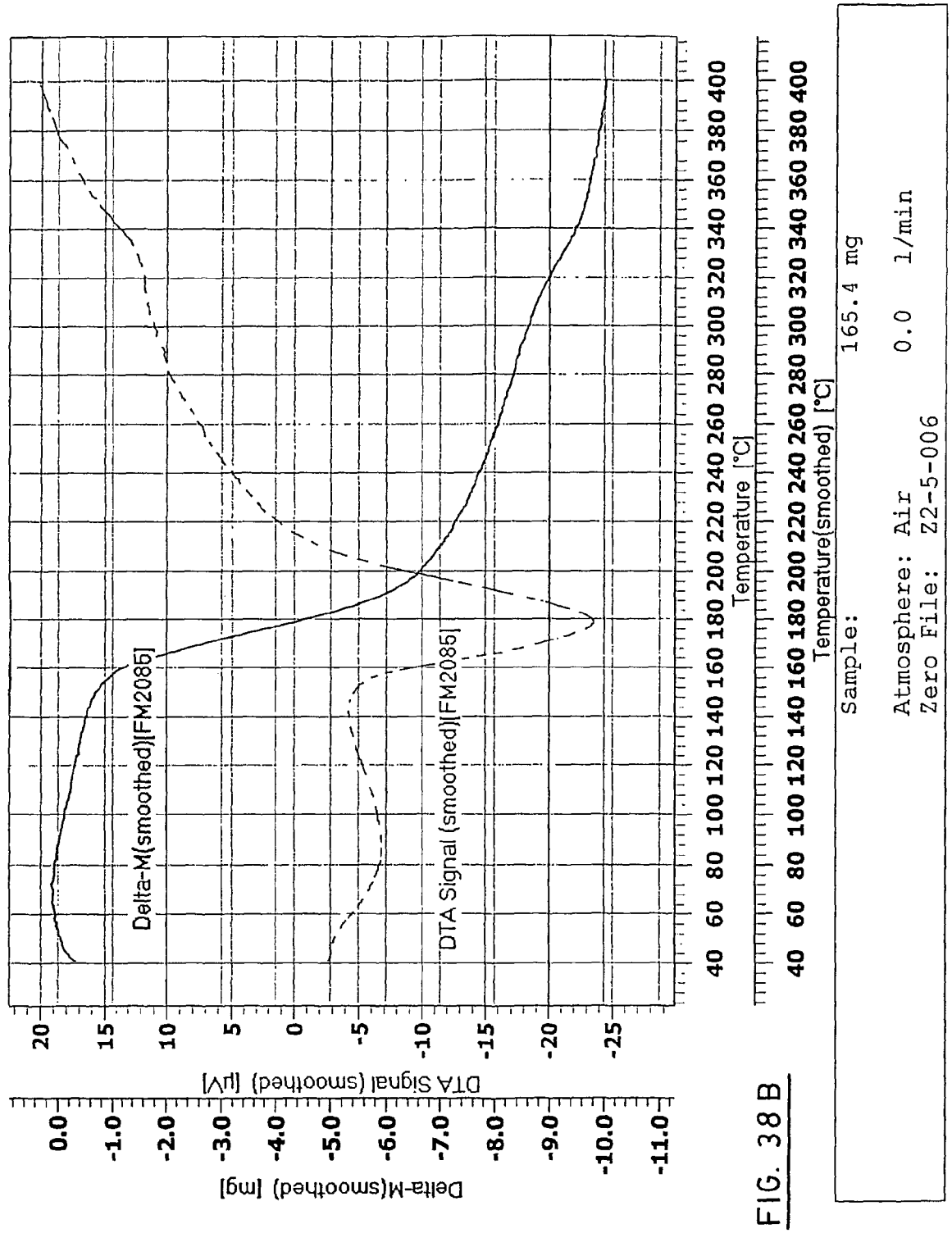
FIG. 38B is a graph showing DTA and TGA analyses of the pigment of FIG. 38A.
Figure 39:
FIGS. 39A to 39E are photographs of $TiO_2$ covered plates on which shelled organisms are present.
Figure 39:
Figure 39:
Figure 39:
Figure 39:
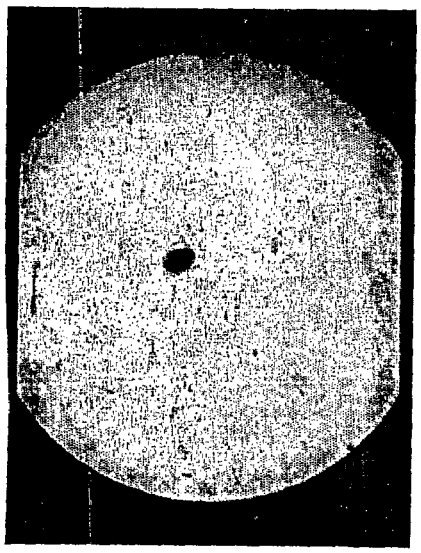

Furthermore, the coated pigment at pH 12.5 was also characterized by X-ray diffraction. FIG. 38A is a graph showing the different structures contained in this pigment, including franklinite and calcium-zinc hydroxide hydrate (i.e. $Ca(Zn(OH)_3)_2 \cdot 2H_2O$). This pigment was also characterized by a DTA and TGA graph, shown in FIG. 38B.

7) Applications of the Pigments

Of course, pigments have a variety of applications in a myriad of industries. However, a few preferred uses of the pigments are described below.

7.1) For Ferrite Based-Pigments

Anti-fouling is a domain involving the shipping, pipe maintenance, air-conditioning and water-structure industries. The accumulation of organisms on the hulls of ships and other water structures such as docks, break walls, underwater instruments, sea defenses and other artificial submerged structures, is problematic in marine industries. Combating the build-up of organisms, whether microfoulers (biofilms) or macrofoulers (barnacles, limpets, seaweed), normally involves scrapping or painting with resistant paints. Biofoulers are often susceptible to pH and have difficulty growing in basic environments. The active pigment could thus be used in an anti-fouling paint. A surface coated with a paint containing the active ferrite pigment would not only protect against air and moisture physically, but would present an alkaline pH due to its activity, and would discourage fouling.

EXAMPLES

Figure 40:
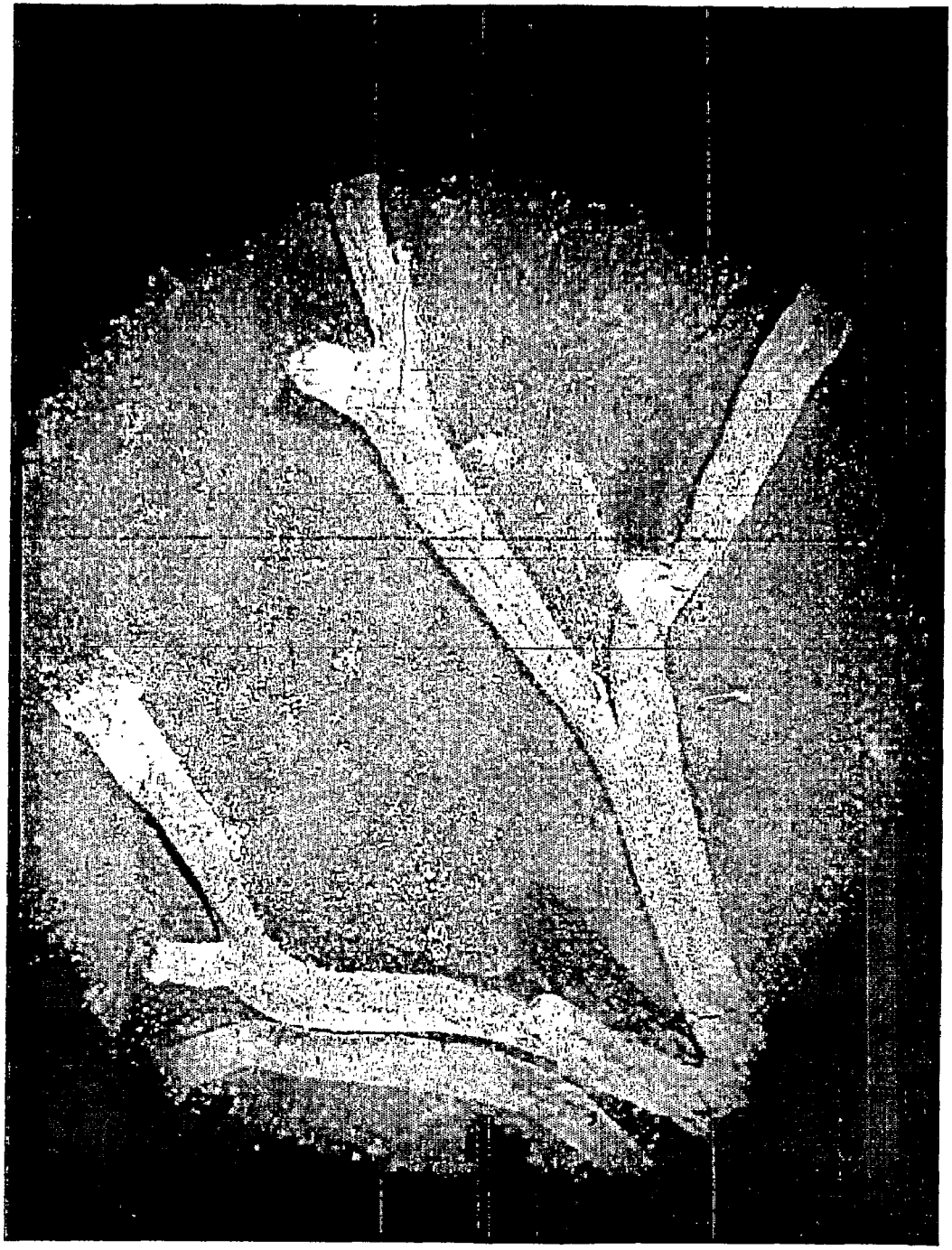
FIG. 40 is a photograph of a plate covered with an antifouling formulation containing the active pigment, on which only a type of algae is present.

Metal plates were coated with a paint formulation containing ferrite-based pigments of the first grade. Other metal plates were coated with $TiO_2$ to provide comparative results. All of the coated metal plates were submerged in a river to a depth where light access was minimal. A microscope was then used to observe the surface of the plates more closely. After 98 days, the coated plates were removed and observed. FIGS. 39A to 39E are close up views of the $TiO_2$ covered plates, and it is evident that various shelled organisms are present on the coating. On the contrary, FIG. 40 is a close up view of the coated plate where the ferrite-based pigment was present in the paint. Only one type of algae-like organism was observed on the plate and the shelled organisms were absent.

Other applications include anti-corrosion paints for metals and other substrates susceptible to ion penetration and degradation.

7.2) For Magnetite-Based Pigments

The magnetite pigment has morphologic and magnetic properties that enable it to be used in inks (Toner) of photocopiers. The magnetite pigment may also be coated and used as a black primer or finishing paints for anticorrosion applications Although preferred embodiments for carrying out the invention were described in detail above and illustrated in the annexed drawing, the invention is not limited to these preferred embodiments, and many changes and modifications can be made by a person skilled in the art, without leaving the framework or the spirit of the invention.

The invention claimed is:

1. An anticorrosion ferrite-based pigment for use in a paint to coat a substrate, the pigment being derived from a hydrometallurgical purification process of EAF dust, said EAF dust being generated:
in an electric arc furnace or the like for producing carbon steel by processing source materials chosen from the group comprising scrap metals, direct reduced iron and pre-reduced hematite, and using a CaO-rich slag; and
from a condensation reaction of metal vapors of Fe, of Zn and of metals chosen from the group consisting of Mn, Mg, Si and Al, and suspended CaO-based particles and oxygen;
the pigment comprising:
condensed metal oxides, comprising a plurality of different ferrites of the general formula $MOFe_2O_3$, wherein M comprises Zn, Fe, Mn, Mg and complexes thereof for the different ferrites, and having ferrite or ferrite-like structures substantially preserved from the EAF dust, and forming aggregates of said ferrite or ferrite-like structures;
CaO entrapped by the ferrite or ferrite-like structures and being at least partially available to react with humid air and/or water to protect the substrate against corrosion; and
from about 0.5% to about 20% by weight calcium.

2. The pigment of claim 1, wherein the source materials comprise scrap metals.

3. The pigment of claim 1, wherein the amount of Zn present in the ferrites is in greater amount than Mn or Mg and the ferrites are franklinite-based.

4. The pigment of claim 1, wherein the pigment has from about 20% to about 60% by weight Fe.

5. The pigment of claim 1, wherein the substrate is made of metal susceptible to corrosion.

6. An additive for use in paint, primer or coating formulations to produce an anticorrosive formulation, comprising the pigment defined in claim 1.

7. The pigment of claim 1, wherein the pigment has from about 4% to about 12% by weight calcium.

8. The pigment of claim 1, wherein the pigment has from about 5% to 40% by weight Zn.

9. The pigment of claim 8, wherein the pigment has from about 30% to about 35% by weight Zn.

10. The pigment of claim 1, having a granulometry presenting a bell curve like distribution with a median between 0.2 pm and 1.2 pm.

11. The pigment of claim 10, having a granulometry presenting a bell curve like distribution with a median between 0.3 pm and 0.8 pm.

12. The pigment of claim 1, wherein the pigment has undergone leaching with a solvent during the hydrometallurgical purification process.

13. The pigment of claim 12, wherein the solvent is water and the pigment produced is a ferrite pigment of a first grade.

14. The pigment of claim 12, wherein the solvent is sulfuric acid, the leaching is performed at a pH of 0.5 to 3 and the pigment produced is a ferrite pigment of a second grade.

15. The pigment of claim 12, wherein the solvent is nitric acid, the leaching is performed at a pH of 0 to 3 and the pigment produced is a ferrite pigment of a third grade.

16. The pigment of claim 1, wherein said pigment has a thermal color resistivity at about 250° C.

17. The pigment of claim 16, wherein said pigment has a thermal color resistivity 10 at about 300° C.

18. An antifouling formulation comprising the pigment defined in claim 1.

19. The antifouling formulation of claim 18, wherein the antifouling formulation is applied to a partially or fully submerged structure, for antifouling against selected organisms.

20. The pigment of claim 1, wherein a first portion of the CaO is physically entrapped within the aggregates.

21. The pigment of claim 20, wherein a second portion of the CaO is physically entrapped within the ferrite or ferrite-like structure.

22. The pigment of claim 21, wherein the first portion of CaO is available as a source of sacrificial calcium to react with humid air and/or water to produce $Ca(OH)_2$ and locally increase the pH.

23. The pigment of claim 22, wherein the second portion of CaO becomes increasingly available once the first portion of CaO is depleted, as a source of the sacrificial calcium.

24. The pigment of claim 22, wherein the $Ca(OH)_2$ locally maintains the pH at or above 12.

25. The pigment of claim 22, wherein the sacrificial calcium further triggers the formation of at least one protective hydroxide phase.

26. The pigment of claim 25, wherein the at least one protective hydroxide phase are selected from amorphous calcium hydroxide phases and crystalline portlandite.

27. The pigment of claim 25, wherein the at least one protective hydroxide phase comprises $Zn(OH)_2$.

28. The pigment of claim 25, wherein the at least one protective hydroxide phase presents a DTA fingerprint as shown in the graph of FIG. 21.

29. The pigment of claim 25, wherein the at least one protective hydroxide phase presents a TGA fingerprint as shown in the graph or FIG. 21.

30. The pigment of claim 25, wherein the at least one protective hydroxide phase comprises a calcium-zinc hydroxide.

31. The pigment of claim 30, wherein the calcium-zinc hydroxide is a crystallographic phase of $CaZn_2(OH)_6$ hydrate.

32. The pigment of claim 25, wherein the at least one protective hydroxide phase forms a physical protective layer on the metal substrate.

33. The pigment of claim 32, wherein the protective layer comprises from 25% to 70% by weight Zn from $Zn(OH)_2$.

34. The pigment of claim 32, wherein the protective layer comprises from 35% to 55% by weight Zn from $Zn(OH)_2$.

35. An anticorrosion ferrite-based pigment for use in a paint to coat a substrate, the pigment being derived from a hydrometallurgical purification process of EAF dust, said EAF dust being generated:
in an electric arc furnace or the like for producing carbon steel by processing source materials chosen from the group comprising scrap metals, direct reduced iron and pre-reduced hematite, and using a CaO-rich slag; and
from a condensation reaction of metal vapors of Fe, of Zn and of metals chosen from the group consisting of Mn, Mg, Si and Al, and suspended CaO-based particles and oxygen;
the pigment comprising:
condensed metal oxides, comprising a plurality of different ferrites of the general formula $MOFe_2O_3$, wherein M comprises Zn, Fe, Mn, Mg and complexes thereof for the different ferrites, and having ferrite or ferrite-like structures substantially preserved from the EAF dust, and forming aggregates of said ferrite or ferrite-like structures, wherein said aggregates form a coating, said coating being calcium- and/or zinc-based and deposited on the pigment; and CaO entrapped by the ferrite or ferrite-like structures and being at least partially available to react with humid air and/or water to protect the substrate against corrosion.

36. The pigment of claim 35, wherein the coating is precipitated as a calcium-zinc-hydroxide phase.

37. The pigment of claim 35, wherein the pigment has from about 0.5% to about 20% by weight calcium.

38. The pigment of claim 37, wherein the pigment has from about 4% to about 12% by weight calcium.

39. An additive for use in paint, primer or coating formulations to produce an anticorrosive formulation, comprising the pigment defined in claim 35.

40. An antifouling formulation comprising the pigment defined in claim 35.

41. The antifouling formulation of claim 40, wherein the antifouling formulation is applied to a partially or fully submerged structure, for antifouling against selected organisms.

* * * * *